(12) United States Patent
Thiele

(10) Patent No.: US 8,185,217 B2
(45) Date of Patent: May 22, 2012

(54) ROBUST ADAPTIVE MODEL PREDICTIVE CONTROLLER WITH TUNING TO COMPENSATE FOR MODEL MISMATCH

(75) Inventor: Dirk Thiele, Austin, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 636 days.

(21) Appl. No.: 12/363,305

(22) Filed: Jan. 30, 2009

(65) Prior Publication Data

US 2009/0198350 A1      Aug. 6, 2009

Related U.S. Application Data

(60) Provisional application No. 61/025,190, filed on Jan. 31, 2008.

(51) Int. Cl.
*G05B 13/02* (2006.01)
*G06F 7/60* (2006.01)
*G06F 17/50* (2006.01)
*G06G 7/48* (2006.01)

(52) U.S. Cl. .................. 700/29; 703/2; 703/12; 703/13; 700/33

(58) Field of Classification Search ..................... 700/29, 700/33; 703/2, 6, 12, 13
See application file for complete search history.

(56) References Cited

U.S. PATENT DOCUMENTS

| | | | |
|---|---|---|---|
| 4,549,123 A | 10/1985 | Hagglund et al. | |
| 5,453,925 A | 9/1995 | Wojsznis et al. | |
| 5,740,033 A * | 4/1998 | Wassick et al. | 700/29 |
| 6,056,781 A * | 5/2000 | Wassick et al. | 703/12 |
| 6,487,459 B1 * | 11/2002 | Martin et al. | 700/44 |
| 6,847,954 B1 | 1/2005 | Wojsznis et al. | |
| 7,050,863 B2 | 5/2006 | Mehta et al. | |
| 7,451,004 B2 * | 11/2008 | Thiele et al. | 700/28 |
| 7,856,281 B2 * | 12/2010 | Thiele et al. | 700/32 |
| 7,987,145 B2 * | 7/2011 | Baramov | 706/21 |

(Continued)

OTHER PUBLICATIONS

"ADCO—Adaptive Riccati Controller," (1992), Availalbe at URL:http://www.ipas-systeme.de/products111.htm.

(Continued)

*Primary Examiner* — Kakali Chaki
*Assistant Examiner* — Sivalingam Sivanesan
(74) *Attorney, Agent, or Firm* — Marshall, Gerstein & Borun LLP

(57) ABSTRACT

An MPC adaptation and tuning technique integrates feedback control performance better than methods commonly used today in MPC type controllers, resulting in an MPC adaptation/tuning technique that performs better than traditional MPC techniques in the presence of process model mismatch. The MPC controller performance is enhanced by adding a controller adaptation/tuning unit to an MPC controller, which adaptation/tuning unit implements an optimization routine to determine the best or most optimal set of controller design and/or tuning parameters to use within the MPC controller during on-line process control in the presence of a specific amount of model mismatch or a range of model mismatch. The adaptation/tuning unit determines one or more MPC controller tuning and design parameters, including for example, an MPC form, penalty factors for either or both of an MPC controller and an observer and a controller model for use in the MPC controller, based on a previously determined process model and either a known or an expected process model mismatch or process model mismatch range. A closed loop adaptation cycle may be implemented by performing an autocorrelation analysis on the prediction error or the control error to determine when significant process model mismatch exists or to determine an increase or a decrease in process model mismatch over time.

52 Claims, 16 Drawing Sheets

U.S. PATENT DOCUMENTS

2007/0276512 A1* 11/2007 Fan et al. .................. 700/37

OTHER PUBLICATIONS

Alfonseca et al., "Web-Based Simulation of Systems Described by Partial Differential Equations," Proceedings of the 2001 Winter Simulation Conference, pp. 629-636 (2001).

Astrom et al., PID Controllers Theory, Design and Tuning, 2nd ed., ISA (1995).

Badgwell et al., "Distrubance Model Design for Linear Models," Proceedings of ACC, pp. 1621-1626 (2002).

Badwe et al., "Quantifying the Impact of Model-Plant Mismatch on Controller Performance: A Non-Invasive Approach," International Symposium on Advanced Control of Industrial Processes (2008).

Bialkowski, "On Lambda Tuning—The How and Why," pp. 1-15 (Apr. 2002).

Blessing, "Parameter Estimation of State-Space Models for Multivariable Systems with Correlation Analysis and Method of Least Squares," $4^{th}$ IFAC-O, pp. 385-394 (1975).

Blevins et al., Advanced Control Unleashed, ISA, ISBN 1-5561 7-81 5-8 (2003).

Böling et al., "Multi-Model Control of a Simulated pH Neutralization Process," Proceedings of the $16^{th}$ IFAC World Congress, 16(1):1-6 (2005).

Cagienard et al., Move Blocking Strategies in Receding Horizon Control, 43rd IEEE CDC, 2:2023-2028 (2004).

Celaya et al., "Closed-Loop Identification at the Hovensa Refinery," Tai-Ji Control, pp. 1-18 (2004).

Chien et al., "Consider IMC Tuning to Improve Controller Performance," *Chemical Engineering Process*, pp. 33-41 (Oct. 1990).

Chiuso, "An Introduction to Subspace Identification," Department of Information Engineering, University of Padova, pp. 1-160 (2005).

Chu et al., "Multistep Model Predictive Control Based on Artificial Neural Networks," *Ind. Eng. Chem. Res.* 42:5215-5228 (2003).

Cutler et al., "Dynamic Matrix Control—A Computer Control Algorithm," *Proc. Automatic Control Conf.*, Paper WP5-B (1980).

Desoer et al., Feedback Systems: Input-output Properties, Academic Press (1975).

Dunia et al., "Graphical MPC for Fast Dynamic Systems," Proceedings of MSEC/ICM&P, pp. 1-10 (2008).

Dutta et al., "Application of Neural Network Control to Distillation and an Experimental Comparison with other Advanced Controllers," *ISA Transactions*, 38(3):251-278 (1999).

Garcia et al., "Model Predictive Control: Theory and Practice—a Survey," *Automatica*, 25(3):335-348 (1989).

Garcia et al., "Quadratic Programming Solution of Dynamic Matrix Control (QDMC)," *Chem. Eng. Commun.*, 46:73-87 (1986).

Grosdidier et al., "The IDCOM-M Controller," Proceedings of the 1988 IFAC Workshop on Model-Based Process Control, pp. 31-36 (1988).

Guay et al., "Effect of Process Nonlinearity on Linear Quadratic Regulator Performance," *Journal of Process Control*, 15:113-124 (2005).

Guzman et al., "Interactive Teaching of Constrained Generalized Predictive Control," IEEE Control Systems Magazine, pp. 1-31 (2005).

Hahn et al., "A Gramian Based Approach to Nonlinearity Quantification and Model Classification," *Ind. Eng. Chem. Res.*, 40:5724-5731 (2001).

Hahn et al., "A Method for Robustness Analysis of Controlled Nonlinear Systems," *Chemical Engineering Science*, 59:4325-4338 (2004).

Hahn et al., "Adaptive IMC Control for Drug Infusion for Biological Systems," *Control Engineering Practice*, 10:45-56 (2002).

Hahn et al., "Controllability and Observability Covariance Matrices for the Analysis and Order Reduction of Stable Nonlinear Systems," *Journal of Process Control*, 13:115-127 (2003).

Han et al., "Adapt the Stead-State Kalman Gain using the Normalized Autocorrelation of Innovations," *Signal Processing Letters*, IEEE, 12(11):780-783 (2002).

Hu et al., "An LMI Approach to Robust Model Predictive Sampled-data Control for Linear Uncertain Systems," *Proceedings of the American Control Conference*, 1(8):628-633 (2002).

Hugo, "Limitations of Model Predictive Controllers," Hydrocarbon Proceedings, pp. 83-88 (2000).

Ingimundarson et al., "Performance Comparison Between PID and Dead-Time Compensating Controllers," *Journal of Process Control*, 12(8):887-895 (2002).

International Preliminary Report on Patentability for Application No. PCT/US2009/032650, dated Aug. 3, 2010.

International Preliminary Report on Patentability for Application No. PCT/US2010/022934, dated Aug. 2, 2011.

International Search Report and Written Opinion for Application No. PCT/US2010/022934, dated Jun. 29, 2010.

International Search Report for Application No. PCT/US2009/032650, dated Oct. 7, 2009.

Jelali, "An Overview of Control Performance Assessment Technology and Industrial Applications, " *Control Engineering Practice*, 14:441-466 (2006).

Kalman, "A New Approach to Linear Filtering and Prediction Problems," *J. Basic Eng.*, 82(1):35-45 (1960).

Kesevan et al., "Diagnostic Tools for Multivariable Model-Based Control Systems," *Ind. Eng. Chem. Res.*, 36(7):2725-2738 (1997).

Ko et al., "State Estimation of Linear Systems with State Equality Contraints," IFAC (2005).

Lee et al., "Receding Horizon Output Feedback Control for Linear Systems with Input Saturation," Proceedings of the 39th IEEE, pp. 656-661 (Dec. 2000).

Lee et al., "State Space Interpretation of Model Predictive Control," *Automatica*, 30(4):707-717 (1994).

Li et al., "A State Space Formulation for Model Predictive Control," AIChE Journal, 35(2):241-249 (Feb. 1989).

Lundstrom et al., "Limitations of Dynamic Matrix Control," *Computers in Chemical Engineering*, 19:409-421 (1995).

Maciejowski, Predictive Control with Constraints, Prentice Hall, Shell Oil Fractioner, pp. 248 (2002).

Marquis et al., "SMOC, a Bridge Between State Space and Model Predictive Controllers: Application to the Automation of a Hydrotreating Unit," Proceedings of the 1988 IFAC Workshop on Model-Based Process Control, pp. 37-43 (1988).

Marsik et al., "Application of Identification-Free Algorithms for Adaptive Control," *Automatica*, 25(2):273-277 (1989).

McMillan, "Effect of Sample Delay on Standard PID Tuning and Loop Performance," Fisher-Rosemount Systems, pp. 1-17 (2008).

McMillan, Implementing MPC to Reduce Variability by Optimizing Control Valve Response (2005).

Milman et al., "Guaranteed Bounds on the Performance Cost of a Fast Real-Time Suboptimal Constrained MPC Controller," 43rd IEEE Conference on Decision and Control, pp. 1-6 (Dec. 2004).

Morari et al., Model Predictive Control Toolbox Users Guide (1998).

Muske et al., "Disturbance Modeling for Offset-Free Linear Model Predictive Control, " *Journal of Process Control*, 12:617-632 (2002).

Muske et al., "Model Predictive Control with Linear Models," *AIChE J.*, 39(2):262-287 (1993).

Na, "Auto-Tuned PID Controller Using a Model Predictive Control Method for the Steam Generator Water Level," IEEE Transactions on Nuclear Science, 48(5):1664-1671 (Oct. 2001).

Nagamune et al., "Sensitivity Shaping in Feedback Control and Analytic Interpolation Theory," Optimal Control and Partial Differential Equation Conference, pp. 1-12 (Apr. 2000).

O'Dwyer, "PI and PID Controller Tuning Rules for Time Delay Processes: A Summary," Dublin Institute of Technology (2000).

Odelson et al., "A New Autocovariance Least-Squares Method for Estimating Noise Covariances," TWMCC, Technical Report No. 2003-04, pp. 1-13 (2003).

Odelson et al., "Online Monitoring of MPC Disturbance Models using Closed-Loop Data," Proceedings of the American Control Conference, pp. 2714-2719 (2003).

Olsen et al., "Lambda Tuning as a Promising Controller Tuning Method for the Refinery," AiChE Spring National Meeting, pp. 1-8 (Mar. 2002).

Onodera et al., "A New Subspace Identification Method for Closed-Loop Systems," Seminar, pp. 1-36 (Aug. 2005).

Otto, "Forward Modeling Controllers: A Comprehensive SISO Controller," AIChe Meeting (1986).

Padhiyar et al., "Nonlinear Inferential Multi-Rate Control of Kappa No. at Multiple Locations in a Continuous Pulp Digester," *Journal of Process Control*, 16(10):1037-1053 (2006).

Pannocchia et al., "A Candidate to Replace PID Control: SISO Contraint LQ Control," DYCOPS Proceedings (2004).

Pannocchia et al., "Disturbance Models for Offset-Free Model-Predictive Control," AIChE Journal, 49(2):426-437 (Feb. 2003).

Pannocchia et al., "Offset-Free Control of Constrained Linear Discrete-Time Systems Subject to Persistent Unmeasured Disturbances," 42nd IEEE Conference on Decision and Control (2003).

Patwardhan et al., "From Data to Diagnosis and Control Using Generalized Orthonormal Basis Filters. Part I: Development of State Observers," *J. Process Control*, 15 (2005).

Piche et al., "Nonlinear Model Predictive Control Using Neural Networks," Pavilion Technologies, Inc. Brochure (1992).

Pluymers et al., "Robust Polyhedral Invariant Sets and Their Application in MPC," 24th Benelux Meeting on Systems and Control (2005).

Prett et al., "Optimization and Constrained Multivariable Control of a Catalytic Cracking Unit," Proceedings of the Joint Automatic Control Conference (1980).

Qin et al., "A Survey of Industrial Model Predictive Control Technology," *Control Engineering Practice*, 11(7):733-764 (2003).

Qin, "An Overview of Industrial MPC," (1996). Retrieved from the Internet on Jul. 13, 2005: URL:http://www.che.utexas.edu/~qin/cpcv/node1.html.

Richalet et al., "Model Predictive Heuristic Control: Applications to Industrial Processes," *Automatica*, 14:413-428 (1978).

Ricker, "Decentralized Control of the Tennessee Eastman Challenge Process," *J. Proc. Cont.*, 6(4):205-221 (1996).

Rivera et al., "Internal Model Control. 4. PID Controller Design," *Ind. Eng. Chem. Process Des. Dev.*, 25(1):252-265 (1986).

Schei, "On-Line Estimation of Process Control and Optimization Applications," 8th International IFAC Symposium on Dynamics and Control of Process Systems, 2.

Seborg et al., "Controller Design Method," Process Dynamics and Control, 27.4, pp. 656-669 (1989).

Shinskey, "Evaluating Feedback Controllers: A Challenge for Vendors," Control Engineering, Table of Contents Only (1994).

Shinskey, "PID-Deadtime Control of Distributed Processes," *Control Engineering Practice*, 9(11):1177-1183 (2001).

Shinskey, "Process Control: As Taught vs. As Practiced," *Ind. Eng. Chem. Res.*, 41:3745-3750 (2002).

Shinskey, "Putting Controllers to the Test," *Chemical Engineering*, pp. 96-106 (Dec. 1990).

Shinskey, Feedback Controllers for the Process Industries, McGraw Hill (1994).

Shridar et al., "A Tuning Strategy for Unconstrained Multivariable Model Predictive Control," *Ind. Eng. Chem. Res.*, 37(10):4003-4016 (1998).

Simon, "Kalman Filtering with State Constraints: How an Optimal Filter Can Get Even Better," pp. 1-41 (Jan. 2008).

Skogestad, "Simple Analytic Rules for Model Reduction and PID Controller Tuning," *J. Process Control*, 13:291 (2003).

Soroush et al., "Analytical Model Predictive Control," *Progress in Systems and Control Theory*, 26:163-179 (2000).

Stanfelj et al., "Monitoring and Diagnosis of Process Control Performance: The Single Loop Case," *Ind. Eng. Chem. Res.*, 32:301-314 (1993).

Takahashi et al., Control and Dynamic Systems, Addison-Wesley (1972).

Theile et al., Acheiving Nonlinear MPC Performance with Neural Network Aided State Update, ISA (2004).

Thiele et al., "Multi Model Adaptive Industrial MPC Controller," Proceedings Control and Applications, 568-059:141-146 (2007).

Thiele et al., Autotuning in Distributed Environment, ISA (1999).

Thiele, Benefits and Challenges of Implementing Model Predictive Control as a Function Block, ISA (2000).

Trierweiler et al., "RPN Tuning Strategy for Model Predictive Control," *J. of Process Control*, 13(7):591-598 (2003).

Wojszins et al., "Evaluating PID Adaptive Techniques for Industrial Implementation," *Proceedings of the American Control Conference*, 2:1151-1155 (2002).

Wojszins et al., "Practical Approach to Tuning MPC," *ISA Transactions*, 42(1):149-162 (2003).

Yoshida, "Health Monitoring Algorithm by the Monte Carlo Filter Based on Non-Gaussian Noise," *Journal of Natural Disaster Science*, 24(2):101-107 (2002).

\* cited by examiner

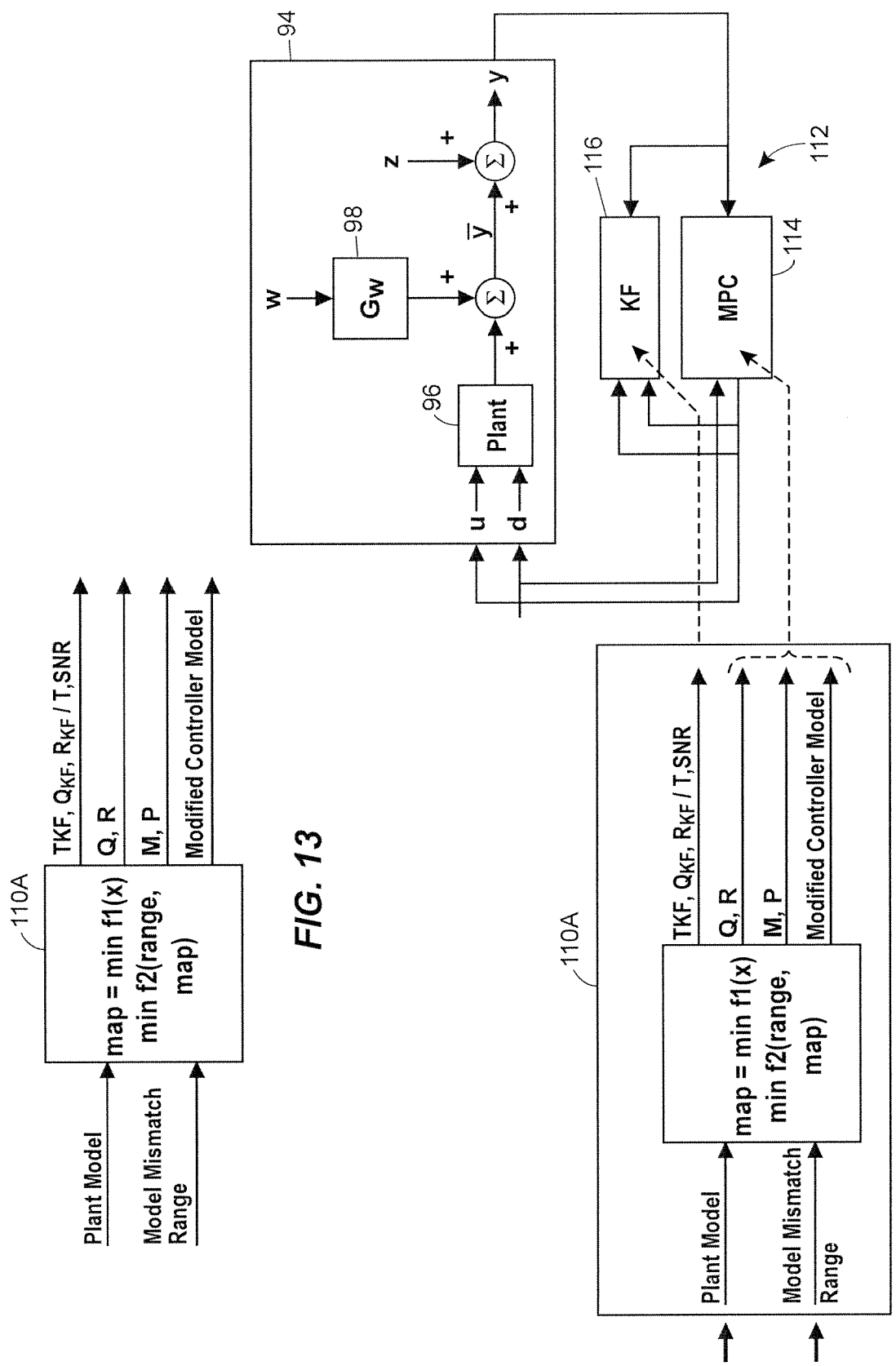

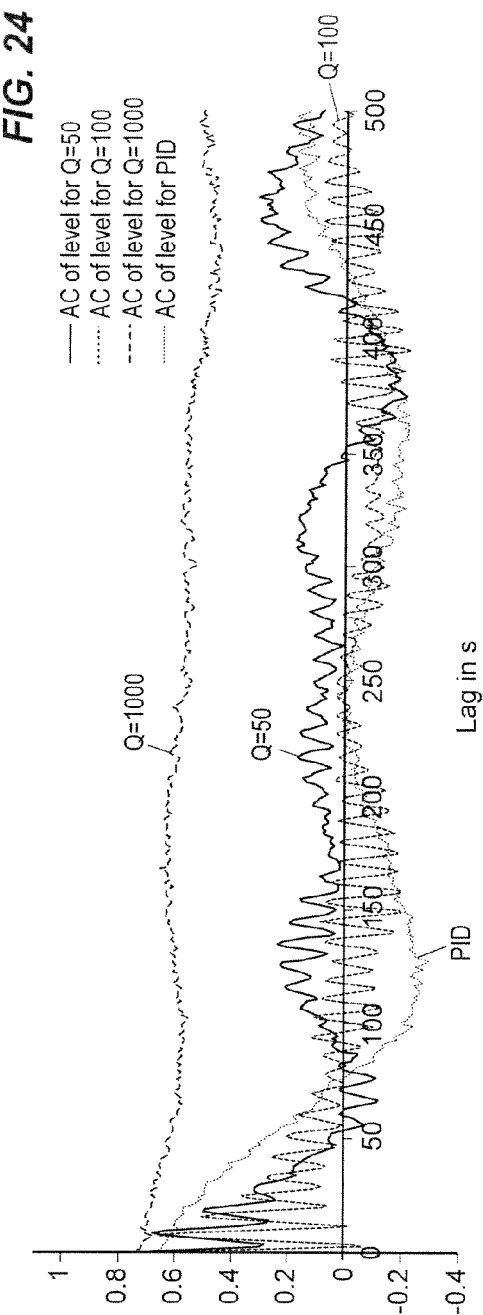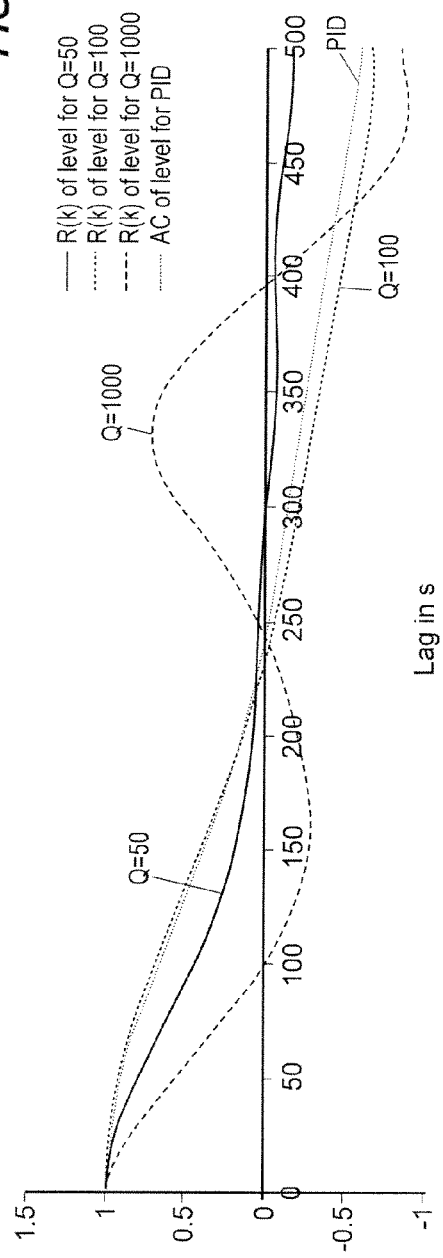

ROBUST ADAPTIVE MODEL PREDICTIVE CONTROLLER WITH TUNING TO COMPENSATE FOR MODEL MISMATCH

RELATED APPLICATIONS

This application is a regularly filed application from, and claims priority to and the benefit of the filing date of U.S. Provisional Patent Application No. 61/025,190, entitled "Robust Adaptive Model Predictive Controller with Automatic Correction for Model Mismatch," which was filed on Jan. 31, 2008, the entire disclosure of which is hereby expressly incorporated by reference herein.

TECHNICAL FIELD

This application relates to process control performed in, for example, an industrial process plant, and, more particularly, relates to an improved method of performing control of a process plant using a model predictive controller in the presence of model mismatch.

DESCRIPTION OF BACKGROUND TECHNOLOGY

Process control hardware and software is a major component of almost all installations of chemical, pharmaceutical and refining industries, and is a multi-billion dollar business worldwide. Although obtaining the best possible control in any particular instance has not always been a major focus in the past, in recent years new plants, such as industrial process plants, are increasingly being designed with controllability and optimizability in mind. Moreover, many existing process plants are being renovated with this objective. This renovation includes not only the renovation of the geometry of the installed hardware, such as the locations of reactors, tanks, pipes, etc., but also renovation of the locations of and types of control, monitoring and measurement elements used to perform process control. With the increasing cost of natural resources and the effective costs associated with emissions, energy consumption has also become a significant factor in plant design.

Control performance monitoring, in combination with controller retuning or model scheduling, can dramatically improve the efficiency of industrial plants and thereby save millions of dollars annually. Another technique that has become increasingly popular in the recent years is abnormal situation monitoring and prevention (ASP). In some cases, modern device and control system designs include novel sensors and embedded statistical algorithms that are able to predict potential failures or upcoming maintenance cycles. These predictive maintenance systems can dramatically increase the uptime of plant operations and prevent costly and dangerous manifestations of unexpected shutdowns. Moreover, the reliability of these techniques has significantly increased in the last decade, leading to increased plant efficiencies.

As part of these efforts, a class of predictive control techniques, generally referred to as model predictive control (MPC) techniques, has gained significant acceptance in the industry since first being developed and applied about 25 years ago. Generally speaking, MPC refers to a class of control algorithms that compute a manipulated variable profile by utilizing a process model (which is typically linear in nature) to optimize a linear or quadratic open-loop performance objective, subject to constraints, over a future time horizon. The first move of this open loop, optimal manipulated variable profile is then implemented within the process, and the procedure is repeated at each control interval or controller cycle to perform process control. Process measurements are used to update the optimization problem during ongoing control. This class of control algorithms is also referred to as receding horizon control or moving horizon control.

However, due to its complexity, MPC has established its place mainly in the advanced control community, and thus MPC configurations are typically developed and commissioned by control experts. As a result, MPC implementations have usually only been worthwhile to apply on processes that promise large profit increases in return for the large cost of implementation. Here, the scale of MPC applications in terms of the number of inputs and outputs has usually been large, which is one reason why MPC has not typically been used in low-level, loop control such as single variable loop control.

More specifically, the commissioning costs of a control system are substantial, and it is rarely practical to pay detailed attention to the configuration of every control loop in a particular process plant. As a result, about 90 percent of all control loops are controlled by traditional linear feedback controllers, such as proportional-integral-derivative (PID) controllers or proportional-integral (PI) controllers. Moreover, to the extent that MPC controllers are used, these controllers are also typically linear in nature. Unfortunately, while linear controllers are predominantly used in the process control industry, the majority of real processes exhibit non-linear behavior. The consequence of this discrepancy is that model mismatch is unavoidable. Unaddressed model mismatch not only results in suboptimal control performance, but also nullifies many of the advantages of the technologies that have been developed to improve control performance and uptime. Model mismatch is therefore not only costly in terms of the control hardware and software, but actually diminishes the cost savings of other related plant technologies.

Generally speaking, the performance of industrial controllers can be measured in various ways, and different processes may have greatly different quality and safety requirements. Plant engineers may in fact use one or many different performance criteria, such as overshoot, arrest time (integrating processes), oscillation characteristics, integrated error and integrated absolute error (IAE) to evaluate the performance of a particular control loop. However, for PID controllers, the measured control performance for a given controller is typically a result of a tradeoff between set point tracking and disturbance rejection behavior, with better performance in set point tracking resulting in worse performance in disturbance rejection, and vice versa. For example, long time constants (i.e., such as those present in lag dominant processes) are known to cause poor disturbance rejection performance in PID controllers that are tuned for set point tracking performance. This tradeoff, which is inherent in the development of PID controllers, can be explained by the fact that a PID controller that is ideally tuned for load disturbance rejection must have a relatively high integral action (i.e., a relatively small integral time constant), and that high integral action is detrimental to the set point change performance of the controller. More particularly, during a set point change, the process error (e) remains large for a period of time even while the controlled variable (y) is approaching the set point (SP). With very large integral gain, the integral term builds up fast, and more than necessary, thus causing set point overshoot. Consequently, PID tuning targeted for set point change performance has smaller integral action and worse load change or disturbance rejection performance. Because traditional PID control, which as noted above, is still the most popular controller choice in all industries, suffers this problem, many approaches have been suggested in an attempt to reduce effects of this issue, including structural modifications to the PID controller and set point filtering.

However, even with these modifications, tuning of PID controllers still presents the challenge of correctly specifying the tradeoff between set point tracking and disturbance rejection performance. Different PID tuning methods typically favor one of set point tracking performance or disturbance rejection performance over the other. Moreover, many model based tuning techniques match the internal parameters of a PID controller to internal parameters of a model for the process being controlled, resulting in this same tradeoff. For example, PID tuning methods such as pole cancellation and lambda tuning match the integral time of the controller to the dominant time constant of the process. Here, the controller gain is set to achieve a certain closed loop time constant and a certain set point change response (e.g. no overshoot). Because the resulting integral action of such controllers is relatively small, this technique exhibits very good set point change performance, but poor disturbance rejection performance. On the other hand, empirical PID tuning methods such as Ziegler-Nichols methods are specifically designed for disturbance rejection performance. However, because the integral action of such controllers is strong enough to return the process variable to the set point very quickly, it leads to undesired set point overshoot in response to set point changes.

In rare occasions, the purpose of a loop is only disturbance rejection (e.g., a buffer tank level with no set point changes) or only set point tracking (e.g., a secondary loop in a cascade strategy with no disturbances). While in those cases, it may be easy to choose a tuning configuration, the aforementioned tradeoff is frequently overlooked entirely and, instead, a default tuning method is typically chosen, making the tuning less than optimal in any particular process situation. As noted above, while numerous tuning methods have been developed to overcome this limitation of PID tuning, including set point filtering and two degree of freedom structures, these tuning methods typically favor disturbance rejection performance, and thus the controller reaction to set point changes is artificially reduced. For example, if set point filtering is chosen, set point changes by the operator are filtered to prevent overshoot, resulting in slower reaction to set point changes.

In any event, a direct outcome of the performance tradeoff discussed above is that different tuning methods have to be chosen for different control objectives, which is one of the reasons why so many tuning methods have been proposed for PID tuning. Another reason for the availability of so many PID tuning techniques is that different tuning rules or methods use different input variables, only some of which may be readily available in any particular process. For example, while many tuning methods calculate tuning based on a process model, other methods calculate tuning based on other process characteristics. As an example of this later method, Ziegler-Nichols tuning rules use critical gain and critical frequency, which may be easy to determine for some mechanical processes, but cannot be practically determined in many industrial chemical processes.

On the other hand, a predictive controller such as an MPC controller should be able to perform similarly for set point changes and load changes because the integral part of an MPC controller does not suffer the same tradeoff as observed for PID controllers. More particularly, MPC controllers generally do not exhibit a performance tradeoff between set point tracking and disturbance rejection because the terms for the error and move penalties are inherently separate, theoretically making MPC controllers a desirable substitute to PID controllers. Also, in a predictive controller, the error (e) does not increase while the controlled variable or process output (y) is approaching the set point. In fact, the error can theoretically be zero after the first execution cycle, thereby decreasing or eliminating the integral gain problems inherent in PID control. Unfortunately, the performance of an MPC controller can fall off rapidly when process model mismatch is present, i.e., when the process model being used by the MPC controller does not perfectly match the actual process characteristics.

Still further, it is known that the disturbance rejection performance of industrial MPC controllers lags behind that of PID controllers when PID controllers are specifically tuned for disturbance rejection. Recent MPC improvements in the area of state update have closed this performance gap somewhat if an observer model used in the MPC technique is assumed to be known perfectly. However, in the presence of model mismatch, the control performance of a PID controller, as measured by the integrated absolute error (IAE), is still better than that of an MPC controller with the best possible tuning.

None-the-less, MPC has been considered as one of the prime control technologies to be used in replacing PID controllers as MPC controllers are believed to be able to combine the benefits of predictive control performance and the convenience of only a few more or less intuitive tuning parameters. However, at the present time, MPC controllers generally have only succeeded in industrial environments where PID control performs poorly or is too difficult to implement or maintain, despite the fact that academia and control system vendors have made significant efforts in recent years to broaden the range of MPC applications. Basically, because PID control still performs better than MPC for a significant number of processes, and because PID controllers are cheaper and faster to deploy than MPC type controllers, MPC controllers have actually replaced only a small fraction of PID controllers within actual process plant configurations.

One of the main reasons why MPC controllers tend to perform worse than PID controllers is that, as indicated above, MPC controllers are more susceptible to performance degradation as a result of process model mismatch more so than PID controllers (except possibly in lag dominant processes). While there are practical ways to address the model mismatch that results from nonlinearities (or other sources) in processes, such as the linearization of the control elements and the transmitters and the use of controller gain scheduling, the most common technique to address model mismatch is to implement controller tuning. Because of the difficulties in tuning controllers, however, process operators or engineers frequently tune a controller for the worst case scenario (e.g. the highest process gain) and accept suboptimal tuning for other regions of the process. The default tuning parameters of an industrial PID or MPC controller are thus typically conservative, so that these tuning parameters can work initially for a variety of process applications. However, controllers are usually left at their default settings indefinitely, resulting in overall poorer performance. Even if this were not the case, the model mismatch that results from identification error or from plant drift is more difficult to address with tuning. In fact, this type of model mismatch is hard to detect because sufficient process perturbation is required to implement model identification, which typically contradicts the objective of process control (i.e., keeping the process at steady state in response to process disturbances). Moreover, it is hard to distinguish process perturbation from unmeasured disturbances.

One method of "tuning" an MPC controller in response to model mismatch is to regenerate the process model in light of process changes and then use this new model within the MPC controller. Unfortunately, there are many practical obstacles to developing an accurate process model for use in model based controllers in the first place. For example, even though many industrial processes are minimum phase, the majority of closed loops are not minimum phase. Time delay, also known as deadtime, and higher order lags create right hand poles which greatly complicates the development of an accurate process model. In most instances, closed loop deadtime is created by transport delay of material in pipes and discrete sampling mechanisms that are unavoidable in computer control systems, while higher order lags are usually a result of filter time constants in measuring and control devices. Other challenges often found in defining process models for industrial plants include resolution and deadband created by the mechanical behavior of valves and packing.

These and other factors present many challenges to control engineers in industrial plants when developing process models for controllers. For example, even if a certain process is expected to act like a first order filter with certain gain and time constant, depending on vessel geometry, the control engineer has to consider additional time constants from transmitters, control elements computer sampling and jitter. In particular, any digital control system has central processing unit (CPU) and communication constraints, which means that ample over-sampling is not practical for all types of loops in a plant. For example, while a sampling rate of three times the largest time constant plus deadtime or five times the deadtime, whichever is larger, is often considered reasonably sufficient, this sampling rate is usually not achievable for many control loops in a plant (such as flow loops and pressure loops). As a result, the engineer can not usually rely solely on the first principle models that may be available for some of the reactions. Moreover, process model identification is ideally performed by integrated automatic tools. However, the first principle modeling and universal third party solutions that are typically used in a real plant to identify a process model do so by connecting directly to the field instruments. These solutions are not therefore integrated because they do not consider (or at best only approximate) the effect of the computer control system itself on loop performance. All of these factors can result in significant mismatch between the process and the process model developed to control the process, making model-based control and tuning methods less desirable in practical situations.

SUMMARY OF THE DISCLOSURE

It has been determined that deficiencies in the feedback control capabilities of MPC controllers are one reason for the performance gap between PID and MPC controllers, especially in the presence of process model mismatch. Recognizing this fact, an MPC adaptation and tuning technique described herein integrates feedback control performance better than methods commonly used today in MPC type controllers, resulting in an MPC adaptation/tuning technique that performs better than traditional MPC techniques in the presence of process model mismatch.

In particular, MPC controller performance is enhanced by adding an adaptation/tuning unit to an MPC controller, which adaptation/tuning unit determines the best or most optimal set of process model, MPC design and/or tuning parameters to use within the MPC controller during on-line process control to improve the disturbance rejection performance of the MPC controller in the presence of a specific amount or a range of model mismatch. More specifically, the adaptation/tuning unit implements an optimization routine that determines one or more MPC controller tuning and design parameters, including for example, an MPC form, penalty factors for either or both of an MPC controller and an observer, such as a Kalman filter, and a controller model for use in the MPC controller, based on a previously determined process model and either a known or an expected process model mismatch or a known or an expected process model mismatch range. This adaptation/tuning unit may be used to adapt and/or tune the MPC controller, either periodically or continuously, to develop an MPC controller with the best overall performance in the presence of the known or expected model mismatch or model mismatch range, all without the need to regenerate the original process model. This method of automatically adapting/tuning an MPC controller thus determines optimal tuning parameters based on model mismatch or model mismatch range to enable the MPC controller to operate optimally in the presence of model mismatch, and can be advantageously used to perform closed loop adaptive control, making it a better choice in many instances than PID control techniques.

Additionally, a method that may be used in, for example, an MPC controller unit, uses an autocorrelation function of a control error and/or a prediction error to determine an estimated magnitude of or a change in the model mismatch between the process model currently used in the MPC controller and the actual process. This estimate may be used to initiate a new adaptation/tuning cycle to update the MPC controller design and tuning parameters to thereby perform better control in the presence of the new amount of model mismatch. This method of detecting model mismatch may be used to determine when a controller is tuned in a manner that makes it more susceptible to process state changes, especially when such state changes are accompanied by a change in the process model, and can therefore be used to modify or retune an MPC controller prior to the occurrence of a process change that the currently tuned MPC controller may not be able to handle well.

BRIEF DESCRIPTION OF THE DRAWINGS

FIG. 13 is a block diagram of an adaptation/tuning block that optimizes an MPC controller based on a process or plant model and a model mismatch range;

FIG. 14 is a block diagram illustrating the application of the adaptation/tuning block of FIG. 13 to MPC control using open loop tuning;

FIG. 24 illustrates a plot of an autocorrelation of control error in the MPC controller at the three different MPC tuning settings (and of a PID controller) when operated during the first steam rate associated with the plot of FIG. 18;

FIG. 25 illustrates a plot of an autocorrelation of control error in the MPC controller at the three different MPC tuning settings (and of a PID controller) when operated during rejection of an unmeasured disturbance associated changing the steam flow rate from the first steam rate to the second steam rate.

DETAILED DESCRIPTION

Generally speaking, a new controller adaptation, design and tuning method is discussed herein that may be applied to various different types of model predictive control (MPC) controllers for use in any desired or appropriate controller setting. However, this new controller adaptation, design and tuning method is particularly useful in control systems used in process plants, such as in industrial process plants, like drug and chemical manufacturing plants, refinery plants, etc. Moreover, while the new MPC controller adaptation, design and tuning technique is described herein as being implemented as part of a distributed process control network, it could also be implemented in other types of control environments including, for example, as a part of a centralized control system, as part of a programmable logic control (PLC) system, as part of a stand-alone control system, etc.

Figure 1:
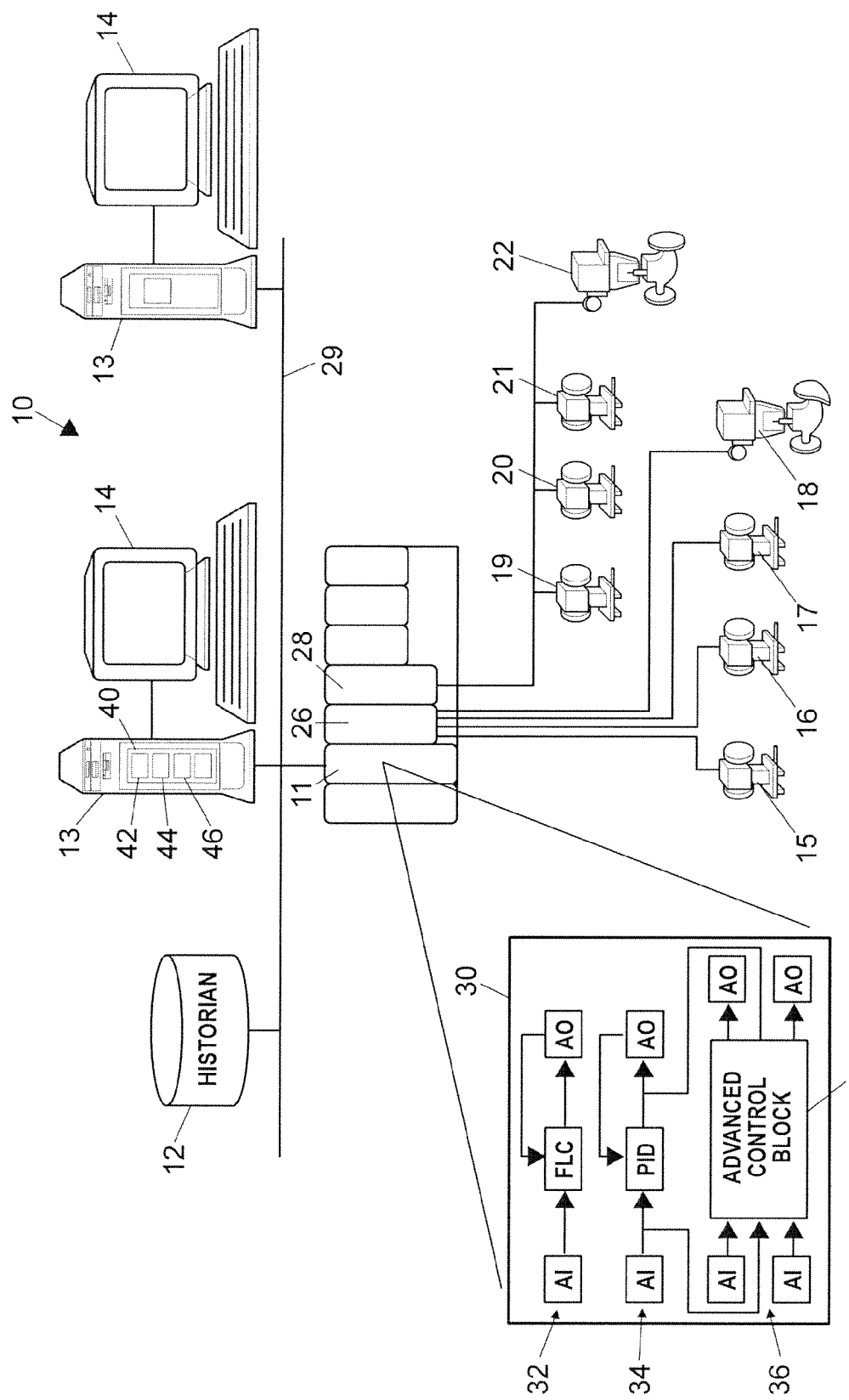
FIG. 1 is a block diagram of a process control system including a control module having an advanced controller function block that implements an MPC controller.

Referring now to FIG. 1, a process control system 10 in which the MPC controller adaptation, design and tuning technique described herein may be implemented includes a process controller 11 communicatively connected to a data historian 12 and to one or more host workstations or computers 13 (which may be any type of personal computers, workstations, etc.), each having a display screen 14. The controller 11 is also connected to field devices 15-22 via input/output (I/O) cards 26 and 28. The data historian 12 may be any desired type of data collection unit having any desired type of memory and any desired or known software, hardware or firmware for storing data and may be separate from (as illustrated in FIG. 1) or a part of one of the workstations 13. The controller 11, which may be, by way of example only, the DeltaV™ controller sold by Emerson Process Management, is communicatively connected to the host computers 13 and the data historian 12 via, for example, an Ethernet connection or any other desired communication network 29. The communication network 29 may be in the form of a local area network (LAN), a wide area network (WAN), a telecommunications network, etc. and may be implemented using hardwired or wireless technology. The controller 11 is communicatively connected to the field devices 15-22 using any desired hardware and software associated with, for example, standard 4-20 ma devices and/or any smart communication protocol such as the FOUNDATION® Fieldbus protocol (Fieldbus), the HART® protocol, the WirelessHART™ protocol, etc.

The field devices 15-22 may be any types of devices, such as sensors, valves, transmitters, positioners, etc. while the I/O cards 26 and 28 may be any types of I/O devices conforming to any desired communication or controller protocol. In the embodiment illustrated in FIG. 1, the field devices 15-18 are standard 4-20 ma devices or HART® devices that communicate over analog lines or combined analog/digital lines to the I/O card 26, while the field devices 19-22 are smart devices, such as Fieldbus field devices, that communicate over a digital bus to the I/O card 28 using Fieldbus protocol communications. Of course, the field devices 15-22 could conform to any other desired standard(s) or protocols, including any standards or protocols that now exist or are developed in the future. Likewise, the communications between the field devices 15-22 could be implemented using wired, wireless or a combination of wired and wireless technology, if so desired.

The controller 11, which may be one of many distributed controllers within the plant 10, has at least one processor therein that implements or oversees one or more process control routines, which may include control loops, stored therein or otherwise associated therewith. The controller 11 also communicates with the devices 15-22, the host computers 13 and the data historian 12 to control a process in any desired manner. It should be noted that any control routines or elements described herein may have parts thereof implemented or executed by different controllers or other devices if so desired. Likewise, the control routines or elements described herein to be implemented within the process control system 10 may take any form, including software, firmware, hardware, etc. For the purpose of this discussion, a process control element can be any part or portion of a process control system including, for example, a routine, a block or a module stored on any computer readable medium so as to be executable by a processor, such as a CPU of a computer device. Control routines, which may be modules or any part of a control procedure such as a subroutine, parts of a subroutine (such as lines of code), etc. may be implemented in any desired software format, such as using ladder logic, sequential function charts, function block diagrams, object oriented programming or any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software, hardware, or firmware programming or design tools. Thus, the controller 11 may be generally configured to implement a control strategy or control routine in any desired manner.

In one embodiment, the controller 11 implements a control strategy using what are commonly referred to as function blocks, wherein each function block is a part of or an object of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, MPC, fuzzy logic, etc. control, or an output function which controls the operation of some device, such as a valve, to perform some physical function within the process control system 10. Of course hybrid and other types of function blocks exist. Function blocks may be stored in and executed by the controller 11, which is typically the case when these function blocks are used for, or are associated with standard 4-20 ma devices and some types of smart field devices such as HART® devices, or may be stored in and implemented by the field devices themselves, which may be the case with FOUNDATION® Fieldbus devices. Still further, function blocks which implement controller routines, such as the controller adaptation and tuning routines or techniques described herein, may be implemented in whole or in part in the host workstations or computers 13 or in any other computer device. While the description of the control system is provided herein using a function block control strategy which uses an object oriented programming paradigm, the control strategy or control loops or modules could also be implemented or designed using other conventions and using any desired programming language or paradigm.

As illustrated by the expanded block 30 of FIG. 1, the controller 11 may include a number of single-loop control routines, illustrated as routines 32 and 34, and may implement one or more advanced control loops, illustrated as a control loop 36. Each such loop is typically referred to as a control module. The single-loop control routines 32 and 34 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other device within the process control system 10. The advanced control loop 36 is illustrated as including an advanced control block 38 having inputs communicatively connected to numerous AI function blocks and outputs communicatively connected to numerous AO function blocks, although the inputs and outputs of the advanced control block 38 may be communicatively connected to any other desired function blocks or control elements to receive other types of inputs and to provide other types of control outputs. Moreover, while the advanced control block 38 is illustrated as implementing multi-variable (e.g., multiple/input multiple/output) control, it could also be used to implement single variable (e.g., single/input single/output) control. As will be described further, the advanced control block 38 may be a control block that integrates a model predictive control (MPC) routine with a controller adaptation/tuning block that provides controller design and tuning parameters to the MPC controller routine to perform control of the process or a portion of the process. While the advanced control block 38 will be described herein as generally including a model predictive control (MPC) block, the advanced control block 38 could actually implement any of many different types of MPC techniques, and can even switch between these techniques in some cases, as will be described in more detail herein. It will be understood that the control modules illustrated in FIG. 1 or sub-components of these modules, including the advanced control block 38 or components thereof, can be executed by the controller 11 or, alternatively, can be located in and executed by any other processing device, such as one of the workstations 13 or even one of the field devices 19-22. For example, in one embodiment, an MPC controller adaptation/tuning block 42 may be stored in and may be executed on the computer 13 to provide MPC controller tuning parameters, design parameters and process model parameters to an MPC controller stored within the advanced control block 38 executed in the controller 11.

As illustrated in FIG. 1, one of the workstations 13 includes an advanced control block generation routine 44 that is used to create, download and implement the advanced control block 38. While the advanced control block generation routine 44 may be stored in a memory within the workstation 13 and executed by a processor therein, this routine (or any part thereof) may additionally or alternatively be stored in and executed by any other device within the process control system 10, if so desired. Still further, a user interface routine 46 may allow a user, such a process operator, a control engineer, etc. to specify or change tuning, design or control parameters associated with the advanced control block 38, to change set points, to initiate an adaptation/tuning procedure performed by the adaptation tuning block 42, to provide new model parameters, to provide model mismatch values or model mismatch range values, etc.

As way of background, many industrial implementations of MPC techniques include model algorithmic control (MAC) techniques and dynamic matrix control (DMC) techniques. DMC technology uses linear step response or impulse response models of the process and, in this case, the optimal control path is pre-calculated off-line and is stored in a large matrix. This controller matrix is then used to compute the on-line moves of the manipulated variables by superposition. As a result, computational cost is reduced drastically in comparison to MPC methods that solve optimal equations on-line. Another advantage of DMC technology is that a state variable used therein is calculated intuitively from the process model, and represents the explicit future output prediction, which means that future predictions of process outputs, such as variables associated with constraints, are readily available and can be displayed to the user.

Other MPC implementations include IDCOM and linear dynamic matrix control (LDMC), which uses a linear objective function and incorporates constraints explicitly, quadratic dynamic matrix control (QDMC), which is an extension of DMC incorporating a quadratic performance function and is explicit in the corporation of constraints, IDCOM-M, which is an extension of IDCOM using a quadratic programming algorithm to replace the iterative solution technique of the original implementation, and Shell multivariable optimizing control (SMOC), which is a state-space implementation. Another class of MPC techniques use a state observer to provide better MPC performance.

Figure 2:
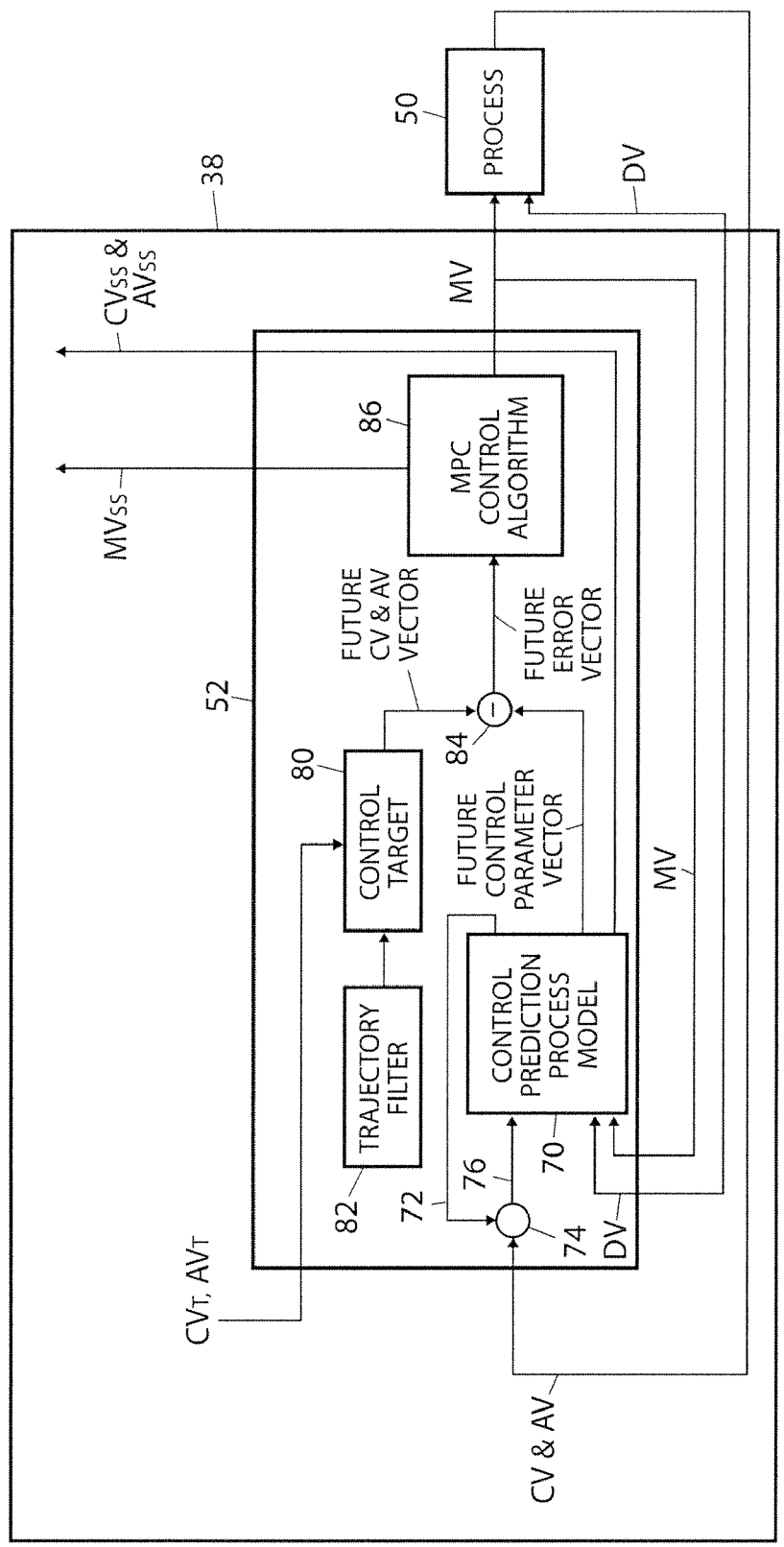
FIG. 2 is a block diagram of a typical MPC controller.

FIG. 2 illustrates a detailed block diagram of one embodiment of a multi-variable MPC controller unit 52 (communicatively coupled to the process 50) that may be implemented by the advanced control block 38 of FIG. 1 to perform multivariable process control. In this case, the MPC controller 52 unit may be used to implement a DMC control technique. However, this discussion provides a good basis for a generalized understanding of MPC control. As shown in FIG. 2, the advanced control block 38 produces a set of manipulated variables (MVs) that are provided to other function blocks which, in turn, are connected to control inputs of the process 50. As illustrated in FIG. 2, the advanced control block 38 includes the MPC controller block 52 which may include or implement any standard MPC routine or procedure, typically having the same number of inputs as outputs, although that requirement is not necessary. The MPC controller 52 receives, as inputs, a set of N controlled variables (CVs) and auxiliary variables (AVs), which typically constitute vectors of values, as measured within the process 50, a set of disturbance variables (DVs), which are known or expected changes or disturbances provided to the process 50 at some time in the future, and a set of steady state target control and auxiliary variables ($CV_T$) and ($AV_T$) provided from, for example, an optimizer (not shown), a user or any other source. The MPC controller 52 uses these inputs to create the set of M manipulated variable (MV) signals in the form of control signals and delivers the manipulated variable signals MV to the control inputs of the process 50, which may be valve actuators, burners, pumps, etc.

Still further, the MPC controller 52 calculates and produces a set of predicted steady state control variables ($CV_{SS}$) and auxiliary variables ($AV_{SS}$) along with a set of predicted steady state manipulated variables ($MV_{SS}$) representing the predicted values of the control variables (CVs), the auxiliary variables (AVs) and the manipulated variables (MVs), respectively, at a control horizon. These variables may be used in one or more MPC optimization routine(s) to develop the target control and auxiliary variables $CV_T$ and $AV_T$ in order to drive the process 50 to an optimal operating state.

No matter how developed, the target control and auxiliary variables $CV_T$ and $AV_T$ are provided as inputs to the MPC controller 52 which, as noted previously, uses these target values $CV_T$ and $AV_T$ to determine a new set of steady state manipulated variables $MV_{SS}$ (over the control horizon) which drives the current control and manipulated variables CV and AV to the target values $CV_T$ and $AV_T$ at the end of the control horizon. Of course, as is known, the MPC controller 52 changes the manipulated variables in steps in an attempt to reach the steady state values for the steady state manipulated variables $MV_{SS}$ which, theoretically, will result in the process obtaining the target control and auxiliary variables $CV_T$ and $AV_T$. Because the MPC controller 52 operates as described above during each process scan, the target values of the manipulated variables may change from scan to scan and, as a result, the MPC controller 52 may never actually reach any particular one of these sets of target manipulated variables MV, especially in the presence of noise, unexpected disturbances, changes in the process 50, etc.

As is known, the MPC controller 52 includes a control prediction process model 70 (also called a "controller model"), which may be any type of model used in any of the various different MPC control techniques. For example, the model 70 may be an N by M+D step response matrix (where N is the number of control variables CV plus the number of auxiliary variables AV, M is the number of manipulated variables MV and D is the number of disturbance variables DV). However, the model 70 may be a first order, a second order, a third order, etc. predictive or first principles model, a state-space model, a convolution process model, or any other type of process model. The controller model 70 may be determined from process upset tests using time series analysis techniques that do not require a significant fundamental modeling effort, or may be determined using any other known process modeling techniques, including those which superimpose one or more sets of linear models or non-linear models. In any event, the control prediction process model 70 produces an output 72 defining a previously calculated prediction for each of the control and auxiliary variables CV and AV and a vector summer 74 subtracts these predicted values for the current time from the actual measured values of the control and auxiliary variables CV and AV to produce an error or correction vector on the input 76. This error is typically referred to as the prediction error.

The control prediction process model 70 then predicts a future control parameter for each of the control variables and auxiliary variables CV and AV over the control horizon based on the disturbance and manipulated variables provided to other inputs of the control prediction process model 70. The control prediction process model 70 also produces the predicted steady state values of the control variables and the auxiliary variables $CV_{SS}$ and $AV_{SS}$ discussed above.

A control target block 80 determines a control target vector for each of the N target control and auxiliary variables $CV_T$ and $AV_T$ provided thereto by the target conversion block 55 using a trajectory filter 82 previously established for the block 38. In particular, the trajectory filter provides a unit vector defining the manner in which control and auxiliary variables are to be driven to their target values over time. The control target block 80 uses this unit vector and the target variables $CV_T$ and $AV_T$ to produce a dynamic control target vector for each of the control and auxiliary variables defining the changes in the target variables $CV_T$ and $AV_T$ over time period defined by the control horizon time. A vector summer 84 then subtracts the future control parameter vector for each of the control and auxiliary variables CV and AV from the dynamic control vectors to define a future error vector for each of the control and auxiliary variables CV and AV. The future error vector for each of the control and auxiliary variables CV and AV is then provided to the MPC algorithm 86 which operates to select the manipulated variable MV steps that minimize the, for example, least squared error or integrated absolute error (IAE), over the control horizon. In some embodiments, the MPC algorithm 86 may use an M by M control matrix developed from relationships between the N control and auxiliary variables input to the MPC controller 52 and the M manipulated variables output by the MPC controller 52 if desired. More particularly, the MPC algorithm 86 has two main objectives. First, the MPC algorithm 86 tries to minimize CV control error with minimal MV moves, within operational constraints and, second, tries to achieve optimal steady state MV values and the target CV values calculated directly from the optimal steady state MV values.

The state equations for a typical model predictive controller may be expressed as:

$$\hat{x}_{k+1} = Ax_k + Bu_k \quad k = 0, 1, 2, \ldots \tag{1}$$

$$\hat{y}_k = C\hat{x}_k \tag{2}$$

$$\min_{u^N} \sum_{j=0}^{\infty} (y_{k+j}^T Q y_{k+j} + u_{k+j}^T R u_{k+j} + \Delta u_{k+j}^T S \Delta u_{k+j}) \tag{3}$$

where Q, R, S are the penalty weights for error, controller move and incremental move, respectively, $x_k$ is the model state matrix, $y_k$ is the process output and $u_k$ is the controller output. Because the Q, R and S penalty vectors are inherently separate, MPC controllers generally do not have a performance tradeoff between set point tracking and disturbance rejection. However, MPC controllers still need to be tuned for a specific multivariable process control objective. While the process model is always matched with the internal structure of an MPC controller (e.g., process state space with the state space MPC formulation), additional tuning parameters determine the behavior with respect to set point change and disturbance rejection.

In particular, the penalty vectors can be used to emphasize one variable over others in accordance with the control objective for the specific process as defined by the end user. If a model mismatch is suspected, the penalty vectors Q and R can also be used to make the controller more robust (i.e., to detune the controller). However, methods such as funnel control or reference trajectory have a more obvious impact on robustness as they effectively filter the error vector, which is why these methods are the preferred means for engineers and operators to tune model predictive controllers in industrial process applications. Because a model predictive controller inherently "matches" the process, the control moves are always optimal for the specific process model. This fact means that the controller can only be detuned (according to physical limitations on the final control elements) and never tuned very aggressively. For example, a valve opening speed can never be infinite and, therefore, the value of R can never realistically be zero. It is known that the disturbance rejection of industrial MPC controllers lags behind that of PID controllers when PID controllers are specifically tuned for disturbance rejection. Recent MPC improvements in the area of state update have closed that performance gap if an observer model which is used in the MPC routine is assumed to be known perfectly. However, in the presence of model mismatch, the control performance (e.g., measured in IAE) of a PID controller is still better than that of an MPC controller with the best possible tuning. None-the-less, MPC techniques with an observer can be used to improve the feedback control performance and typically perform better than DMC techniques in this regard.

Figure 3:
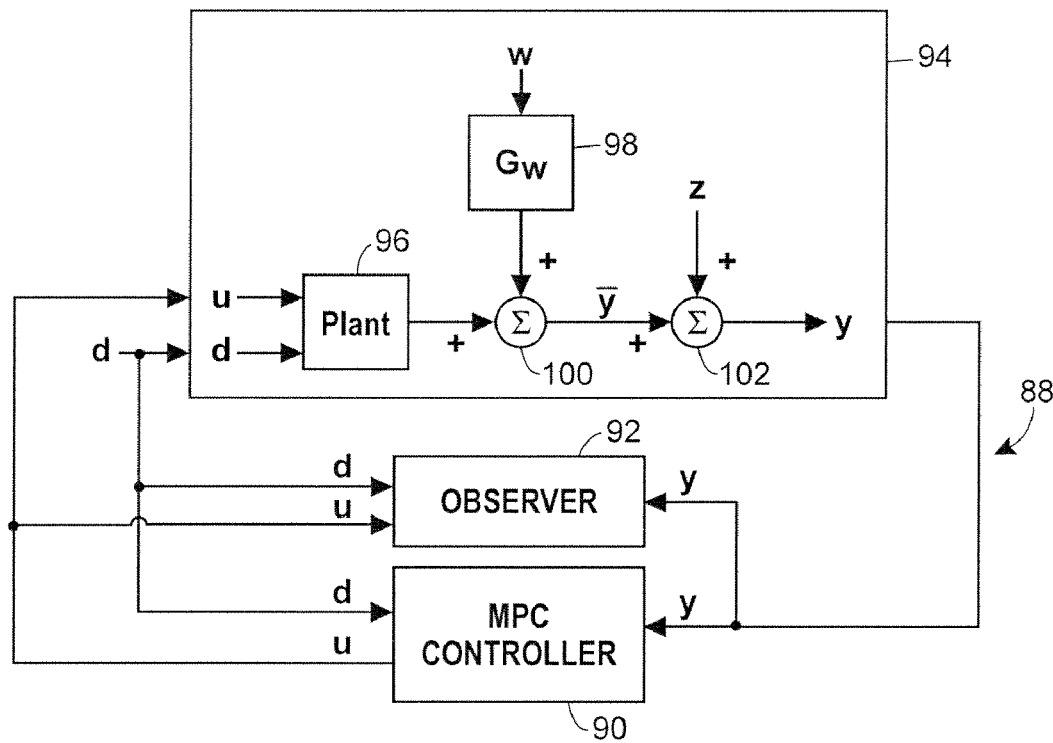
FIG. 3 is a block diagram of a typical MPC controller unit, having an MPC controller and a state observer, connected to control a process plant.

An example of an observer based MPC controller system 88 is illustrated in FIG. 3. Here, the MPC controller system 88 includes an MPC controller 90 and an observer 92 which, in this case, is assumed to be a Kalman filter. The MPC controller 90 provides control signals u to a process plant 94 and to the Kalman filter 92. Moreover, the MPC controller and the Kalman filter 92 receive disturbance inputs d which are also provided to or present in the process plant 94, and receive feedback from the plant 94 in the form of measured controlled variables y. The process plant 94 is illustrated in FIG. 3 in modeled form, wherein the plant 94 includes a plant transfer function 96, which receives the control signals u and the disturbance signals d, and various sources of expected errors or disturbances. In particular, a disturbance and noise model 98 (transfer function $G_w$) receives noise w (which may be white noise for example), and the output of the noise model 98 is added (in a purely theoretical summer 100) to the output of the plant transfer function 96. The output of the summer 100 is added to measurement errors or measurement noise z in another theoretical summer 102 to produce the measured process outputs y.

In this model, the update of the state variable x of a process characterized by a stochastic state-space model can be expressed as:

$$x_{k+1} = Ax_k + Bu^k + w_k \tag{4}$$

$$y_k = Cx_k + n_k \tag{5}$$

for Gaussian distributed process noise $w_k$ and measurement noise $n_k$.

The general objective of state observers, such as the observer 92 of FIG. 3, is to provide an estimate of the internal states of a system based on all measurable system inputs and outputs. In particular, if one of the assumptions of Equations (4) and (5) is that the vectors A, B and C (which model the process) are known exactly, then the observer gains can be computed. The filter formulation developed in the 1960s referred to as the Kalman filter has been the most popular method in process control for estimating internal process states based on noisy or incomplete measurements. For a discrete sampling system that uses the MPC formulation given in Equations (1) to (3), the Kalman filter equation for estimating the next state $x_{k+1}$ is:

$$\hat{x}_{k+1} = A\hat{x}_k + B\hat{u}_k + J(y_k - \hat{y}_k) \tag{6}$$

$$\hat{y}_k = C\hat{x}_k \tag{7}$$

where J is the Kalman filter gain, $\hat{x}_k$ is the state vector with k state variables, $y_k$ is the predicted process output and $\hat{y}_k$ is the actual value of the process output. If covariances for unmeasured disturbances and measurement noise are known, the general Kalman filter stricture can be created by augmenting $G_w$ (disturbance and noise model) to the plant model and then re-computing the MPC controller gain for the augmented model (shown in FIG. 3). The filter gain J can be determined by numerically solving the Riccati equation, where $Q_{KF}$ is the positive semi-definite matrix representing the covariances of the disturbances in w and $R_{KF}$ is the positive definite matrix representing the covariances of the measurement noise z. If the covariances are not known, a simplified version of the Kalman filter can be used. This formulation assumes that the disturbances w are independent and thus each element of the disturbances w affects one (and only one) element of the process outputs y. As a result of this assumption, $Q_{KF}$ and $R_{KF}$, the input and measurement noise covariances, are not required. Instead, this simplification uses a filter time constant $\tau_i$ and an estimate of the signal to noise ratio $SNR_i$ per disturbance to create the disturbance model as follows:

$$G_{W_i}(q) = \frac{1}{q - a_i} \tag{8}$$

where $a_i = e^{-T/\tau_i}$, $0 \leq \tau_i \leq \infty$, and T is the sampling period. As $\tau_i \to 0$, $Gw_i(q)$ approaches a unity gain, while as $\tau_i = \infty$, $G_{wi}$ becomes an integrator. Element i of $\Delta w$ is a stationary white-noise signal with zero mean and standard deviation $\sigma_{wi}$ (where $w_i(k) = w_i(k) - w_i(k-1)$). Element i of z is a stationary white-noise signal with zero mean and standard deviation $\sigma z_i$.

The objective of state update is to find the best possible estimate of the current state variable at every instance of time (i.e., at every scan period of a discrete controller). However, utilizing the best possible state estimate in a well-tuned MPC controller does not necessarily mean that it will lead to the best possible control performance. In particular, the dynamic behavior of the closed loop feedback path of the state update model depends on the observer gain J. However, because the observer gain J is derived from noise covariance (or signal to noise ratio in the case of a simplified Kalman filter formulation), there is no tuning parameter or generic variable that takes the observer transfer function into account. Therefore, closed-loop control performance may be affected in an undesirable (sub-optimal) way. However, it has been determined that the closed loop responses for a large range of J are very similar for a particular controller situation. Thus, it appears that the value of J only has a very small impact on control performance. Surprisingly, this observation holds true for both a perfect model and in the case of model mismatch. In fact, it has been determined that tuning of move penalties and the error penalties within the observer has a much larger impact on control performance both with and without model mismatch and thus these tuning parameters will be used in the tuning discussions provided below.

Although observers improve MPC feedback performance, they still have assumptions that empirically tuned controllers, such as PID controllers, do not have. Still further, any model-based predictive controller with or without a model-based observer will assume that the model is known perfectly, which is almost never the case in actual process plants. Unfortunately, even small model errors can cause large prediction and state update errors leading to poorer controller performance.

As discussed above, tuning parameters for model predictive controllers are commonly used to adjust the controller behavior in a way that is desirable for a particular plant application. For example, a certain desired speed of response may be set by tuning the move penalties R to a certain value. However, the expected behavior that is designed by the commissioning engineer will only occur if the model mismatch is insignificant, which is rarely the case in industrial plants. To account for the apparent model mismatch, practitioners often resort to iterative tuning until the desired behavior can be observed. This process is costly because it is very time-consuming, and may not be optimal because it is difficult to cover all possible control and constraint scenarios on a running plant. Even if this method results in the desired plant behavior for the given model mismatch, the behavior can be expected to change if the magnitude of model mismatch changes. Furthermore, even if the amount of model mismatch and its variation is known, there is no method to derive tuning information from this information.

The MPC adaptation and tuning technique described below uses knowledge of the process model mismatch to determine tuning for optimal control performance in the presence of constant or changing model mismatch. In general, this MPC adaptation and tuning technique implements an optimization criteria based on a particular process model (for example, the process or plant model determined at plant commissioning) and an indication of process model mismatch to develop an optimal set of MPC controller design and tuning parameters which, when used in the MPC controller with the original process model, provide for better or more optimal control. This MPC controller adaptation and tuning technique can be used with many different types of MPC controllers including, for example, MPC controllers with observers (such as Kalman filters), DMC controllers, or any of the other MPC controller types mentioned above. However, for the sake of explanation, the MPC controller adaptation and tuning technique will be described as being applied to determine various design and tuning criteria for an MPC controller with an observer in the form of a Kalman filter. In this case, as will be seen below, the adaptation and tuning technique is able to select the type of Kalman filter to use, the tuning parameters to be used for that type of Kalman filter, as well as tuning parameters to be used in the MPC controller itself. Moreover, in some embodiments, the MPC controller adaptation and tuning technique will develop a new controller model to be used as the prediction model in the MPC controller instead of the originally developed plant model, without needing to reform or re-determine the process model Of course, while two types of Kalman filtering techniques (including a general Kalman filter and a simplified Kalman filter) are discussed as alternative controller forms in the disclosed adaptation/tuning technique described herein, other types of MPC controller forms could be considered in this technique as well or instead of those particularly described below. Furthermore, while specific controller design and tuning parameters are described as being available to be used for the Kalman filters and the MPC controllers, other design and tuning parameters may be used in other embodiments, with these design and tuning parameters being based on the particular MPC controller forms considered by the tuning technique.

The first general principle on which the new MPC controller adaptation and tuning technique relies is that the manner in which tuning parameters influence the behavior of the MPC controller, and thus the closed-loop control performance, depends on the amount of model mismatch present at any given time. In some cases, these relationships can be very significant and/or can even be nonlinear. The new MPC controller adaptation and tuning system described herein, which works well in the presence of model mismatch, includes the potential selection of various different possible MPC design and tuning parameters to determine the MPC controller form and/or design and tuning settings which provide for the most optimal control behavior in the presence of the model mismatch. In one embodiment, the following MPC controller adaptation and tuning technique may select between different forms of an observer based MPC controller, discussed here in the form of an MPC controller with Kalman filtering. However, the selection between other MPC controller forms could be used as well or instead. In the particular embodiment described below, the Kalman filter type (TKF) may be general (i.e., the general Kalman filter) or simplified (the simplified Kalman filter). In this case, design and tuning parameters may be determined for both the MPC controller in the form of a selection of a prediction horizon (P), a control horizon (M), a move penalty (Q) and an error penalty (R). Likewise, tuning parameters may be determined for the Kalman filter which, for a general Kalman filter, may be a covariance of the disturbances in w ($Q_{KF}$), and a covariance of the measurement noise ($R_{KF}$) and, in the case of a simplified Kalman filter, may be a vector of filter time constants $\tau_i$ (T) and a signal to noise ratio (SNR) for each disturbance. These design and tuning parameters are summarized below, with an indication of the type of data that may be used in a computer implementation to specify these parameters.

MPC controller tuning:
P (prediction horizon), integer
M (control horizon), integer
Q (move penalty), float vector
R (error penalty), float vector
Type of Kalman filter (TKF): General or Simplified, Boolean
Kalman filter tuning
General
$Q_{KF}$ (covariance of the disturbances in w), float matrix
$R_{KF}$ (covariance of the measurement noise, z), float matrix
Simplified
T (filter time constants $\tau_i$), float vector
SNR (signal-to-noise ratio for each disturbance), float vector Different implementations of MPC may use additional or different tuning parameters, such as maximum move rate or reference trajectory. However, such parameters are usually intended for specific needs of operators, and the resulting effects may overlap with the above identified parameters. Thus, even though other means of influencing the dynamic behavior of an MPC controller exist, many of the desired process behaviors can be addressed with the parameters described above. Still further, the design/tuning parameters described herein include a controller form parameter (i.e., TFK), which in this case particularly specifies a form of the MPC controller as being one of two different types of observer based MPC controllers (i.e., as being one of a general Kalman filter or a simplified Kalman filter form). However, the controller form parameter could specify controllers of different forms, such as between an observer based controller form and a non-observer based controller form, between a DMC controller and a MAC controller, etc.

Figure 4:
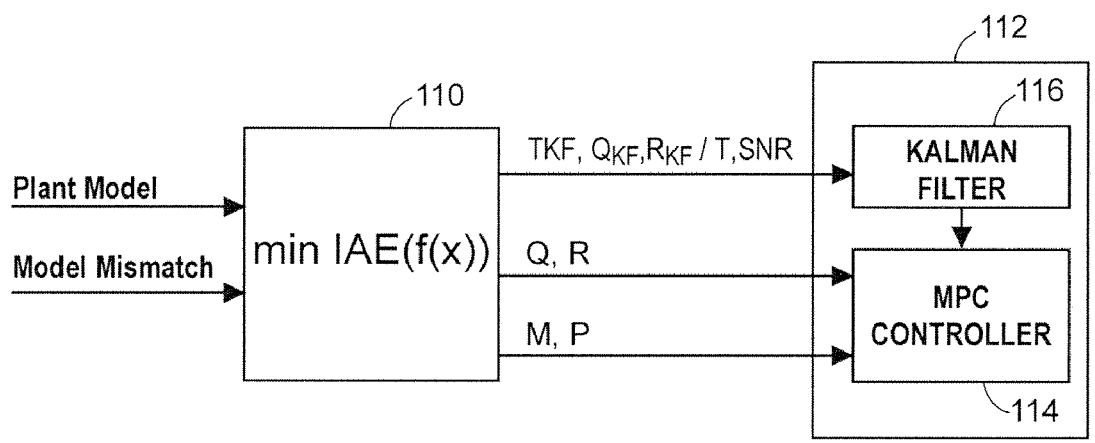
FIG. 4 is a schematic diagram of an adaptation/tuning block coupled to an MPC controller unit to determine MPC design and tuning parameters based on a process model and a model mismatch in one or more process model parameters.

Because model mismatch and the tuning parameters are highly correlated with respect to the closed-loop control performance, the MPC controller adaptation and tuning technique can be characterized as an optimization problem with constraints which can be solved to determine an optimal set of MPC controller design and tuning parameters in the presence of model mismatch. FIG. 4 illustrates a configuration which implements and solves this optimization problem to develop and provide either or both design and tuning parameters to an MPC controller. In particular, an optimization block 110 of FIG. 4 determines ideal or optimal design and tuning parameters for use in an MPC controller unit 112, having an MPC controller 114 coupled to an observer in the form of a Kalman filter 106, based on knowledge of the process model used in the MPC controller 114 and the amount of model mismatch. Here, the MPC controller 114 and the Kalman filter 116 may be the controller 90 and the observer 92, respectively, discussed above with respect to FIG. 3.

The optimization block 110 of FIG. 4 accepts, as inputs, the process model originally developed for the plant and that probably being used by the MPC controller (indicated as the "Plant Model") and an indication of the model mismatch present. The amount of model mismatch that is present may be input by a user via, for example, the user input routine 46 of FIG. 1, or may be determined in other manners such as those described below. Based on these inputs, the optimization block 110 determines the ideal or best suited MPC controller type or form to use (from the available types being considered) as well as the specific design parameters and controller and filter tuning parameters to use for the determined MPC controller type in view of the particular process model and model mismatch present. Thus, as illustrated by the top line exiting the optimization block 110 of FIG. 4, the optimization block 110 determines the type of Kalman filtering technique to use in the MPC controller unit 112 (identified as TKF), and the tuning parameters to use for this MPC controller type (identified as $Q_{KF}$ and $R_{KF}$ if the TKF is a general Kalman filter or T and SNR if TKF is a simplified Kalman filter). The block 110 provides these design and tuning parameters to the Kalman filter 116. Moreover, the optimization block 110 determines, as part of the optimization, a set of design and tuning parameters to be used by the MPC controller 114, these parameters being identified in FIG. 4 as the M and P (design parameters) and the Q and R (tuning parameters). These parameters are shown as being output by the optimization block 110 on the lower two lines exiting the block 110. Generally speaking, the design and tuning parameters determined by the optimization block 110 are those which minimize an objective function stored in and executed by the optimization block 110 (within constraints provided to the objective function) identifying the best controller performance in view of the process or plant model and the model mismatch present. Importantly, the optimization block 110 of FIG. 4 develops, based on the objective function thereof, values of a set of MPC design and tuning parameters for use in the MPC controller unit 112, which design and tuning parameters result in the best possible or most ideal control given the current process or plant model and model mismatch, without require altering or regenerating the plant model itself.

In one embodiment, the optimization block 110 uses an objective function which attempts to minimize the integrated absolute error (IAE) of a function f(x) (the objective function) over the settling time. However, this optimization could be determined over a moving horizon such as the control horizon or the prediction horizon of the MPC controller, or other time periods if so desired. Of course, any number of different objective functions could be used, and these objective functions could be implemented to determine the minimum IAE or some other measure, such as least squared error, integrated error, variability, standard deviation, etc., to evaluate optimal control performance. Still further, constraints may be added to the optimization algorithm to address physical and logical boundaries in an arbitrary manner, so as to prevent the optimization block 110 from specifying a controller design or a set of tuning parameters which causes violation of some process or control constraint. Typically, however, the exact value of the constraints influences only the range of the calculations, and not the overall result.

In one particular embodiment, the optimization calculation performed by the optimization block 110 of FIG. 4 may implement the following objective function:

$$\min IAE\left(\Gamma, \Xi, \frac{\Xi}{\hat{\Xi}}\right) \quad (9)$$

subject to: $g(\Gamma) \geq 0$

Where $\Gamma$ is the set of design and tuning parameters (which in this example may be $[P,M,Q,R,TKF,Q_{KF},R_{KF},T,SNR]^T$), $\Xi$ is the process or plant model (which in this example may be = $[(G, \tau_1, \tau_2]^T)$, $$\frac{\Xi}{\hat{\Xi}}$$

is the process model mismatch in one or more process model parameters, and g(Γ) defines the computational constraints describing, for example, computational limits of the control algorithm, process limits, etc. Here, G is the process model gain parameter and $\tau_1$, $\tau_2$ are the first and second order time constant parameters of the process model. Of course, IAE is the integrated absolute error which is used as the control performance measure, and may be calculated as:

$$IAE = \int_0^\infty |y(t) - SP(t)| \, dt \quad (10)$$

where y(t) is the controlled process output variable and SP(t) is the operator set point for that controlled output variable.

Basically, the optimization block 110 of FIG. 4 simulates operation of the MPC controller when the controller is designed using the original process model but is operated in the presence the process model mismatch, and performs this simulation for each of a plurality of different sets of controller design/tuning parameters (for a particular model mismatch) to determine a controller performance measure (e.g., IAE) for each of the plurality of different sets of controller design/ tuning parameters at the particular model mismatch. In one example, the optimization block 110 computes the expected process error (in the form of IAE) that results from the use of each of a set of various possible combinations of different values of the tuning parameters (for both the MPC controller and the Kalman filter) for the different possible MPC controller forms (e.g., the possible Kalman filter types) based on the process model and the expected or observed model mismatch.

The optimization block 110 then determines the particular set of the design and/or tuning parameters that results in the lowest IAE (i.e., the best performance) in view of the process model mismatch, and thereby determines an optimal one of the sets of the controller design/tuning parameters for use in the model predictive controller based on the controller performance measures. These design and tuning parameters may then be used in the MPC controller unit 112 of FIG. 4 to perform better or more optimal control in the presence of that amount of model mismatch, without changing the controller model used by the MPC controller 114 and certainly without needing to reform or regenerate the plant model itself.

Figure 5:
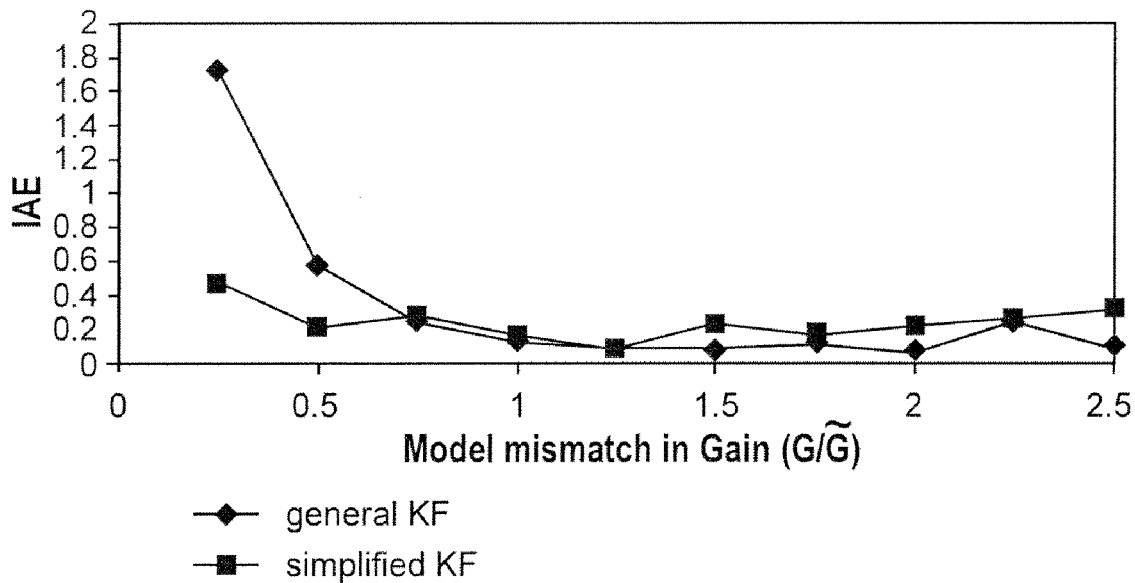
FIG. 5 is an example plot of the minimum integrated absolute error associated with determining optimal tuning in the presence of model mismatch in a process gain parameter of a process model.

To illustrate the operation of the optimization block 110 in more detail, FIG. 5 provides a plot depicting the best possible IAE (i.e., minimum IAE) for a given amount of model mismatch in process model gain, which plot was obtained by solving the optimization of Equation (9) for different values of model mismatch for both an MPC controller with a general Kalman filter and one with a simplified Kalman filter. The detailed optimization results are shown in Table 1 below, in which IAE values associated with active constraints, i.e., where a tuning parameter was held at a constraint, are shown having a preceding asterisk. Moreover, model mismatch is expressed as a ratio of the actual process gain K to the modeled or expected process gain $\tilde{K}$ (i.e., $K/\tilde{K}$). Because this implementation is one in which the MPC controller unit 112 being used is a single-input/single-output controller, instead of as a multi-variable controller, the MPC controller tuning parameter Q was set to 1 and only the MPC controller tuning parameter R was allowed to change. This mathematical operation can be performed because, in a single loop MPC implementation, only the ratio of Q and R is determinative of the tuning.

TABLE 1

| | General Kalman Filter | | | | | | Simplified Kalman filter | | | | | |
|---|---|---|---|---|---|---|---|---|---|---|---|---|
| Model Mismatch | IAE | R | P | M | $Q_{KF}$ | $R_{KF}$ | IAE | R | P | M | T | SNR |
| 0.25 | 1.729 | *0.0001 | *3 | *1 | *1 | *0.001 | 0.478 | *0.0001 | *3 | *1 | 73.5067 | 30.0714 |
| 0.5 | 0.574 | *0.0001 | *3 | *1 | *1 | *0.001 | 0.215 | *0.0001 | *3 | *1 | *100 | 30.0916 |
| 0.75 | 0.236 | *0.0001 | *3 | *1 | *1 | *0.001 | 0.285 | *0.0001 | *3 | *1 | 20.3385 | 30.0104 |
| 1 | 0.123 | *0.0001 | *3 | *1 | *1 | *0.001 | 0.162 | *0.0001 | *4 | *1 | *100 | 30.0824 |
| 1.25 | 0.087 | *0.0001 | *3 | *1 | *1 | *0.001 | 0.085 | *0.0001 | *3 | *1 | *100 | 30.0788 |
| 1.5 | 0.081 | *0.0001 | *3 | *1 | *1 | *0.001 | 0.229 | *0.0001 | *3 | *1 | 12.6669 | 30.0055 |
| 1.75 | 0.107 | *0.0001 | *3 | *1 | 0.9946 | 0.0033 | 0.166 | 0.0095 | 15 | 6 | *100 | 30.0943 |
| 2 | 0.062 | *0.0001 | 12 | 6 | *1 | 0.0023 | 0.217 | 0.024 | 50 | 10 | 76.3204 | 30.1224 |
| 2.25 | 0.241 | *0.0001 | 3 | *1 | *1 | 0.0898 | 0.267 | 0.0424 | 23 | 19 | *100 | 30.048 |
| 2.5 | 0.087 | *0.0001 | 26 | 6 | 0.9974 | 0.0099 | 0.32 | 0.0769 | 15 | 16 | *100 | 30.2111 |
| 2.75 | 0.099 | *0.0001 | 27 | 6 | 0.9501 | 0.0182 | 18.182 | *0.01 | 27 | 11 | 10 | 30 |
| 3 | 0.111 | *0.0001 | 27 | 6 | 0.966 | 0.0312 | 16.667 | *0.01 | 27 | 11 | 10 | 30 |
| 3.25 | 0.123 | *0.0001 | 28 | 6 | 0.9355 | 0.047 | 15.385 | *0.01 | 27 | 11 | 10 | 30 |
| 3.5 | 0.135 | *0.0001 | 27 | 6 | 0.9981 | 0.0728 | 14.286 | *0.01 | 27 | 11 | 10 | 30 |

From Table 1, it can be seen that the optimizer block 110 makes use of all of the possible tuning parameters to achieve the optimal control performance as defined by the minimum IAE found for any particular model mismatch. Interestingly, the optimizer 110 determines different tuning parameters for different values of model mismatch that result in fairly similar control performance, as long as no constraint is reached. When a constraint is reached, the control performance typically suffers because the optimizer block 110 runs out of degrees of freedom (i.e., tuning parameters) to compensate for model mismatch. Also, as can be seen from Table 1, MPC with general Kalman filtering outperforms MPC with simplified Kalman filtering if the mismatch in process gain K is such that $K > \tilde{K}$, where K is the actual process gain and $\tilde{K}$ is the modeled or expected process gain. However, MPC with simplified Kalman filtering outperforms MPC with general Kalman filtering if the mismatch in process gain is such that K<$\tilde{K}$. Of course, the general Kalman filtering formulation is more rigorous than that of the simplified Kalman filtering technique, which uses exponentially weighted moving average (EWMA) filtering to update the state variable. Thus, the simplified Kalman filtering technique cannot be tuned to deal with greater than expected gain very well, but excels with smaller than expected gain. In other words, because MPC with simplified Kalman filtering is based on filtering, it is more robust than MPC with general Kalman filtering if the process response has a smaller than expected magnitude (i.e., if K<$\tilde{K}$). However, for K>$\tilde{K}$, MPC with simplified Kalman filtering produces a slightly higher integrated absolute error than MPC with general Kalman filtering.

Figure 6:
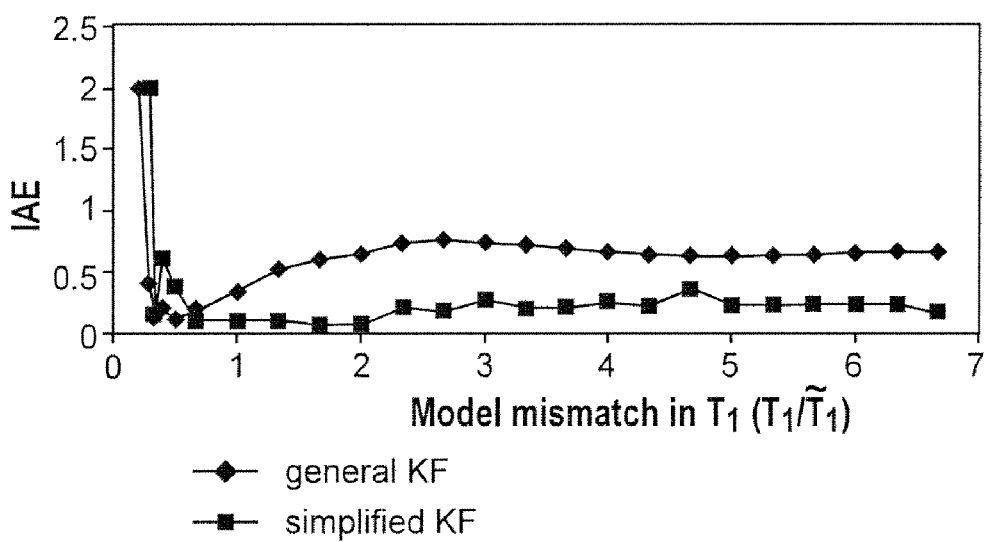
FIG. 6 is an example plot of the minimum obtainable integrated absolute error associated with determining optimal tuning in the presence of model mismatch in a first order time constant of a process model.

If the model mismatch is attributed to or is present in the first order time constant ($\tau_1$), the difference in integrated absolute error between the two Kalman filtering methods becomes more pronounced. As illustrated in FIG. 6 and Table 2 below, if the process is more responsive than expected (i.e., $\tau_1 < \tilde{\tau}_1$, where $\tau_1$ is the actual first order time constant and $\tilde{\tau}_1$ is the first order time constant associated with the process model), the IAE rises with a very steep slope because oscillation occurs. Both methods of Kalman filtering are affected similarly by oscillation, and an automatic method for optimal control in the presence of constant or varying model mismatch should try to avoid oscillation by all means. However, if the process reacts slower than expected (i.e., $\tau_1 > \tilde{\tau}_1$), MPC with simplified Kalman filtering performs significantly better, which means that general Kalman filtering, although stable, should not be used in this scenario. Because the simplified Kalman filter formulation uses a filter time constant as one of the tuning parameters, an optimization method can easily use this tuning parameter to compensate for time constant mismatch between the plant model and the actual plant characteristics. This compensation can easily be observed in the values of Table 2 (again in which values associated with active constraints are shown as having a preceding asterisk). While the general Kalman filter tuning parameters are fixed at the constraints and only the MPC controller tuning parameters are still allowed to move, the T parameter of the simplified Kalman filter moves over a wide range and compensates for the model mismatch, thereby keeping the IAE at a very low level. Of course, as indicated above, the Kalman filter type is specifically provided as a Boolean output of the optimization method described in FIG. 4, and this output causes the Kalman filter 116 of FIG. 4 to switch between the use of simplified Kalman filtering and general Kalman filtering.

TABLE 2

| Model Mismatch | General Kalman Filter | | | | | | Simplified Kalman Filter | | | | | |
|---|---|---|---|---|---|---|---|---|---|---|---|---|
| | IAE | R | P | M | $Q_{KF}$ | $R_{KF}$ | IAE | R | P | M | T | SNR |
| 0.2 | 2 | 0.01 | 27 | 11 | *1 | 0.2 | 2 | 0.01 | 27 | 11 | 10 | 30 |
| 0.3 | 0.385 | *0.0001 | 29 | 6 | 0.8569 | 0.0382 | 2 | 0.01 | 27 | 11 | 10 | 30 |
| 0.33 | 0.115 | *0.0001 | *3 | *1 | *1 | *0.001 | 0.162 | *0.0001 | 4 | *1 | *100 | 27.7497 |
| 0.4 | 0.204 | *0.0001 | 26 | 6 | 0.9962 | 0.0087 | 0.616 | 0.0466 | 13 | 12 | *100 | 30.0587 |
| 0.5 | 0.119 | *0.0001 | 12 | 6 | 0.9998 | 0.0021 | 0.379 | 0.021 | *50 | 8 | 71.2241 | 30.3909 |
| 0.67 | 0.184 | *0.0001 | *3 | *1 | *1 | *0.001 | 0.107 | *0.0001 | *3 | *1 | *100 | 30.0912 |
| 1 | 0.353 | *0.0001 | *3 | *1 | *1 | *0.001 | 0.107 | *0.0001 | *3 | *1 | *100 | 30.0908 |
| 1.33 | 0.525 | *0.0001 | *3 | *1 | *1 | *0.001 | 0.11 | *0.0001 | *3 | *1 | 96.8561 | 30.0866 |
| 1.67 | 0.604 | *0.0001 | *3 | *1 | 0.995 | *0.001 | 0.074 | *0.0002 | *3 | 6 | 72.0456 | 30.0819 |
| 2 | 0.649 | *0.0001 | *3 | *1 | *1 | *0.001 | 0.087 | *0.0001 | 25 | 6 | 63.5498 | 30.0362 |
| 2.33 | 0.732 | *0.0001 | *3 | *1 | *1 | *0.001 | 0.216 | 0.0001 | *3 | *1 | 20.2442 | 30.0104 |
| 2.67 | 0.775 | *0.0001 | *3 | *1 | *1 | *0.001 | 0.177 | 0.0001 | *3 | *1 | 50.0787 | 30.0427 |
| 3 | 0.746 | *0.0001 | *3 | *1 | *1 | 0.0026 | 0.267 | 0.0001 | *3 | *1 | 15.5521 | 30.0056 |
| 3.33 | 0.72 | *0.0001 | *3 | *1 | 0.9959 | 0.0018 | 0.205 | 0.0001 | *3 | *1 | 32.8161 | 30.0227 |
| 3.67 | 0.695 | *0.0001 | *3 | *1 | *1 | 0.0016 | 0.215 | *0.0001 | *3 | *1 | 27.6865 | 30.0514 |
| 4 | 0.672 | *0.0001 | *3 | *1 | *1 | *0.001 | 0.264 | *0.0001 | *3 | *1 | 15.3896 | 30.0051 |
| 4.33 | 0.648 | *0.0001 | *3 | *1 | *1 | *0.001 | 0.226 | *0.0001 | *3 | *1 | 24.2112 | 30.0134 |
| 4.67 | 0.636 | *0.0001 | *3 | *1 | *1 | *0.001 | 0.365 | *0.0001 | *3 | *1 | 10.0974 | 30.0001 |
| 5 | 0.632 | *0.0001 | *3 | *1 | *1 | *0.001 | 0.231 | 0.0001 | *3 | *1 | 22.9775 | 30.0294 |
| 5.33 | 0.639 | *0.0001 | *3 | *1 | *1 | *0.001 | 0.234 | 0.0001 | *3 | *1 | 22.5373 | 30.0165 |
| 5.67 | 0.652 | *0.0001 | *3 | *1 | *1 | *0.001 | 0.238 | 0.0001 | *3 | *1 | 24.6466 | 30.0142 |
| 6 | 0.663 | *0.0001 | *3 | *1 | *1 | *0.001 | 0.243 | 0.0001 | *3 | *1 | 22.5032 | 30.0125 |
| 6.33 | 0.667 | *0.0001 | *3 | *1 | *1 | *0.001 | 0.248 | 0.0001 | *3 | *1 | 21.2021 | 30.0126 |
| 6.67 | 0.665 | *0.0001 | *3 | *1 | *1 | *0.001 | 0.168 | 0.0001 | 12 | 20 | 26.4552 | 30.4974 |

As can also be seen from Table 2 and FIG. 6, the minimal possible IAE lies to the left (in the plot of FIG. 6) of $\tau_1 = \tilde{\tau}_1$ (i.e., where the model mismatch ratio=1) for the general Kalman filter. If the first order time constant of the actual process changes to about half the value that the MPC controller and general Kalman filter were designed for ($\tau_1 \sim 0.5\tilde{\tau}$), the IAE decreases, which means that the recommended tuning for the Kalman filter gain J does not yield the best possible control performance. This situation occurs because the controller optimization problem performed within the MPC controller is designed to minimize static error while minimizing moves, while the adaptation/tuning optimization problem is designed to minimize the IAE of the controlled variable error, thereby maximizing control performance directly.

Figure 7:
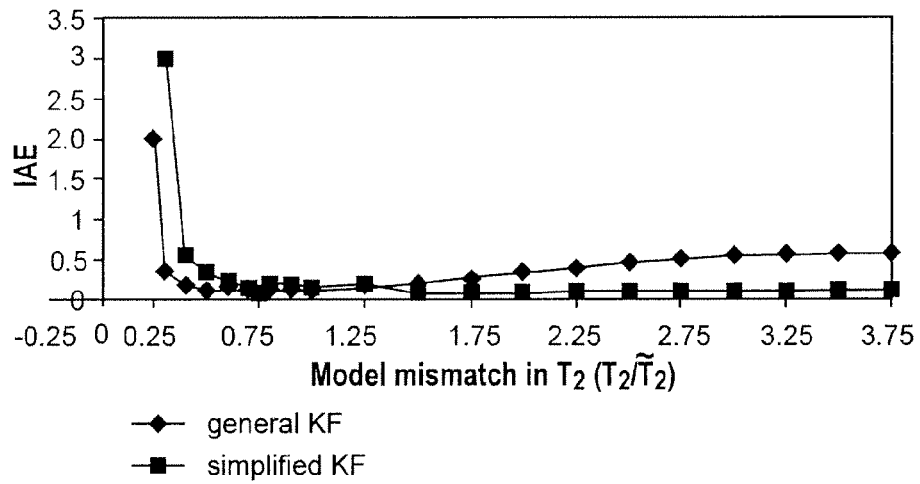
FIG. 7 is an example plot of the minimum obtainable integrated absolute error associated with determining optimal tuning in the presence of model mismatch in a second order time constant of a process model.

The effect of model mismatch in the second order time constant ($\tau_2$) is illustrated in FIG. 7 and is provided in Table 3 below, and is very similar to that of model mismatch in the first order time constant ($\tau_1$) depicted above. While the magnitude of the differences between general and simplified Kalman filters is smaller, the trend is basically the same.

TABLE 3

| Model Mismatch | General Kalman Filter | | | | | | Simplified Kalman Filter | | | | | |
|---|---|---|---|---|---|---|---|---|---|---|---|---|
| | IAE | R | P | M | $Q_{KF}$ | $R_{KF}$ | IAE | R | P | M | T | SN |
| 0.25 | 2 | 1.5182 | 44 | 6 | *1 | *0.001 | 3 | 0.01 | 27 | 11 | 10 | 30 |
| 0.3 | 0.37 | *0.0001 | 28 | 6 | 0.9454 | 0.0382 | 3 | 0.01 | 27 | 11 | 10 | 30 |
| 0.4 | 0.199 | *0.0001 | 30 | 6 | 0.996 | 0.0082 | 0.567 | 0.0404 | 12 | 12 | 85.7026 | 30.1881 |
| 0.5 | 0.116 | *0.0001 | 13 | 6 | 0.9971 | 0.0018 | 0.367 | 0.0176 | 29 | 8 | *100 | 30.434 |
| 0.6 | 0.151 | *0.0001 | *3 | *1 | 0.9918 | 0.0018 | 0.234 | 0.007 | 32 | 6 | 89.8552 | 30.1182 |
| 0.7 | 0.112 | *0.0001 | *3 | *1 | *1 | *0.001 | 0.161 | *0.0001 | 4 | 1 | *100 | 30.0948 |
| 0.75 | 0.11 | *0.0001 | *3 | *1 | *1 | *0.001 | 0.107 | *0.0001 | *3 | *1 | *100 | 30.0913 |
| 0.8 | 0.11 | *0.0001 | *3 | *1 | *1 | *0.001 | 0.215 | *0.0001 | *3 | *1 | 20.2633 | 30.0103 |
| 0.9 | 0.112 | *0.0001 | *3 | *1 | *1 | *0.001 | 0.215 | *0.0001 | *3 | *1 | 20.2576 | 30.0103 |
| 1 | 0.123 | *0.0001 | *3 | *1 | *1 | *0.001 | 0.162 | *0.0001 | 4 | *1 | *100 | 30.0824 |
| 1.25 | 0.169 | *0.0001 | *3 | *1 | *1 | *0.001 | 0.215 | *0.0001 | *3 | *1 | 20.2556 | 30.0103 |
| 1.5 | 0.229 | *0.0001 | *3 | *1 | *1 | *0.001 | 0.107 | *0.0001 | *3 | *1 | *100 | 30.0911 |
| 1.75 | 0.294 | *0.0001 | *3 | *1 | *1 | *0.001 | 0.107 | *0.0001 | *3 | *1 | *100 | 30.0912 |
| 2 | 0.353 | *0.0001 | *3 | *1 | *1 | *0.001 | 0.107 | *0.0001 | *3 | *1 | *100 | 30.0908 |
| 2.25 | 0.412 | *0.0001 | *3 | *1 | *1 | *0.001 | 0.108 | *0.0001 | *3 | *1 | *100 | 30.0908 |
| 2.5 | 0.478 | *0.0001 | *3 | *1 | *1 | *0.001 | 0.109 | *0.0001 | *3 | *1 | *100 | 30.0908 |
| 2.75 | 0.527 | *0.0001 | *3 | *1 | *1 | *0.001 | 0.111 | *0.0001 | *3 | *1 | 81.9354 | 30.0729 |
| 3 | 0.559 | *0.0001 | *3 | *1 | *1 | *0.001 | 0.116 | *0.0001 | *3 | *1 | 71.5816 | 30.0626 |
| 3.25 | 0.577 | *0.0001 | *3 | *1 | *1 | 0.0011 | 0.122 | *0.0001 | *3 | *1 | 74.8502 | 30.0667 |
| 3.5 | 0.591 | *0.0001 | *3 | *1 | *1 | *0.001 | 0.128 | *0.0001 | *3 | *1 | 62.3478 | 30.0663 |
| 3.75 | 0.605 | *0.0001 | *3 | *1 | *1 | *0.001 | 0.134 | *0.0001 | *3 | *1 | 58.3664 | 30.0445 |

While the optimal tuning parameters for MPC control and state update are determined above from knowledge about the plant model and model mismatch using optimization, the impact of model mismatch and the optimal controller design and tuning used to compensate for this mismatch were analyzed for each model parameter separately in the above examples. In a real plant scenario, all of the process model parameters that correspond to a prescribed model (and others that are not modeled for various reasons) may, and probably will vary simultaneously. Which model parameter is most affected depends mainly on process type and cause of model mismatch (e.g., tube fouling, varying heat coefficient of fuel, etc.) Still further, depending on the model identification method used, a model mismatch in lead time constant, for example, may be interpreted as model mismatch in model deadtime or time constant. Thus, one or two model parameters often contribute significantly to model mismatch simultaneously. As a result, it is advantageous to analyze model mismatch in a multidimensional space to determine the best set of model parameters to use in any particular case, instead of a one dimension space as performed in the examples above. That is, instead of determining an optimal set of design and tuning parameters for a mismatch in one process model parameter, it is advantageous to determine an optimal set of design and tuning parameters for the situation in which there are simultaneous mismatches in multiple process model parameters (e.g., in two or more of process gain, first order time constant and second order time constant).

Figure 8:
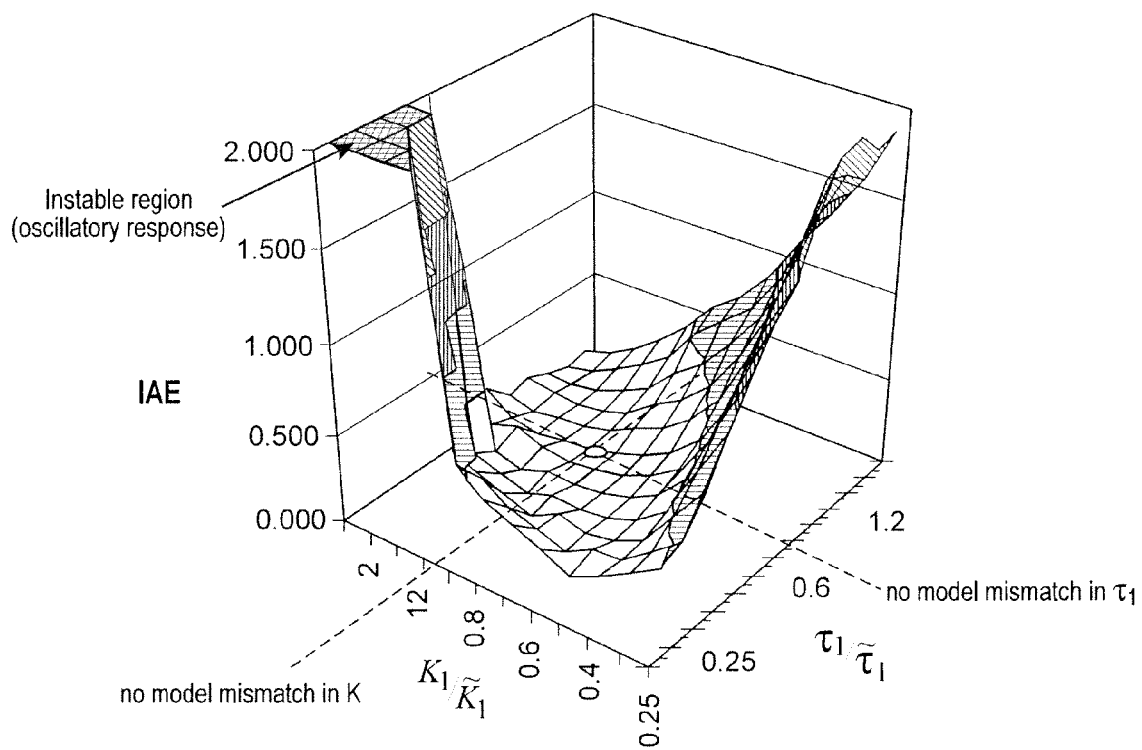
FIG. 8 depicts a three-dimensional surface plot of the best possible integrated absolute error as calculated by the adaptation/tuning block of FIG. 4 for model mismatch in two process model parameters of an MPC controller with general Kalman filter state update.

FIG. 8 depicts a surface plot of best possible IAE in a simulated MPC controller using a general Kalman filter state update technique, as calculated by the optimization method of FIG. 4 when allowing process model mismatch in two dimensions, i.e., in which both the process gain K and the first order time constant $\tau_1$ were allowed to simultaneously have model mismatch. In this case, the optimal tuning for model mismatch in first order time constant and second order time constant are very similar, with the first order time constant being more significant. Because a three-dimensional visualization is preferred to a four-dimensional visualization, the effects of model mismatch in the second order time constant $\tau_2$ were neglected in the plot of FIG. 8 and, in fact, the second order time constant $\tau_2$ was not allowed to vary at all, but was assumed to have no mismatch therein. Table 4 below provides the values of the minimum IAE at each of a set of various combinations of mismatch values for the process gain K and the first order time constant $\tau_1$ shown in the plot of FIG. 8. The values of the optimal tuning parameters for the MPC controller and the general Kalman filter used with the MPC controller associated with each box in Table 4 are not shown, but were calculated using the optimization technique described above. Here, again, model mismatch is expressed as a ratio of the actual process parameter value to the modeled process parameter value (i.e., $K/\tilde{K}$ and $\tau_1/\tilde{\tau}_1$).

TABLE 4

| | | Mismatch in Process Time Constant $\tau_1$ | | | | | | | | | | | |
|---|---|---|---|---|---|---|---|---|---|---|---|---|---|
| | | 0.25 | 0.3 | 0.4 | 0.5 | 0.6 | 0.7 | 0.8 | 1 | 1.2 | 1.5 | 2 | 2.5 |
| Mismatch in Process Gain K | 0.25 | 0.493 | 0.540 | 0.711 | 0.929 | 1.150 | 1.326 | 1.461 | 1.7294 | 1.9399 | 1.9782 | 1.8572 | 1.8868 |
| | 0.3 | 0.389 | 0.407 | 0.505 | 0.654 | 0.823 | 0.997 | 1.140 | 1.3334 | 1.5161 | 1.7235 | 1.6796 | 1.5898 |
| | 0.4 | 0.298 | 0.282 | 0.302 | 0.368 | 0.463 | 0.567 | 0.674 | 0.8897 | 1.0283 | 1.1634 | 1.3821 | 1.3515 |
| | 0.5 | 0.222 | 0.273 | 0.225 | 0.241 | 0.289 | 0.354 | 0.427 | 0.5737 | 0.7263 | 0.873 | 1.0173 | 1.1526 |
| | 0.6 | 0.293 | 0.188 | 0.190 | 0.186 | 0.201 | 0.237 | 0.285 | 0.3934 | 0.4998 | 0.6621 | 0.7949 | 0.9016 |
| | 0.7 | 0.362 | 0.239 | 0.238 | 0.158 | 0.159 | 0.173 | 0.202 | 0.2774 | 0.3625 | 0.4833 | 0.6528 | 0.7192 |
| | 0.8 | 0.429 | 0.290 | 0.146 | 0.168 | 0.138 | 0.139 | 0.152 | 0.2027 | 0.2672 | 0.3666 | 0.5261 | 0.6114 |
| | 1 | 0.556 | 0.385 | 0.205 | 0.119 | 0.155 | 0.112 | 0.109 | 0.1226 | 0.1572 | 0.2218 | 0.3308 | 0.4364 |
| | 1.2 | 41.6667 | 0.4765 | 0.2619 | 0.157 | 0.1004 | 0.1421 | 0.0998 | 0.0903 | 0.1029 | 0.142 | 0.2228 | 0.297 |
| | 1.5 | 33.3333 | 33.3333 | 0.6397 | 0.2132 | 0.1409 | 0.2043 | 0.0686 | 0.081 | 0.0721 | 0.0833 | 0.1282 | 0.1835 |
| | 2 | 25 | 25 | 25 | 25 | 0.3322 | 0.1465 | 0.1069 | 0.0617 | 0.0833 | 0.0545 | 0.0632 | 0.0891 |
| | 2.5 | 20 | 20 | 20 | 20 | 20 | 0.1935 | 0.2208 | 0.0867 | 0.1187 | 0.0678 | 0.0318 | 0.051 |

For easier visibility, the values of $K/\tilde{K}=1$ and $\tau_1/\tilde{\tau}_1=1$ (i.e., in which no model mismatch occurs) are indicated as dotted lines in FIG. 8. The point where these lines intersect represents control performance with a perfectly matched process model. The cross section along each of these lines exactly represents the plots in FIGS. 5 and 6. As discussed previously, model mismatch in the first order time constant in the direction of $\tau_1<\tilde{\tau}_1$ leads to oscillatory behavior. However, it can be seen that this oscillation does not occur if there is also model mismatch in process gain such that $K<\tilde{K}$ at the same time. As expected, with model mismatch in gain such that $K>\tilde{K}$, the problem gets worse. The fact that model mismatch in inherently different model parameters can cancel out or amplify the overall effects on control performance illustrates that it is advantageous to evaluate all dimensions of model mismatch during the calculation of the optimal controller design and tuning parameters. From FIG. 8, it is also apparent that the best possible control performance is not necessarily achieved with a perfect model. For example in the plot of FIG. 8, if $K/\tilde{K}=2$ and $\tau_1/\tilde{\tau}_1=1.5$, the control performance has an IAE of 0.0545 instead of an IAE of 0.1226 at $K/\tilde{K}=1$ and $\tau_1/\tilde{\tau}_1=1$. This difference amounts to a 56 percent improvement, assuming that the tuning parameters are optimally calculated by the described optimization formulation.

Of course, if the assumed process model and the exact process model mismatch were known, the process model used by the MPC controller and the observer (the Kalman filter) could be substituted with a perfect model to achieve an even better performance. However, in the actual control situations, it is difficult to measure model mismatch and, as a result, the MPC design and tuning technique described herein is aimed towards better or optimal MPC controller operation without knowing an exact or perfect process model. In fact, the design and tuning method described herein adjusts the MPC controller unit tuning parameters (e.g., as defined in FIG. 4) and leaves the assumed plant model unchanged (as this would be the best guess of an engineer in the plant).

Figure 9:
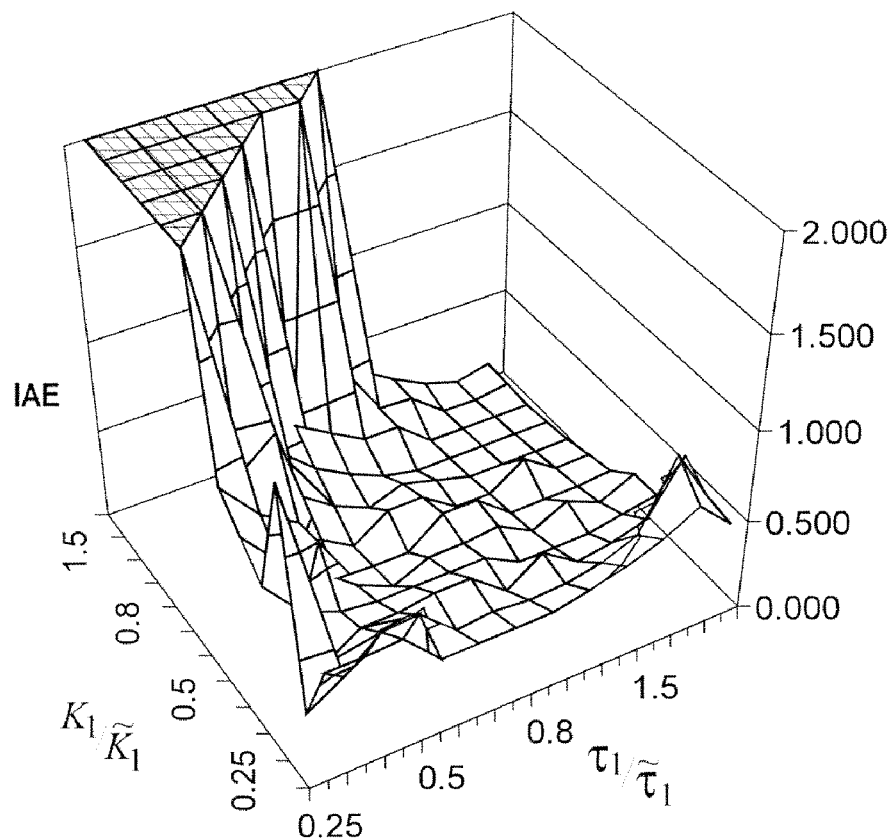
FIG. 9 depicts a three-dimensional surface plot of the best possible integrated absolute error as calculated by the adaptation/tuning block of FIG. 4 for model mismatch in two process model parameters of an MPC controller with simplified Kalman filter state update.

FIG. 9 depicts an equivalent three-dimensional optimal tuning map for MPC with simplified Kalman filtering, i.e., a tuning map formulated in the same manner as that of FIG. 8 for the MPC controller with general Kalman filtering. Here, again, model mismatch was allowed to occur in both the process gain model parameter K and in the first order process time constant model parameter $\tau_1$, but not in the second order time constant model parameter $\tau_2$. Table 5 below provides the points for the map of FIG. 9.

region is approached with a very steep slope. Calculating and plotting three-dimensional tuning maps allows easy assessment of size, location, and steepness of such unstable regions. Because such regions should be avoided by all means, constraints for highly penalized slack variables can be added into the optimization equation used in the block 110 of FIG. 4 to avoid this region. In any event, when comparing the optimal tuning maps of MPC with the different Kalman filter methods, it becomes apparent that both controllers become unstable in region $\tau_1>\tilde{\tau}_1$, $K<\tilde{K}$. However, only the MPC with a general Kalman filter becomes unstable in region $\tau_1<\tilde{\tau}_1$, $K>\tilde{K}$. As suggested previously, the inherent filtering that is found only in the simplified Kalman filter acts as a stabilizing mechanism.

In any event, the optimization-based tuning method described in association with FIG. 4 enables determination of the best MPC controller form and design and tuning parameters in view of the process model mismatch for a particular process. As a result, the optimization block 110 of FIG. 4 determines the optimal tuning for a particular value of model mismatch, and this optimal tuning can be expressed as a tuning map that is useful for determining the specific MPC and observer design and tuning that will ensure optimal control performance in the presence of that model mismatch. The technique associated with FIG. 4 can be advantageously used because industrial users of MPC controllers usually have to manually adjust tuning "knobs" until a desired behavior appears to be reached. In this case, the user may view tuning visualization maps, plots and data such as those shown in FIGS. 5-9 and Tables 1-5, to determine the best controller form and tuning parameters given a predetermined or expected value of the process model mismatch in one or more process model parameters.

Thus, if desired, the optimization block 110 of FIG. 4 may compute the best design and/or tuning parameters for a particular amount of model mismatch (in one or more process model parameters) as input to the block 110 by, for example, a user or by some other semi-automatic or automatic method. After the block 110 determines the best set of design and tuning parameters to be used in the MPC controller unit 112 in view of these particular amounts of process model mismatch (in the one or more process model parameters), these design and tuning parameters may be delivered to the MPC controller unit 112 and used during on-line control to perform better control. Alternatively, or additionally, the block 110 may determine optimal IAE maps, such as those of FIGS. 8

TABLE 5

|  |  | Mismatch in Process Time Constant $\tau_1$ | | | | | | | | | | | |
|---|---|---|---|---|---|---|---|---|---|---|---|---|---|
|  |  | 0.25 | 0.3 | 0.4 | 0.5 | 0.6 | 0.7 | 0.8 | 1 | 1.2 | 1.5 | 2 | 2.5 |
| Mismatch in | 0.25 | 0.622 | 0.622 | 0.631 | 0.431 | 0.432 | 0.431 | 0.435 | 0.478 | 0.5267 | 0.5995 | 0.7038 | 0.5233 |
| Process Gain K | 0.3 | 0.232 | 0.356 | 0.522 | 0.534 | 0.359 | 0.377 | 0.360 | 0.3722 | 0.4077 | 0.4837 | 0.8559 | 0.5504 |
|  | 0.4 | 1.341 | 0.266 | 0.395 | 0.395 | 0.424 | 0.424 | 0.269 | 0.4083 | 0.2733 | 0.303 | 0.3617 | 0.6488 |
|  | 0.5 | 0.656 | 0.428 | 0.341 | 0.317 | 0.317 | 0.317 | 0.318 | 0.2152 | 0.2163 | 0.2212 | 0.2563 | 0.2906 |
|  | 0.6 | 0.787 | 0.564 | 0.595 | 0.269 | 0.178 | 0.265 | 0.265 | 0.2848 | 0.1794 | 0.2764 | 0.1945 | 0.2844 |
|  | 0.7 | 0.921 | 0.695 | 0.571 | 0.165 | 0.152 | 0.152 | 0.305 | 0.3056 | 0.1529 | 0.1542 | 0.1571 | 0.1748 |
|  | 0.8 | 62.500 | 0.783 | 0.935 | 0.258 | 0.133 | 0.268 | 0.268 | 0.1333 | 0.1334 | 0.268 | 0.1355 | 0.1432 |
|  | 1 | 50.000 | 50.000 | 0.616 | 0.379 | 0.240 | 0.152 | 0.215 | 0.1615 | 0.1065 | 0.1067 | 0.1077 | 0.1085 |
|  | 1.2 | 41.6667 | 41.6667 | 41.6667 | 0.5047 | 0.3312 | 0.2191 | 0.1313 | 0.0886 | 0.0886 | 0.0888 | 0.089 | 0.0899 |
|  | 1.5 | 33.3333 | 33.3333 | 33.3333 | 33.3333 | 0.4534 | 0.336 | 0.2269 | 0.2287 | 0.0708 | 0.0709 | 0.071 | 0.0712 |
|  | 2 | 25 | 25 | 25 | 25 | 25 | 25 | 0.5084 | 0.2171 | 0.2024 | 0.0533 | 0.0532 | 0.0809 |
|  | 2.5 | 20 | 20 | 20 | 20 | 20 | 20 | 20 | 0.3197 | 0.2016 | 0.1033 | 0.0425 | 0.0863 |

The top left corner of both optimal tuning maps (of FIGS. 8 and 9) indicates a region of instability. Moreover, both plots are cut off at IAE=2. In either case, it is apparent that this and 9, illustrating the minimum possible IAE at each of a number of combinations of process model parameter mismatches, and provide or display these maps to a user to allow the user to select the desired or appropriate tuning point in view of the map itself. The block 110 may then provide the values of the design and tuning parameters to the controller 112 to be used during on-line control based on the selected point. Because the block 110 may operate independently of the controller unit 112, the block 110 may be stored in and executed in the same or in a different device than the controller unit 112. Thus, for example, the block 110 may be stored in and executed on one of the computers 13 of FIG. 1 and communicate via the communication network 29 to the controller unit 112 which may be in the controller 11 of FIG. 1, in one or more of the field devices 15-22 of FIG. 1, or in any other desired device(s).

Of course, it is to be expected that the optimal set of design and tuning parameters for a given model mismatch and process model will be suboptimal when no model mismatch is present, or when a different amount of model mismatch is present. Also, while it may be easier to determine the presence of model mismatch than the correct model, it can still be difficult to determine the specific amount of model mismatch for any particular model parameter in any particular situation. Likewise, although determining the amount of model mismatch may be easier than determining the precise process model because determining an amount of model mismatch requires less process perturbation, the amount of model mismatch may still change over time, thereby requiring the development of new design and tuning parameters to optimally account for this changing model mismatch. For these reasons, it may in some instances be desirable to specify and use a model mismatch range in each of the various process model parameters in the optimization block 110 of FIG. 4 to develop the appropriate set of design and tuning parameter values, than to use a specific value of model mismatch for each process model parameter.

An example of a range of model mismatch in a two-dimensional subspace (which in this case ignores the second order time constant) may be written as actual process gain $K_{actual}=2\pm0.5$ and actual first order time constant $t_{actual}=20$ s$\pm5$ s. These ranges are illustrated in a two-dimensional subspace in FIG. 10 where the range of gain equals 1 (i.e., $\Delta K=1$) and the range of the first order time constant equals 10 seconds (i.e., $\Delta t=10$ s). When model mismatch is defined as a possible range, the model mismatch range can be overlaid with an optimal tuning map calculated as described above with respect to FIGS. 8 and 9 to provide additional MPC controller adaptation and tuning advantages. An example view of such an overlay is illustrated in FIG. 11.

If desired, such an overlay can be implemented in a software package that displays this overlay to a process engineer, for example, on an optimal tuning map such as one of those of FIGS. 8 and 9. This visualization may enable the engineer to view and ascertain the likelihood of the controller moving into an undesired operational region based on possible model mismatch within the specified range. Such a range can also or alternatively be used for further MPC controller design and tuning optimization. In particular, such a display can be very useful to an engineer when commissioning the MPC controller, because the engineer can easily visually assess the worst and best possible control performance as a function of the expected model mismatch range for a particular tuning, and can make manual corrections as desired. This display software for displaying the optimization maps such as those of FIGS. 8, 9 and 11 (either with or without the range overlay), may be generated by the block 110 or may be generated as part of the user display software 46 of FIG. 1. In this case, the user display software 46 may communicate with the block 110 or may include this block to generate these maps.

Figure 10:
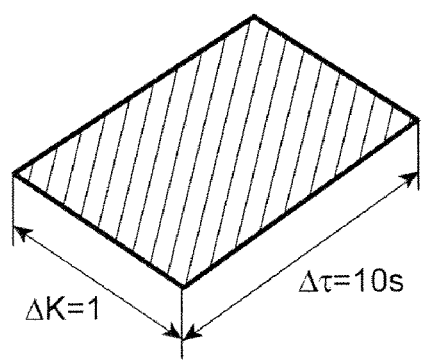
FIG. 10 is an illustration of a range of model mismatch in a two-dimensional subspace.
Figure 11:
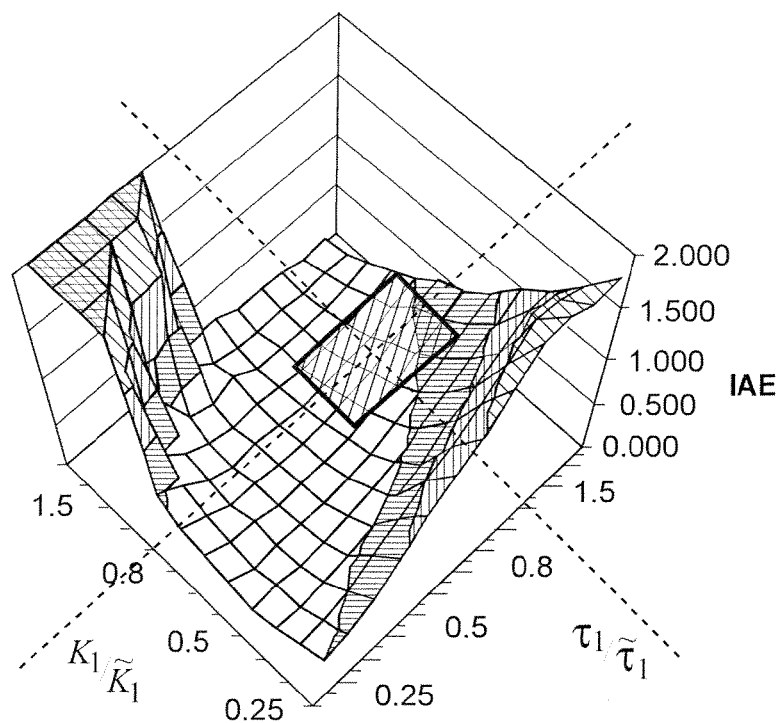
FIG. 11 is an illustration of the two-dimensional model mismatch subspace of FIG. 10 overlaid in the three-dimensional plot of FIG. 8 at the assumed process model center point to define a two-dimensional model mismatch range subspace.

In any event, in the example of FIG. 11, the worst control performance within the model mismatch range (centered about the point of no mismatch in either gain or time constant) occurs if $K_{actual}=1.5$ and $t_{actual}=25$ s. However, the IAE at that point is 0.7, which could be considered by the engineer to be acceptable regardless, especially in view of the fact that the likelihood of being within that region is relatively low because only a small portion of the model mismatch range surface area overlaps with IAE values above 0.5. If more knowledge about the model mismatch was available (e.g., physical process limitations), then the two-dimensional model mismatch subspace as depicted in FIG. 10 could be modified to account for likelihood of occurrence. Thus, for example, the model mismatch subspace of FIG. 10 could take on other shapes besides the depicted rectangle, including, for example, an oval, a circle, or any other desired shape, based on the knowledge of likelihood of model mismatch.

As a further refinement of the tuning method of FIG. 4, it may be advantageous to determine the most ideal tuning point for a given plant model as a function of the amount of possible or expected model mismatch range in the values of one or more of the process model parameters. In particular, looking at FIG. 11, it can be seen that the calculated tuning parameters do not necessarily provide the lowest possible IAE in the map of FIG. 11 at any of the points in the model mismatch range subspace because the center point of the model mismatch range subspace is fixed at the assumed "perfect" model. If this subspace, which in this two-dimensional example is represented by a surface, was allowed to move, a modified optimization technique of that shown in FIG. 4 might be able to find a lower value for the worst (greatest) IAE within the model mismatch range surface, thereby increasing the overall performance of the controller. Put another way, given a specified potential, expected or possible model mismatch range (in each of the various dimensions defined by the process model parameters), it may be desirable to use a set of optimal tuning parameters calculated using the technique described above that generally maximizes the MPC controller operation within a subspace defined by these ranges, even if the best controller operation is not found at the center point of that subspace or even within that subspace and even if the center point of the model mismatch range subspace does not correspond to the process model actually developed for the plant.

Figure 12:
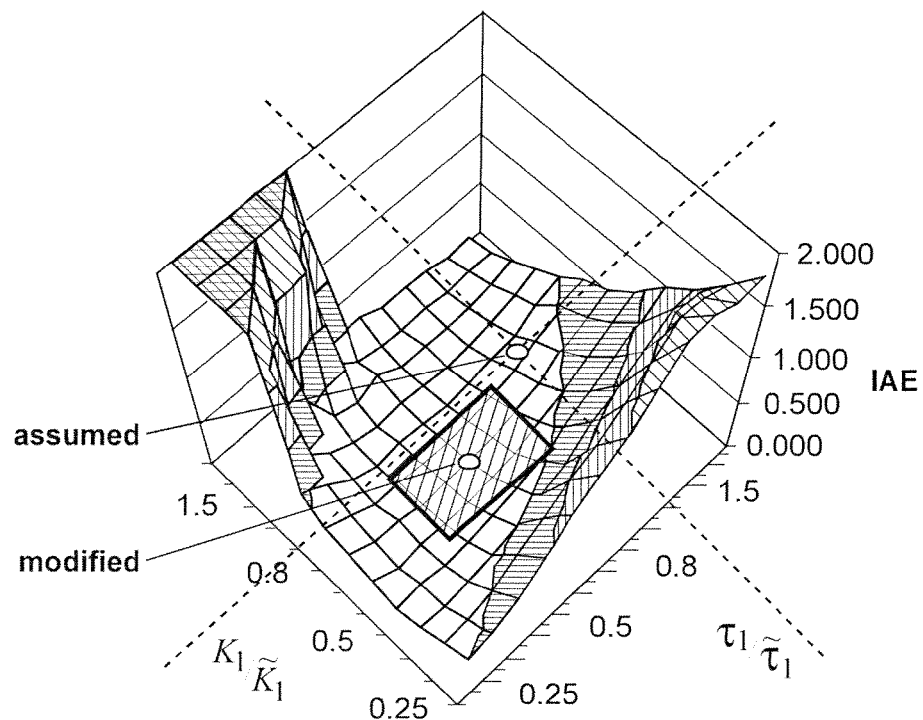
FIG. 12 is an illustration of a manner of moving the two-dimensional model mismatch range subspace in FIG. 11 a different location in the three-dimensional plot of FIG. 11 to determine a new set of controller model parameters as well as a new set of optimal MPC tuning and design parameters, associated with the model mismatch range subspace.

In this case, while the MPC controller design and tuning technique described herein does not update or change the assumed process model (provided as an input to the block 10 of FIG. 4) with knowledge about model mismatch (because the result may be as uncertain as the assumed model in the first place), this technique adapts and tunes the MPC controller in view of the known or suspected process model mismatch range to perform better overall control in view of this model mismatch range. In particular, as illustrated in FIG. 12, the center point of the model mismatch range subspace may be relocated or moved about within the modeled tuning region to locate the best overall sub-region of the tuning space in which to operate in view of the expected process model mismatch. To operate in this sub-region, the controller model (used in the MPC controller for calculating the MPC control moves) may be adapted so as to be centered about a new center point in the tuning map, which center point and model mismatch subspace results in the best sub-region of operation within the overall tuning map. In one case, the overall best sub-region within the tuning map may be determined by calculating the minimal possible value of the worst (greatest) IAE present within a particular sub-region as the model mismatch subspace is moved throughout the entire tuning map. Of course, other measures, including statistically based measures, for determining the best operating sub-region could be used as well, such as the lowest average IAE over the whole mismatch region subspace, the lowest weighted average over the whole mismatch region subspace, etc.

If desired, a particular best mismatch sub-region can be found by formulating and solving a second optimization problem defined as:

$$\min_{i_\psi}\left(\max_{i_\psi} IAE\left(\frac{\Xi}{\hat{\Xi}}, \psi\right)\right) \quad (11)$$

Subject to: $g_\psi(\Gamma) \geq 0$ where $\psi$ is the tuning map calculated by iterating Equation (9) over arbitrary combinations of model mismatches, $g_\psi(\Gamma)$ defines inequality constraints describing the dimensions of the tuning map $\psi$, and $i_\psi$ defines the dimensions of the tuning map $\psi$. The particular optimizations of Equation (11) determine the model mismatch range subspace which includes the lowest value of IAE in the tuning map. It should be noted that no additional process model knowledge is required for this operation because the tuning map is still developed based on the process model originally provided by the engineer (the assumed process model). The result of the optimization of Equation (11) is a modified controller model and set of controller tuning parameters that are subsequently used to develop the MPC controller, so as to obtain better performance in light of the expected model mismatch ranges. However, the tuning map of, for example, FIG. 11 or FIG. 12, is not recalculated based on the new process model because the sole purpose of determining the new controller model is to minimize IAE within the current tuning map.

By adding this operation to the optimization block 110 of FIG. 4, the design and tuning parameters of the MPC controller are changed to the newly determined ideal values (of the new center point) to maximize control performance even further than is possible with the MPC and observer tuning at the original center point. In a sense, in this case, the process model parameters have now also become controller design/tuning parameters because they are used to determine a new controller model used within the MPC controller. While it is true that, if there were no model mismatch, one would expect the control performance of a controller with a modified model to be worse than that of a controller with the original model. However, as discussed above, the chance of there being no model mismatch is very small. In a real plant scenario, the performance of the original controller may be worse than that of the modified controller for the majority of model mismatch scenarios because that is exactly the objective function of the optimization calculations of Equation (11). Moreover, the difference in the worst IAE point between the assumed and the modified model is usually significant, because slopes that lead to instability on one side and low performance on the other side are typically very steep. FIG. 13 illustrates how the optimization block 110 of FIG. 4 can be modified to use model mismatch range to determine a modified controller model and a set of controller design and tuning parameters for use in the MPC controller.

As illustrated in FIG. 13, an optimization block 110A includes or performs two optimizations is indicated by Equation (11), which includes the optimization of Equation (9), and the input to the block 110A is changed from specifying a particular model mismatch to a model mismatch range (for one or more of the model parameters). Here, the optimization block 110A also develops a new set of values for the model parameters which are used to develop a new controller model (i.e., the modified controller model shown on one of the outputs of the block 110A in FIG. 13). Essentially, the new center point of the model mismatch subspace determined by the optimization block 110A has a particular set of values for the process model parameters associated therewith and these model parameter values are different than the model parameter values associated with the original center point (i.e., are different than the model parameter values associated with the original plant model). These new process model parameter values are then used to develop a new controller model (without actually changing the plant model input to the block 110A), and this controller model is provided as a controller design parameter to the MPC controller, along with the other design and tuning parameters (e.g., Q, R, M, P) associated with the new center point.

Extending the method for optimal tuning from a specific model mismatch to a range of model mismatch increases its usefulness dramatically. This new range-based mismatch technique can be applied to many industrial processes that have inherent process parameter variations that are known, but are difficult to measure exactly. Moreover, as described below, the adaptation/tuning method may use model mismatch feedback to adapt the presented double optimization method of FIG. 13 to changing model mismatch, to thereby provide for automatic or on-line determination of the optimal controller design and tuning parameters to be used at any particular time during on-line control.

More particularly, it is possible to use the above-described MPC controller adaptation and tuning method to perform closed-loop control with adaptive tuning (i.e., adaptive control). Most methods for adaptive control generally operate by refining or re-creating a process model either continuously (e.g., periodically) or spontaneously when triggered by a detectable event, such as a change in a process value, a change in an operator set point, etc. After the new model is determined, controller moves or tuning parameters are then calculated from the model. However, these methods generally rely on process variation that may be introduced by disturbances or set point changes and thus the efficiency, precision and stability of these methods increase proportionally with the amount of process variation.

However, it is generally easier to determine the statistical amount or variation of model mismatch than it is to determine or create a precise process model. While many methods, such as autocorrelation, have been proposed to determine the amount of model mismatch during closed-loop plant operations, it is extremely difficult to determine a good process model during closed-loop plant operation, because the controller objective (to minimize variation of a process output) contradicts the requirement of model identification (operating the process through a process upset to maximize variation of a process output).

A method of automatically performing controller adaptation and tuning described below uses the amount of model mismatch to determine when to adjust the design and tuning parameters of the MPC controller unit, i.e., when to implement the optimization unit 110 or 110A of FIGS. 4 and 13. While this adaptive tuning method depends on, and in fact requires, some amount of process variation, this adaptive tuning method does not need to maximize process variation to derive the tuning parameters that maximize control performance.

A concept referred to in the art as innovation ($I_k$), and also known as residuals or prediction error, is defined as:

$$I_k = (y_k - \hat{y}_k) \quad (12)$$

where $y_k$ is the predicted process output and $\hat{y}_k$ is the actual value of the process output. This term is used in the Kalman filter Equation (6) to calculate the updated state variable. While researchers have proposed many methods that analyze innovation, the application of such methods typically occurs during the commissioning phase or the maintenance phase of a predictive control system or a soft sensor project (e.g., a neural network). Autocorrelation, for example, is a method that researchers/engineers frequently use to analyze the innovation because autocorrelation can distinguish between model error and unmeasured disturbances in the commissioning phase of a plant. However, because unmeasured disturbances manifest themselves in the same way that model error manifests itself to the operator, that is, as the difference between the predicted process value and the actual or measured process value, it is difficult to distinguish between model error and unmeasured disturbances during on-line control operation, and thus the error that occurs can only be corrected using feedback control techniques.

Generally speaking, autocorrelation of the innovation ($I_k$) provides an indication of how much of an error signal is due to non-random contributions. The higher the value of the autocorrelation of the innovation, the higher the amount of process model mismatch that is present. For a discrete time series of length n {e.g., $y_1, y_2, \ldots y_n$} with known mean and variance, an estimate of the autocorrelation can be obtained as:

$$R(k) = \frac{1}{(n-k)\sigma^2} \sum_{t=1}^{n-k} (y_t - \bar{y})(y_{t+k} - \bar{y}) \qquad (13)$$

where R(k) is the autocorrelation that lies in the range [−1, 1], $\sigma^2$ is the variance, $\bar{y}$ is the mean and k is the time lag. Because an optimally tuned controller can only remove correlated signals, and cannot remove disturbances that are perfectly random (e.g., white noise), the proportion of white noise to correlated signal is a good indication of the optimality of controller tuning. Thus, for example, if the process output of a closed loop control system has large autocorrelation, then the tuning of the particular controller used therein is not optimal.

Autocorrelation based analysis methods are frequently used in the process of manually tuning and retuning loops. If the autocorrelation analysis returns a high amount of model mismatch, the engineer usually knows that controller configuration is not completed and that the engineer must refine or re-identify the process model before commissioning the controller. Plant engineers often use a second criterion to verify performance improvements of tuning. In particular, plant engineers may consider the amplitude spectrum to ensure that the amplitude ratio is acceptable at the most likely operating frequencies. While this manual controller design method may be made automatic using innovation analysis, it cannot be applied, for example, continuously, during on-line controller operation. Moreover, this method uses the amount of model mismatch merely to trigger a process model improvement cycle in the form of developing or generating a new process model that reduces model mismatch.

The automatic adaptive tuning method using an error analysis described below may, on the other hand, be executed continuously or otherwise during on-line controller operation and uses the amount of model mismatch, not to trigger a process model regeneration cycle, but to trigger an adaptive tuning cycle for the controller (to retune the controller to optimally account for the new amount of model mismatch) without regenerating a new plant model. Thus, this method does not require a new set of process measurements, process upset to determine a new set of process model parameters, etc. In particular, for model predictive controllers, the controller output calculation is derived directly from the process model and, therefore, autocorrelation can be attributed to model mismatch.

Current practices used in industrial process control deal with the combination of model mismatch and unmeasured disturbance in innovation in a very basic way. DMC controllers, for instance, assume a certain fraction of the innovation to be contributed by unmeasured disturbances. While tuning the Kalman filter gain based on autocorrelation of innovation has been tried, this method attempts to minimize the error covariance seen by the Kalman filter by adapting the designed and actual signal-to-noise ratios. This technique essentially maximizes the filter performance, but does not necessarily maximize the closed loop performance. Moreover, this adaptive method only calculates the error covariances, and can only be used if the perfect model is already known.

FIG. 14 illustrates a manner in which the optimizer based tuning block 110A of FIG. 13 can be combined with an existing MPC controller and observer (indicated as a Kalman filter "KF") to create a gain scheduling MPC controller. As is known, gain scheduling methods are very popular in industrial plants for processes with changing process parameter values. Such methods may schedule controller tuning or may schedule update of the process model and the tuning parameters. As long as the process parameters change deterministically, satisfactory results can be achieved with such methods. In fact, many feedstock and equipment properties are constantly changing in industrial plants. Examples include changes in the burn coefficient of fuel and changes in the concentration of a reagent. If measurable, these property changes are frequently used by a feed forward control strategy to directly reduce variation or by a gain scheduling strategy to counteract modeling error and indirectly cancel the impact.

The tuning block 110A of FIG. 13 can be used to perform gain scheduling and, more particularly, if one or more parameters of the process model have changed and are known, the process model parameters can be updated in the optimal MPC adaptation/tuning block 110A (via the plant model input) which causes the adaptation/tuning block 110A to generate a new set of design and tuning parameters (in view of the new process model and current model mismatch ranges) for the MPC controller and Kalman filter. This update can be performed manually by a plant engineer or operator or can be performed automatically based on a process state change. The latter is comparable to model based gain scheduling of a PID controller. In FIG. 14, the interactions between the tuning block 110A and the controller unit 112 are indicated by dotted lines, and illustrate that the information flow to the controller unit 112 from the block 110A is strictly one-way. The assumed model mismatch range may be entered in the MPC adaptation/tuning block 110A by the designing engineer or may be left at a default setting. As with any gain scheduling controller, the state variable can be hardwired to a specific process measurement if available, or can estimated by a separate property estimator. Neural networks are frequently used as property estimators in the process industry when process properties can be inferred from process measurements. External property estimators like neural networks or dynamic linear estimators can also be used to estimate key model parameters directly.

Figure 15:
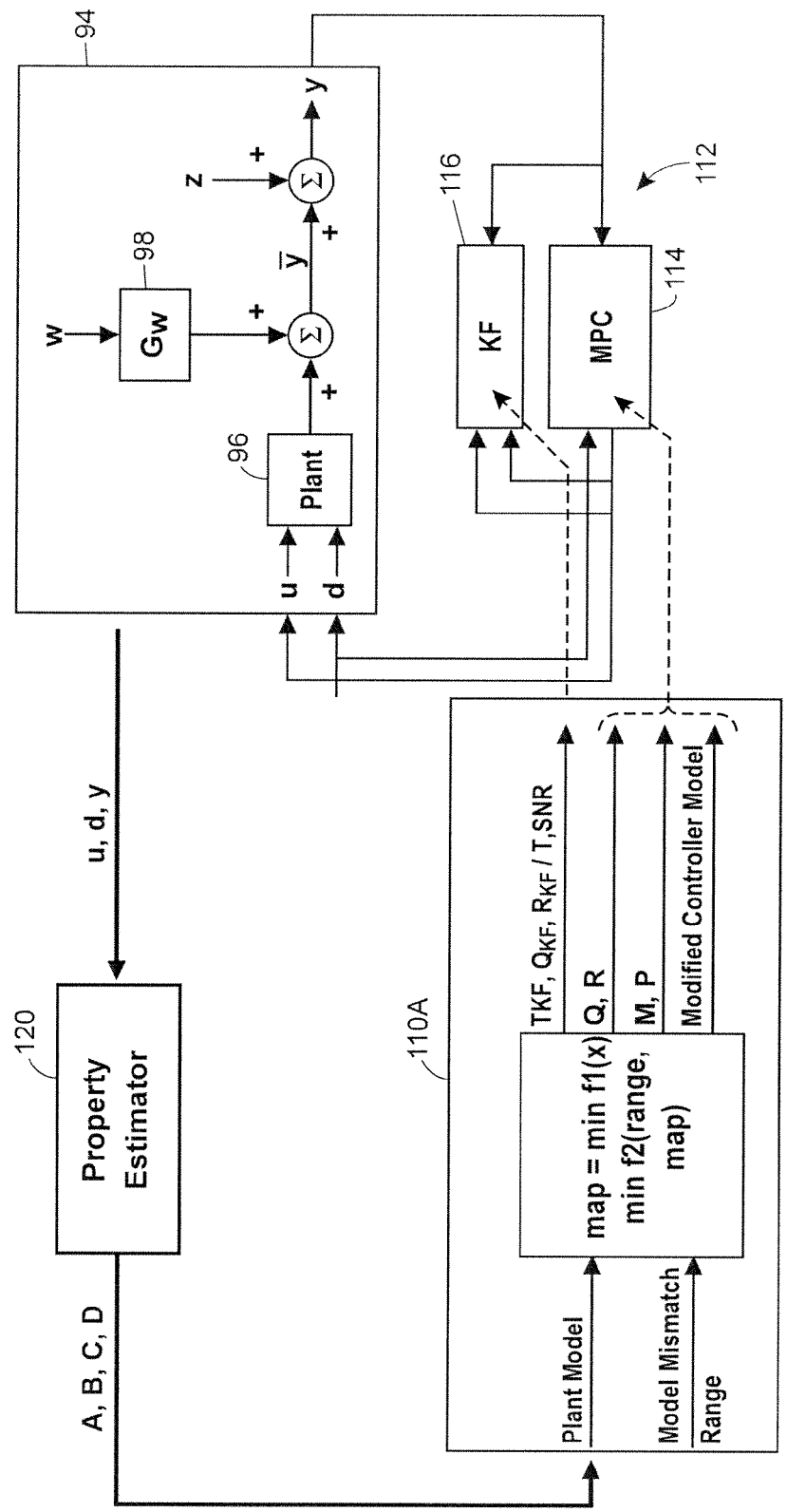
FIG. 15 is a block diagram illustrating the application of the adaptation/tuning block of FIG. 13 to MPC control in a closed loop tuning configuration using a property estimator block coupled to a process.

An embodiment of the adaptation/tuning block 110A configured as a gain scheduler using a property estimator is illustrated in FIG. 15. Here, as will be noted, a property estimator 120 is coupled to receive one or more input and/or output (e.g., measured) variables or signals from the process 94 and uses these variables to estimate the values of one or more process model properties or parameters (e.g., A, B, C, D). Of course any desired or appropriate property estimator may be used in this example to determine new process model parameter values. This technique closes the loop on model parameters, and can therefore be considered adaptive. However, to operate adequately, most methods that identify process model parameters require significant set point changes or process perturbation. Unfortunately, such process perturbation is not desirable in on-line control, and does not maintain the main assumptions of the adaptation/tuning method described above, i.e., that the plant model cannot be known exactly and that this plant model should not need to be reformed during an adaptation/tuning cycle.

Figure 16:
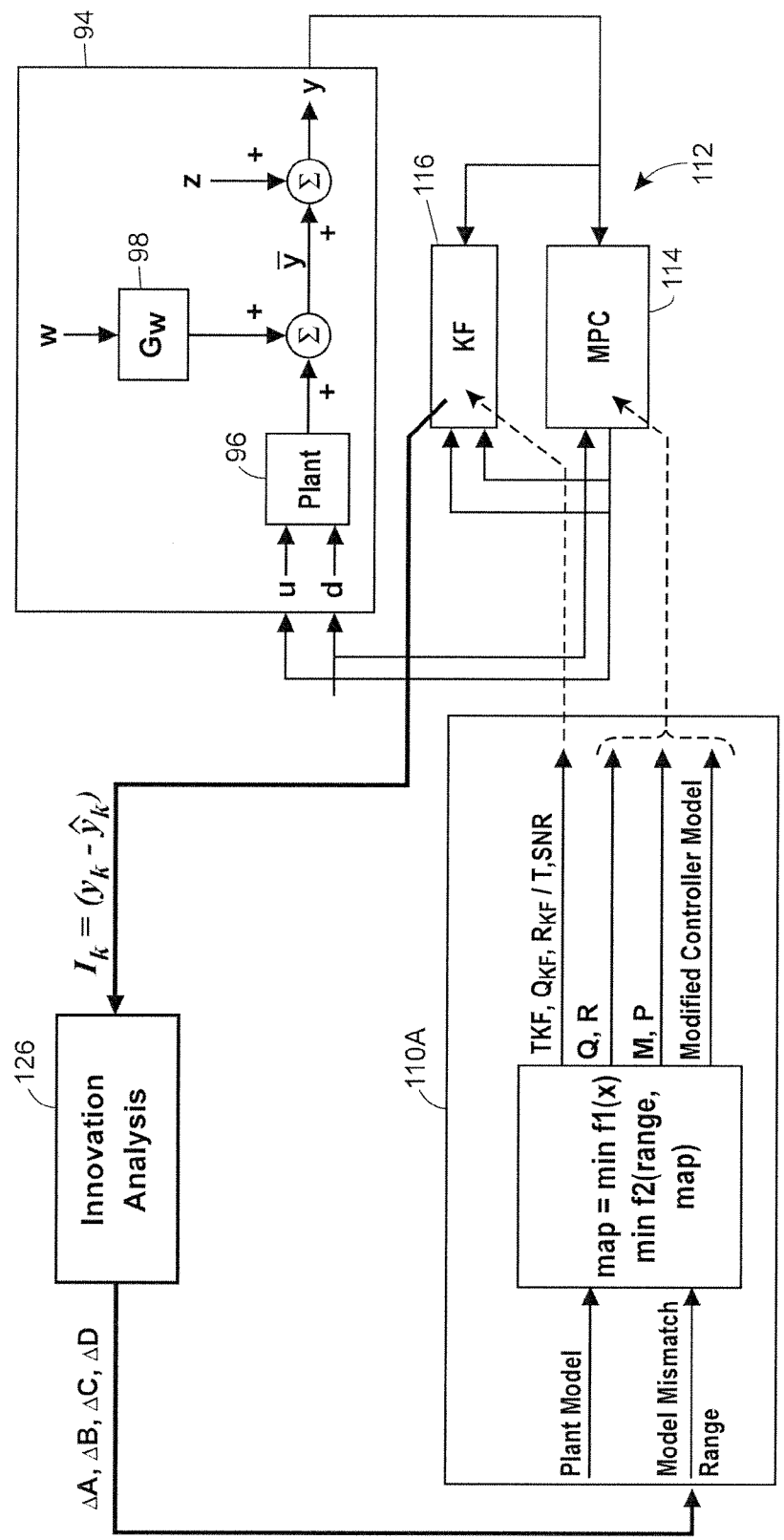
FIG. 16 is a block diagram illustrating the application of the adaptation/tuning block of FIG. 13 to MPC control in a closed loop tuning configuration using an error analysis block coupled to an MPC controller.

Estimators can be connected to many variables, including those that are not measured or manipulated by the control loop. In fact, an estimator may be tied solely to the inputs of the Kalman filter 116. FIG. 16 illustrates an adaptive tuning system 125 which uses the adaptation/tuning block 110A as part of a gain scheduling controller system to perform adaptive control. As illustrated in FIG. 16, an estimator 126 is coupled to the observer, i.e., the Kalman filter 116 and analyzes the innovation term associated with the Kalman filter or other error signal to determine an estimate of the amount (e.g., range) of model mismatch for one or more of the process model parameters. The estimator 126, which may also or instead be coupled to the controller 114, implements an error analysis, such as an innovation analysis, to determine process model mismatch or mismatch range, and provides the determined process model mismatch(es) or mismatch range(s) to the adaptation/tuning block 110A to instigate a new adaptation/tuning cycle for the controller unit 112. In particular, the error analysis performed by the estimator 126 may be used to automatically update the model mismatch range(s) in the system of FIG. 16. If desired, all or only a part of the model mismatch range(s) can be updated in this manner at any particular time. Similarly, all or part of the model parameters for which the mismatch range(s) are considered may be modified, depending on how comprehensive the innovation method is with respect to the number of model parameters. In other words, sometimes the innovation analysis may only allow conclusions to be made about a subset of the model parameters in the actual process model. If that is the case, the range for the unknown parameters may be set conservatively to include all or most expected or possible model mismatch scenarios.

The output of the optimal MPC adaptation tuning block 110A functions in the same manner as the on-demand update applications described above, but closes the adaptation loop by performing controller adaptation and tuning when a significant amount of model mismatch is detected, e.g., when the mismatch for one or more model parameters exceeds a predetermined or preset threshold, such as a user supplied threshold, a mismatch range previously used in the tuning block 110A, etc. A uniqueness of this adaptive approach is that the originally assumed process model is never modified by the adaptation/tuning mechanism, preventing runaway process identification, increasing robustness, and simplifying gain scheduling. If desired, the assumed process model can be updated manually at any time without having to stop or reset the adaptation, which is yet another advantage over current state of the art model update methods.

As will be described in more detail below, a trigger for implementing a manual or an automatic adaptation/tuning cycle can be easily derived from the value of innovation or from a determined model mismatch range (i.e., either from the input to or the output of the innovation analysis performed by the estimator 126). Of course, such a trigger could rely on comparisons of the innovation or other error analysis, or the outputs thereof, to predetermined thresholds to recognize when a new adaptation/tuning cycle should be performed by the block 110A. In any event, it has been found that use of the autocorrelation of the innovation or other error calculation described above provides a model-free and perturbation-less alternative to other previously known methods of implementing controller adaptation. In particular, autocorrelation analysis can be used to determine whether the control performance of a loop can be improved or not without the need to identify or re-identify a process model. More particularly, it has been found that autocorrelation of the control error (the difference between the measured process output variable and the set point for this variable) is useful during steady state operation to determine whether significant model mismatch exists, while autocorrelation of prediction error (the difference between the measured process output variable and a previously predicted value for this variable) may be useful during process upset conditions to determine whether significant process model mismatch exists, or to determine an amount or range of model mismatch. As used herein, error analysis includes the autocorrelation of control error, prediction error, or other errors within the MPC controller unit 112. These autocorrelations may be used as triggers to implement a new adaptation/tuning cycle when, for example, the autocorrelation analysis determines a significant amount of model mismatch. Still further, comparisons of the autocorrelations of the control error or the prediction error for the same process variable at different times can be used to detect a change in model mismatch, which can also be used as a trigger to implement a new adaptation/tuning cycle.

Figure 17:
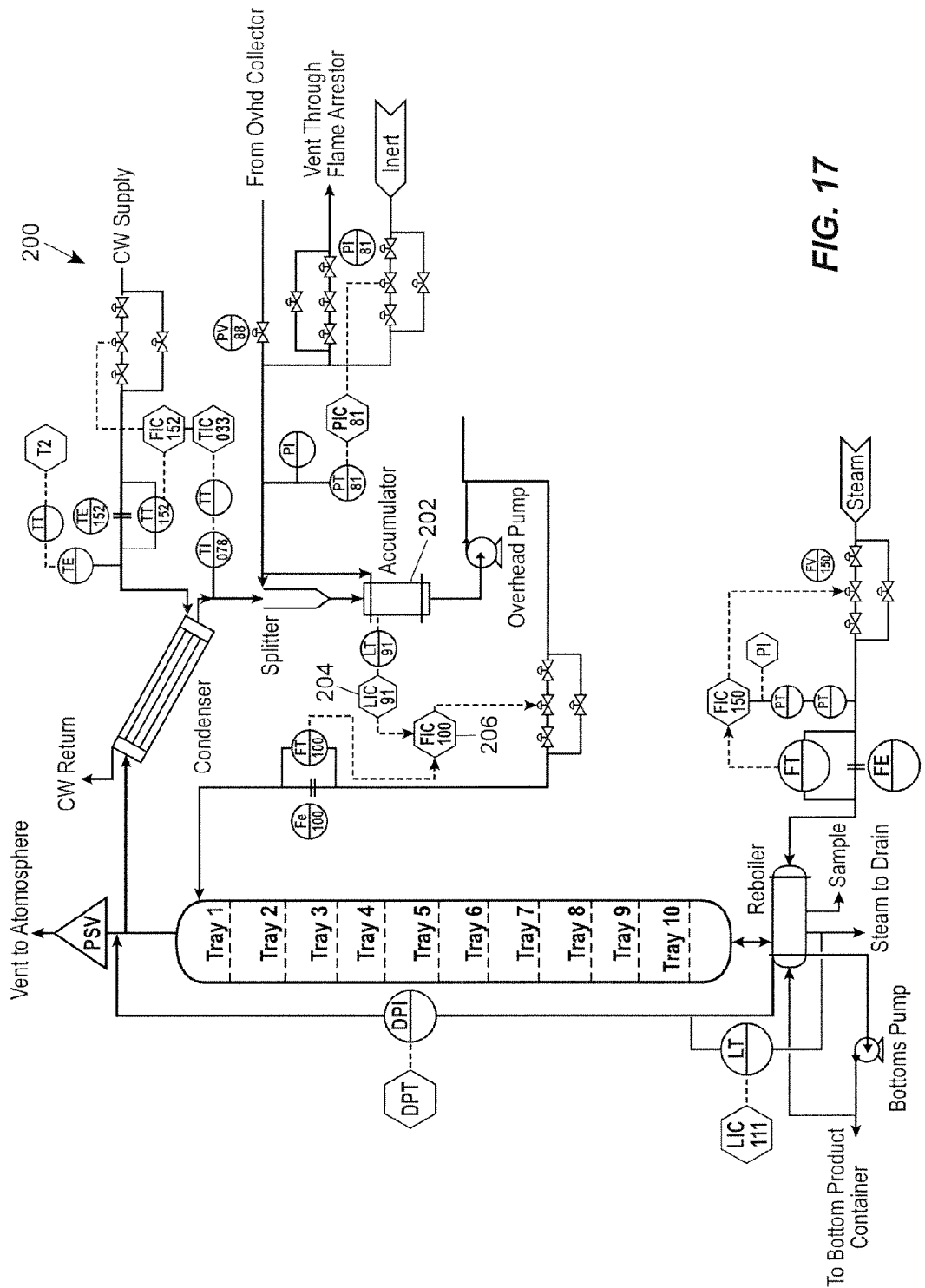
FIG. 17 illustrates a P&ID of a binary distillation column used for experimental testing of an MPC controller adaptation/tuning method described herein.

To verify the concepts presented above, certain ones of the above-described adaptation/tuning methods were applied to an experimental binary distillation column. Results from experimental test runs of the binary distillation column using a model predictive controller implementing the optimal tuning method described with respect to FIG. 16 (using a practical approximation to estimate model mismatch from the autocorrelation of the innovation in the Kalman filter) are provided below. The particular distillation column used in these experiments was a pilot plant of smaller than average scale that is typically used to separate water and ethanol. The process and instrumentation diagram (P&ID) 200 for the experimental plant is shown in FIG. 17. As this P&ID is easily readable to those skilled in the art, it will not be described in great detail herein other than where necessary for the discussion.

Because the flow out of an accumulator 202 can be measured, a cascade control strategy was chosen that allows separating the fast flow and the slow integrating level dynamics. This separation between a level controller 204 (LIC-091) and a flow controller 206 (FIC-100) generally increases robustness. However, both of the controllers 204 and 206 must be tuned fairly well for this effect to be realized. This requirement is a challenging task in this plant because the process parameters change as the column energy input varies. Because steam flow is used to control the bottoms temperature in order to control the purity, the process parameters of level and flow control loops in the accumulator 202 can change significantly during normal operation. Manual step testing was performed to determine the process model at a steam flow of 0.55 kg/min. The step test yielded the following initial process model, which was used as the assumed model for the model based MPC controllers and was used to provide initial tuning for the PID controllers at a steam rate of 0.55 kg/min:

$$G(S)_{FIC-100} = \frac{0.61}{3s+1}e^{-0.6s};$$

$$G(S)_{LIC-091} = \frac{-0.9}{218s+1}e^{-17.5s}.$$

At steam rate of 0.4 kg/min the following plant model was determined:

$$G(S)_{LIC-091} = \frac{-0.9}{160s+1}e^{-14s}.$$

For the experiment, the (LIC-091) level controller 204, which is normally a PID controller, was replaced with an MPC controller executed in the well-known simulation program MATLAB®. This controller was implemented by leaving the PID) controller in manual mode and sending OPC writes from an OPC client on a laptop computer running the MATLAB® simulation to the outputs of the PID controller in a DeltaV™ controller system implemented within the plant 200. Because the output of LIC-091 controller 204 was connected to a cascade input of the secondary FIC-100 flow controller 206, the writing to the LIC-091 controller 204 indirectly manipulated the flow set point of the FIC-100 flow controller 206 and implemented cascade control behavior, equivalent to the original plant configuration.

Figure 18:
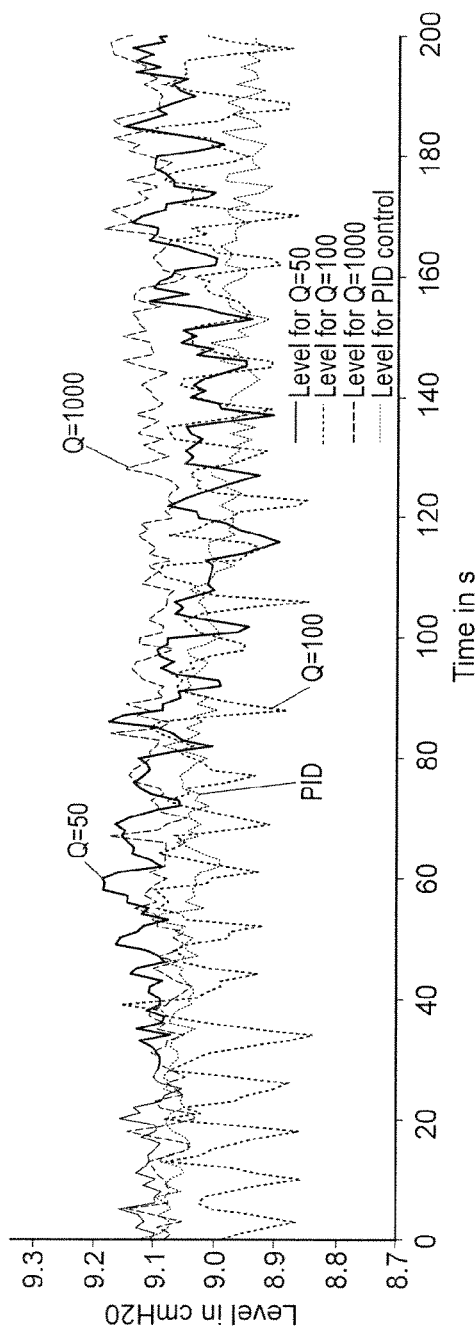
FIG. 18 illustrates a plot of the performance of three differently tuned MPC controllers and a PID controller when controlling a level within the binary distillation column of FIG. 17 at a first steam rate.

Three different move penalty tunings were used in the MPC controller 204 (specifically, Q=50, Q=100 and Q=1000) and the control performance at two different operating points was analyzed (in particular, at a steam flow rate of 0.4 kg/min and at a steam flow rate of 0.55 kg/min). FIG. 18 illustrates three different runs of the MPC controller 204 with the three different tuning settings at a steam rate of 0.5 kg/min. This data was recorded sequentially and then overlaid for comparison. A fourth experimental, which was run using the original PID controller set to perform PI control, was performed to allow comparisons between MPC and PID control. The PI tuning parameters (Gain=1.54 and Reset=141.68 s) were calculated from the ultimate gain, the ultimate period and the dead time of the process with modified Ziegler-Nichols tuning. At this steady state condition, the standard deviations, for the four different controllers were determined to be $\epsilon_{Q=50}$=0.057, $\epsilon_{Q=100}$=0.066, $\epsilon_{Q=1000}$=0.052, $\epsilon_{PI}$=0.036

Figure 19:
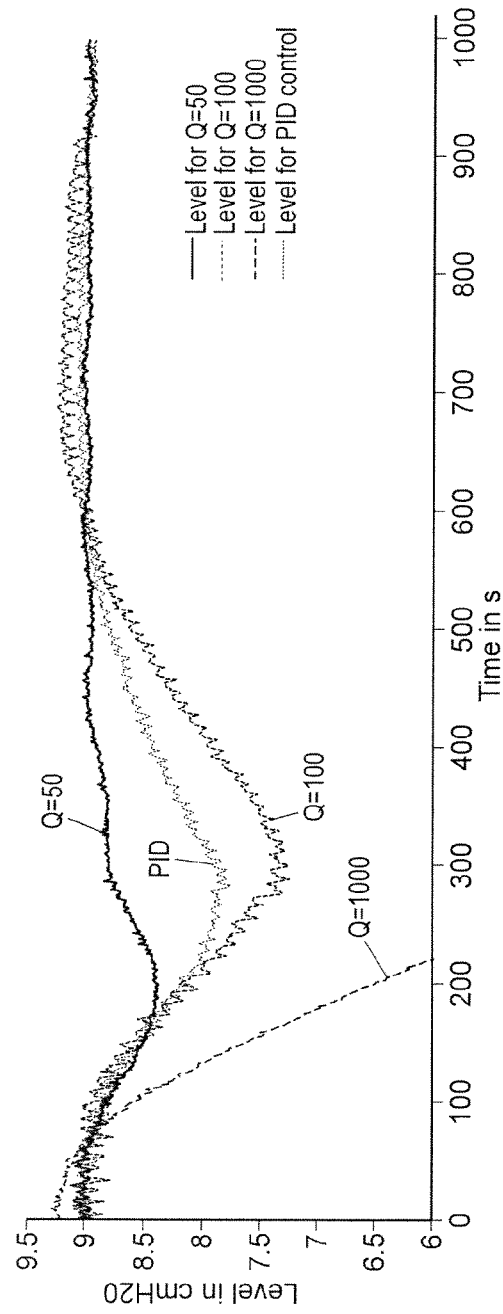
FIG. 19 illustrates a plot of the performance of the three differently tuned MPC controllers and the PID controller when controlling a level within the binary distillation column of FIG. 17 after introduction of an artificial unmeasured disturbance in steam flow rate from the first steam rate to a second steam rate.

As illustrated in FIG. 18, the time domain plot of level control with Q=1000 appears to be the most steady. MPC with Q=1000 also achieves the lowest standard deviation ($\epsilon_{Q=1000}$=0.052). While, in a real plant setting, a plot of current control variables is often the main way of looking at the data, conclusions drawn from a real time trend only may be misleading. FIG. 19 illustrates the manner in which the controllers reacted to an unmeasured disturbance, which was chosen to be a change in steam flow rate, as this type of disturbance poses more than one difficulty for the controllers. First, this type of disturbance changes the amount of condensate that reaches the accumulator 202, which requires the controller 204 to change the accumulator output flow. Second, this type of disturbance changes the reflux time constants, thereby changing the amount of model mismatch. The change in steam flow rate is also a true input disturbance and is, in fact, common in industrial plants. Still further, change in steam flow rate is also most commonly unmeasured. Examples from different process industries that have similar impact as the artificial steam flow rate change (which was used in this experiment) include (1) the change in BTU rating of fuel (which impacts temperature and gain of a temperature loop), (2) the change in concentration and/or composition of feedstock (which impacts column loading, mass balance and gain between energy supply to product purity), (3) the fouling of tubes in a boiler (which changes both the heat transfer coefficient, which in turn changes process gain, and the required flow for the same heat transfer, which therefore changes dead time), and (4) the change of outdoor temperature and or an occurrence of a rainstorm (which changes temperature and also changes the heat transfer coefficient to atmosphere, which therefore changes gain).

In any event, the performance of the controllers during this simulated "unmeasured" process disturbance (as illustrated in FIG. 19) in which the steam flow rate set point was changed from 0.55 kg min to 0.4 kg/min, was such that $IAE_{Q=50}$=0.122, $IAE_{Q=100}$=0.468, $IAE_{Q=1000}$=∞ (in this case control was unsatisfactory and the plant had to stabilize with manual intervention), and $IAE_{PI}$=0.3. As illustrated in FIG. 19, while the $MPC_{Q=50}$ and $MPC_{Q=100}$ controllers rejected the unmeasured disturbance reasonably well (with $IAE_{Q=50}$=0.122, $IAE_{Q=100}$=0.468, respectively), the same experiment could not be performed with $MPC_{Q=1000}$ because the large move penalty prevented this controller from reacting to the level drop in a timely manner, which tripped the accumulator pump interlock. Following the pump trip, the accumulator 202 filled too quickly for the controller 204 to react, resulting in unacceptable control performance.

This example illustrates that overly cautious detuning of a controller (i.e., Q=1000) can be potentially disruptive and dangerous. Here a spill (accumulator overflow) would have occurred without manual operator intervention. On the other end of the spectrum, the plot of $MPC_{Q=50}$ performance was determined to be close to the edge of stability, which was determined be true in further experiments because, when faster tuning was applied (Q<50) or the plant was run in an operating region with higher steam rate, these controllers became unstable (not depicted).

Figure 20:
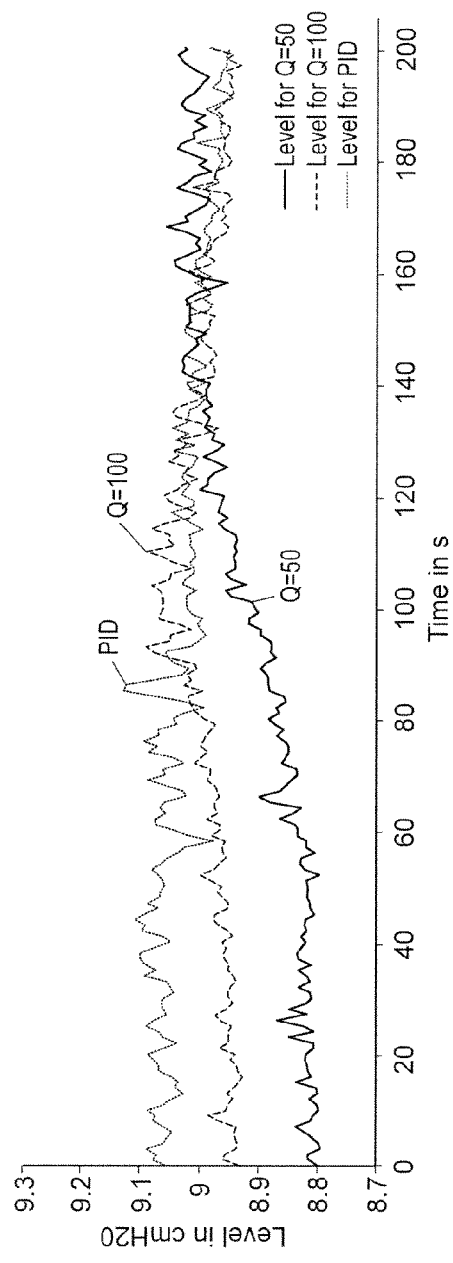
FIG. 20 illustrates a plot of the performance of the two differently tuned MPC controllers and a PID controller when controlling a level within the binary distillation column of FIG. 17 at the second steam rate.

A plot for when the plant was operating at 0.4 kg/min of steam is illustrated in FIG. 20 in which controller performance was measured as $\epsilon_{Q=50}$=0.053, $\epsilon_{Q=100}$=0.028, controller with Q=1000 did not control plant satisfactory, and $\epsilon_{PI}$=0.032. Thus, the MPC controller with the same tuning as that which was used for 55 kg/min of steam (FIG. 18) showed lower standard deviation. MPC with Q=1000 is not shown in FIG. 19 because it did not control plant satisfactory and tripped accumulator pump interlock repeatedly, as mentioned above.

In summary, the experimental runs of the distillation column of FIG. 17 illustrated that MPC tuning parameter Q values of 50 and 100 were suitable for model mismatch that spans across the desired operating regions (here from 0.4 kg/min to 0.55 kg/min of steam). Tuning below 50 and above 200 (tested but not depicted) was unsuitable. As suggested above with respect to the optimal tuning, a specific set of tuning parameters could be found that results in ideal feedback control performance for the varying amount of model mismatch. This was possible experimentally, even without new knowledge about the plant model. No model re-identification or model update was performed. In fact, the assumed plant model was used throughout the experiment even though it was known to be significantly wrong in that, not only where the values of the model parameters most likely incorrect, but the model form also did not match the underlying process characteristics of an integrating process (i.e., a level control loop). An incorrect model formulation (first order plus dead time) was intentionally selected to ensure that model mismatch was present during the experiment because it was not possible to determine the exact amount of model mismatch that was present during the experiment.

Figure 22:
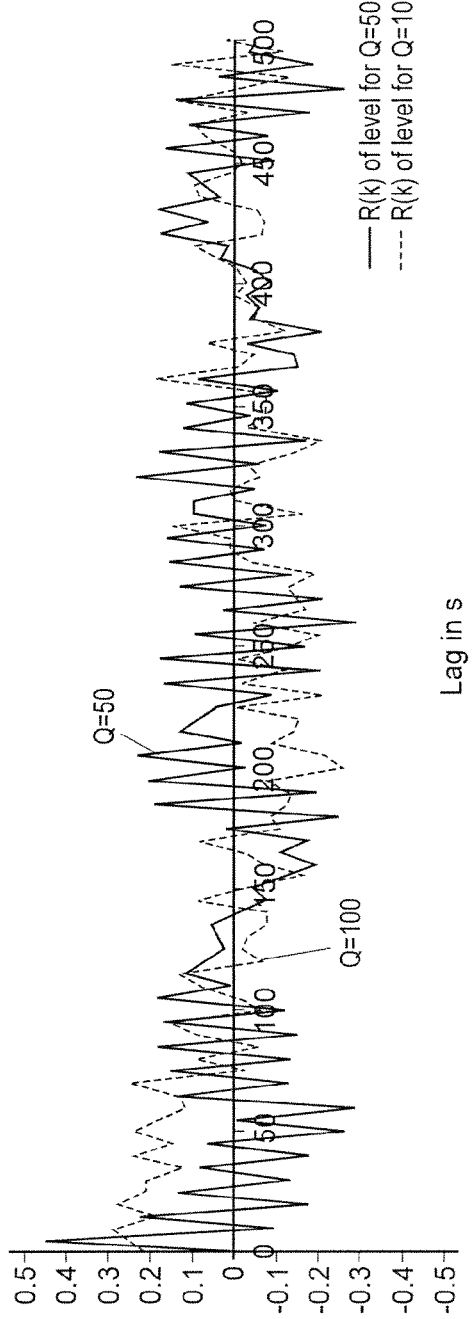
FIG. 22 illustrates a plot of an autocorrelation of prediction error in the MPC controller for two of the three different MPC tuning settings when operated at the second steam rate associated with the plot of FIG. 20.
Figure 23:
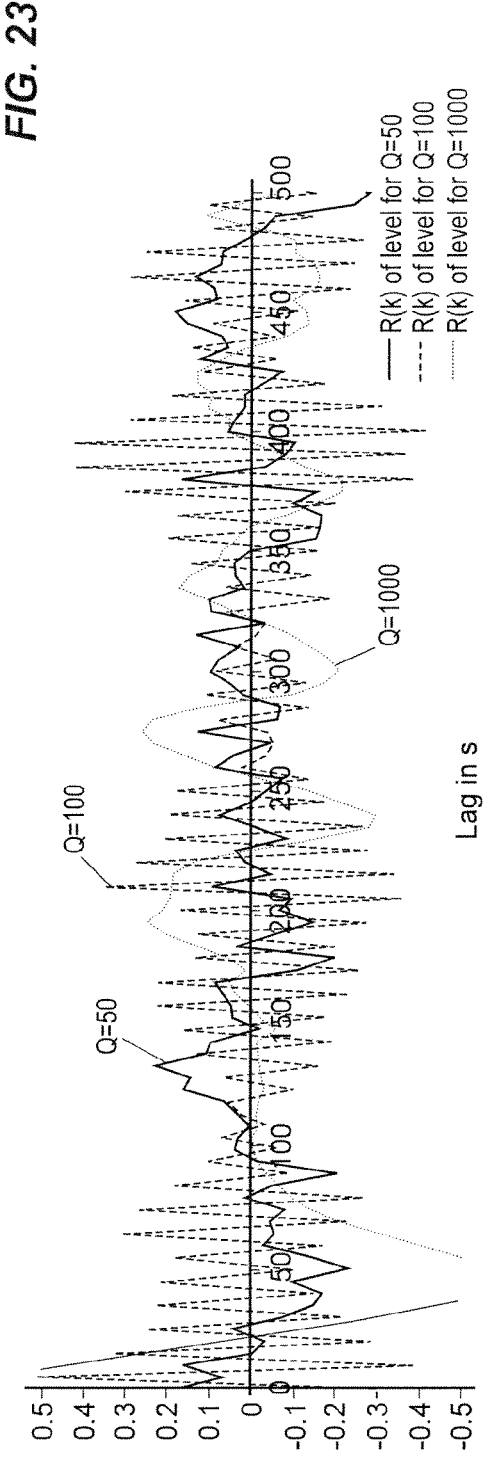
FIG. 23 illustrates a plot of an autocorrelation of prediction error in the MPC controller for the three different MPC tuning settings when operated during rejection of the unmeasured disturbance associated with the plot of FIG. 19.

A summary of the experimental performance of the four different controllers in four different process conditions for the process of FIG. 17 is provided in Table 6 below, wherein all of the MPC controllers were tuned based on the same model assumptions. Here, the controllers were a PI controller, as well as MPC controllers with Q values of 50, 100 and 1000. As can be seen from Table 6, the MPC with Q value of 50 operated with a lower IAE than even the PI controller in response to steam changes, while the MPC with the Q set to 100 was worse and the MPC with Q value of 1000 operated very poorly (or was not tested) in response to steam change conditions but performed best in control at the 0.55 kg/min operating point.

cantly different feedback performance in terms of IAE, as was shown in FIG. 19. The plots of autocorrelation of the prediction error for steady state operation at 0.4 kg/min, are provided in FIG. 22 and illustrate the same dilemma. This fact supports the finding that the best state update (lowest prediction error) does not necessarily lead to the best feedback control performance. Here MPC with Q=50 shows the lowest prediction error but the worst integrated absolute error and MPC with Q=1000 shows the best IAE with the worst prediction error. However, the differences between the three controller settings can be observed when the autocorrelation of prediction error during a large unmeasured disturbance change is determined, as illustrated in FIG. 23, which depicts the autocorrelation of prediction error in the MPC controllers at the three different tuning settings during rejection of an unmeasured disturbance in the form of a steam rate change from 0.55 kg/min to 0.4 kg/min.

Here, the large change in the control error brings out a noticeable difference between the autocorrelation plots, which is otherwise washed out by noise. Unfortunately at this

TABLE 6

|  | PI | $MPC_{Q=50}$ | $MPC_{Q=100}$ | $MPC_{Q=1000}$ |
| --- | --- | --- | --- | --- |
| $\bar{e}_{steam=0.55\ kg/min}$ | 0.036 | 0.057 | 0.066 | 0.052 |
| $\bar{e}_{steam=0.4\ kg/min}$ | 0.032 | 0.053 | 0.028 | not tested |
| $IAE_{steam\ change\ 0.55 \to 0.4\ kg/min}$ | 0.302 | 0.122 | 0.468 | ∞ |
| $IAE_{steam\ change\ 0.4 \to 0.55\ kg/min}$ | 0.281 | 0.136 | 0.424 | not tested |

However, it is important, in the actual control of a plant, to be able to know, while running the plant at one operating point, how changing to another operating point will impact the performance for a certain tuning. Thus, for the example above, it is important that the operator be able to know before the steam rate changes from 0.55 kg/min to 0.4 kg/min that, although penalty tuning of Q=1000 shows the best control at 0.55 kg/min, this tuning will be insufficient for larger disturbances, potentially causing a plant shutdown. Manually passing through all possible process regions and determining the a tuning that will work in all of these regions is feasible and does not require model identification. However, this operation creates a certain amount of wasted or below quality product, may have to be redone if the plant model changes and is only possible if the parameter(s) that impact the model mismatch are known and can be manipulated (as steam in this example).

Figure 21:
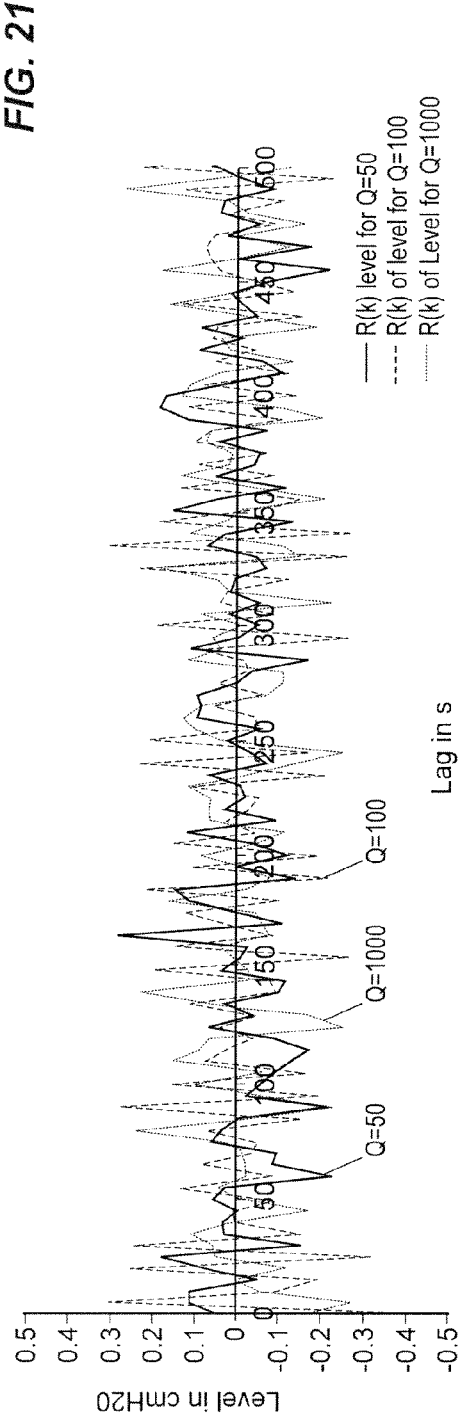
FIG. 21 illustrates a plot of an autocorrelation of prediction error in the MPC controller at the three different MPC tuning settings when operated at the first steam rate associated with the plot of FIG. 18.

It has been determined, however, that the use of an autocorrelation analysis discussed above with respect to FIG. 16 can be used as a trigger to determine appropriate tuning settings in view of possible changes in the operating parameters (and in view of changes to the plant model) and to select a set of tuning parameters that will be adequate or optimal in view of these changes. In particular, an error analysis of the prediction error or the control error may be used to determine how well an MPC controller is matched to a plant, and what degree and type of model mismatch are present. FIGS. 21-25 are provided to illustrate this point. FIG. 21 provides a comparison of the autocorrelation of prediction error in the MPC controller at the three different tuning settings of the example plant discussed above at steady state operation of 0.55 kg/min of steam. From this plot, it appears that no conclusive statement can be made about which MPC controller exhibits better or worse qualities. The amplitudes are different, but considering the lag axis, there is no indication that any one of the plots is significantly more self correlated for a given lag time, even though the three controller tuning setting exhibit signifipoint, it is too late to realize that the controller was tuned badly because that information was needed to retune the controller before a large disturbance occurs. In any event, this plat illustrates why prior art procedures that use autocorrelation analysis as a criterion for determining model mismatch use process excitations to obtain conclusive comparisons of autocorrelations. Even though some methods may be considered "not intrusive" because they wait for unmeasured disturbance changes rather than injecting pulses that perturb the process, they will not function well during steady control, like the steady operation at 0.55 kg/min of steam in this experiment.

Thus, while using the autocorrelation of the prediction error to perform control performance assessment during periods of disturbance rejection may be helpful to determine process model mismatch, using the autocorrelation of the prediction error to perform control performance assessment during periods of steady state operation turns out not to be very useful at all. Moreover, while using the autocorrelation of the prediction error during times of process upset (e.g., unmeasured disturbances or set point changes) can be useful for triggering a controller adaptation/tuning cycle, this technique still requires some degree of process change or upset, which is generally less desirable.

However, it has been found that looking at the autocorrelation of control error during steady state operation works well as a measure of process model mismatch, and that this type of error analysis may be used as a trigger for adaptation/retuning of an MPC controller. For example, FIG. 24 illustrates the autocorrelation of the controlled variable, which is equivalent to the autocorrelation of the control error for pure feedback control, i.e., with a constant set point. The operation of the MPC controllers with the same three tuning settings are depicted in FIG. 24 at a constant steam rate of 0.55 kg/min, along with the operation of the original PI controller performance at this rate, which is added for a reference comparison.

From FIG. 24, it is clear that the MPC$_{Q=1000}$ stands out significantly and is easy to determine as having inherent tuning problems (e.g., a high degree of process model mismatch). In particular, the autocorrelation of the controlled variable of MPC with Q=1000 is vastly different from all of the other controller tuning settings. At steady operation, and without any significant unmeasured disturbance, this tuning can easily be identified as bad because this tuning shows significantly higher self correlation for all values of lag time. The most obvious distinguishing criterion of this curve is that it stays on only one side of the abscissa and never crosses zero.

FIG. 25 depicts the same error analysis calculations during an artificially introduced disturbance to the accumulator level associated with changing the steam rate from 0.55 kg/min to 0.4 kg/min. Although a difference in autocorrelation could be argued, it is not nearly as distinct as the autocorrelation performed without the unmeasured disturbance (which is illustrated in FIG. 24). However this fact does not present a significant problem because the adaptation/tuning logic can automatically detect a disturbance and switch from analyzing the autocorrelation of control error to analyzing the autocorrelation of prediction error in these two different scenarios to provide for better adaptation/tuning initiation. For example, switching between the two different types of calculations can be performed when the control error goes above a certain threshold, which typically occurs in response to an unmeasured disturbance or immediately after a change in a set point.

A simplified qualitative summary of the autocorrelation analysis discussed above is provided in Table 7 below. Here, the experimental data for the four different controllers is displayed as a gross indication of the results of the magnitude of the autocorrelation analysis (i.e., small, medium and large). The autocorrelation analyses that can be used to distinguish or identify model mismatch are found in the middle two rows because of the difference in magnitudes of the autocorrelation analyses of the different controllers for these analyses. In particular, Table 7 provides a summary of qualitative estimates of different autocorrelation experimental data for the three different MPC controllers, wherein all of the controllers are tuned based on the same model assumptions. In this table, $R_f(k)$ is the autocorrelation of prediction error and $R_y(k)$ is the autocorrelation of control error. The PI controller operation is added for comparison.

(but also most challenging) to adjust tuning to the process characteristics before an unmeasured disturbance occurs, and not during or after the disturbance occurs, as is required by most current state of the art adaptive tuning methods. Methods that try to re-identify the process model usually rely on process changes and cannot detect model changes during steady state operation. Such changes may be caused by disturbance or set point changes and must be large enough to be distinguishable from the noise band. Thus, based on the discussion above, the automatic adaptation/tuning method of FIG. 16 should preferably include analysis of prediction error and analysis of control error in the manner described above. The result of this analysis is how well the current tuning is suited for the current process. Any worsened autocorrelation function (as compared to expected or previous autocorrelation functions computed for the same set of design/tuning parameters) must be the result of increased model mismatch and can be accounted for or compensated for by new adaptation/tuning.

The use of autocorrelation as a technique to develop useful feedback information about model mismatch for use in the adaptation tuning technique described with respect to FIG. 13 is useful in a wide variety of process and model types. While the results may vary depending on the particular type of model mismatch that is encountered, in general, the design and tuning parameter values that the optimal design/tuning method calculates for a wider range of model mismatch will be more conservative than the design/tuning parameter values that result from a narrower mismatch range. In other words, the automated adaptation/tuning method presented above detunes the MPC controller to prevent oscillations and instability when a large process model mismatch (or an increase in process model mismatch) is detected, acting like an automatic safety net that kicks in whenever needed. On the other hand, if the autocorrelation analysis indicates a decrease in process model mismatch, a new adaptation/tuning cycle may be implemented to tighten up the controller form and tuning parameters to provide for better overall control. This automatic approach is obviously more desirable than proactively detuning the controller to be safe, a common practice in industry, because this automatic approach applies faster tuning when the model mismatch is smaller and slower or relaxed tuning when the model mismatch is larger.

TABLE 7

|  | PI | MPC$_{Q=50}$ | MPC$_{Q=100}$ | MPC$_{Q=1000}$ |
| --- | --- | --- | --- | --- |
| $R_f(k)_{steam=0.55\,kg/min}$ | n/a | small | small | small |
| $R_f(k)_{steam=0.4\,kg/min}$ | n/a | small | small | not tested |
| $R_f(k)_{steam\,change\,0.55 \to 0.4\,kg/min}$ | n/a | small | medium | large |
| $R_y(k)_{steam=0.55\,kg/min}$ | small | small | medium | large |
| $R_y(k)_{steam=0.4k\,g/min}$ | small | medium | medium | not tested |
| $R_y(k)_{steam\,change\,0.55 \to 0.4\,kg/min}$ | large | large | large | large |

In general, larger values of autocorrelation are deemed to indicate larger amounts of process model mismatch. In summary, closed loop, adaptive control of MPC design and tuning parameters can be instigated using a method that analyzes the autocorrelation of MPC controller information, such as the control error of the controlled variable(s) or the prediction error of the controlled variable(s). However, as discussed above, it can make a big difference whether autocorrelation is calculated from prediction error or control error. Autocorrelation of prediction error, for example, may only be conclusive during a set point change or rejection of an unmeasured disturbance, while autocorrelation of control error may be most useful during steady state operation. It is most useful Importantly, the automatic adaptation/tuning method described herein adapts the form, the controller model, and the design and tuning parameters used by a model based controller based on controller model mismatch without performing a new plant model identification. This method is thus very useful because plant model identification, particularly closed loop plant model identification, has proven to be either significantly intrusive or unreliable in industrial process applications.

Figure 26:
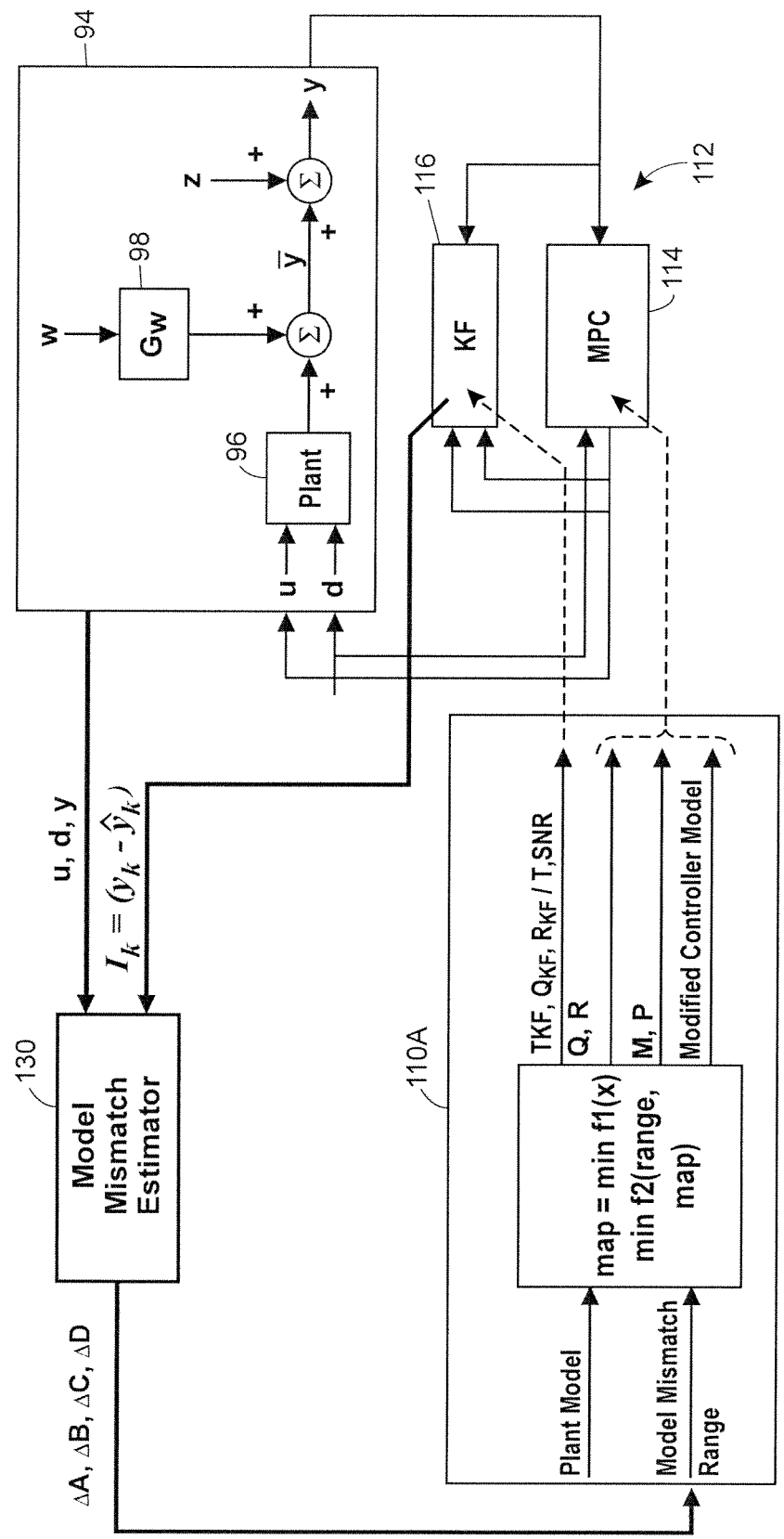
FIG. 26 is a block diagram illustrating an application of the adaptation/tuning block of FIG. 13 to MPC control in a closed loop tuning configuration including an estimator that relies on one or both of process estimation and innovation analysis estimation to initiate adaptive tuning of an MPC controller.

FIG. 26 illustrates a further embodiment of a closed-loop adaptive tuning system that is similar to that of FIG. 16, but that includes an estimator 130 that uses one or both of the error analyses discussed above and process estimation to determine one or more model mismatches or mismatch ranges for use in the tuning block 110A. The block 130 may thereby use either or both of an error analysis of the controller and of a process plant analysis to determine or detect an estimate of a value of or a range of model mismatch between the controller model and the plant, and may use this estimate to initiate a tuning cycle for the MPC controller 112.

Thus, as will be understood, the adaptive tuning technique described herein may be used to adapt controller tuning in the following scenarios and in various combinations thereof including: (1) based on a manual entry of a new process model, (2) based on an automatic property estimation or model identification developed from process plant inputs and outputs, (3) based on a manual entry of one or more new model mismatches or model mismatch ranges or (4) based on an automatic estimation of model mismatch (an amount or a range) developed from an error analysis of state estimation.

Although the invention has been described with reference to the specific exemplary embodiments intended to instruct and illustrate the invention, the disclosed adaptation/tuning device and method is not limited to those embodiments. Various modifications, improvements and additions may be implemented by those with skill in the art, and such modifications, improvements, and additions will not depart from the scope of the invention.

For example, while the adaptation/tuning devices and methods described above have been described in conjunction with the use of process models in the form of first order plus deadtime models, these techniques can be used other type of process models including, for example, state-space process models, regressive models, such as ARX models, finite impulse response models (FIR), step response models, etc. Likewise, the adaptation/tuning devices and methods described herein may operate to adapt an MPC controller using all or only some of the available MPC model, design and tuning parameters based on model mismatch or model mismatch range in any specific case. In particular, the adaptation/tuning devices or methods may focus on one or more "important" model, design and/or tuning parameters present in any particular case or scenario without adapting or changing one or more of the other parameters during an adaptation/tuning procedure. Moreover, while the description of the adaptive tuning techniques provided herein has been provided in the context of a single loop MPC controller, these techniques are applicable to and can be extended to multivariable MPC controller configurations as well or instead.

In addition, those skilled in the art will understand that the partitioning of individual components of the adaptation/tuning blocks and controller units as described herein is discretionary to those responsible for controller implementation and operation. It will be understood that all of these functions can be implemented in any desired manner on in any desired device(s). Moreover, while the adaptation/tuning technique described herein is preferably implemented in software, it or any portions thereof may be implemented in hardware, firmware, etc., and may be implemented by any other processor associated with a process control system. Thus, the elements described herein may be implemented in a standard multipurpose CPU or on specifically designed hardware or firmware such as an application-specific integrated circuit (ASIC) or other hard-wired device as desired. When implemented in software, the software routine may be stored in any computer readable memory such as on a magnetic disk, a laser disk (such as a CD, a DVD, etc.), flash drive or other storage medium, in a RAM or ROM of a computer or processor, in any database, etc. Likewise, this software may be delivered to a user or a process plant via any known or desired delivery method including, for example, on a computer readable disk, smart card memories, flash drives, or other transportable computer storage mechanism or over a communication channel such as a telephone line, the internet, etc. (which are viewed as being the same as or interchangeable with providing such software via a transportable storage medium).

It is also recognized that the specific approaches described herein represent but insubstantial deviations from the embodiments of the invention described above. Consequently, the claims provided herein are properly construed to embrace all modifications, variations and improvements that fall within the true spirit and scope of the invention, as well as substantial equivalents thereof. Accordingly, other embodiments of the invention, although not described with particularly herein, are none-the-less comprehended within the scope of the invention.

The invention claimed is:

1. A method of tuning a model predictive controller for use in controlling a process, comprising:
   obtaining via a computer processor a process model for the process, the process model including a value for each of a set of process model parameters;
   obtaining via a computer processor a process model mismatch indication identifying a process model mismatch for at least one of the set of process model parameters; and
   performing on a computer processor a controller optimization based on the process model and the process model mismatch indication including determining a control-based performance measure for the model predictive controller when operated using each of a multiplicity of different sets of controller design/tuning parameter values and the process model in presence of an amount of process model mismatch associated with the process model mismatch indication, and determining an optimal one of the set of the controller design/tuning parameter values for use in the model predictive controller based on the control-based performance measures.

2. The method of claim 1, wherein the control-based performance measure comprises integrated absolute error.

3. The method of claim 1, wherein the controller design/tuning parameters includes a controller form parameter specifying a controller form.

4. The method of claim 3, wherein the controller form parameter indicates one of an observer based model predictive controller form or a non-observer based model predictive controller form.

5. The method of claim 3, wherein the controller form parameter includes an indication of a general Kalman filter observer based model predictive controller form or a simplified Kalman filter observer based model predictive controller form.

6. The method of claim 1, wherein the controller design/tuning parameters includes one or more observer unit tuning parameters.

7. The method of claim 6, wherein the one or more observer unit tuning parameters includes one or more penalty variables.

8. The method of claim 6, wherein the one or more observer unit tuning parameters includes a Kalman filter penalty variable comprising a time constant or a signal to noise ratio or a covariance in a disturbance function or a covariance in a noise function.

9. The method of claim 1, wherein the controller design/tuning parameters includes one or more model predictive control algorithm tuning parameters.

10. The method of claim 9, wherein the one or more model predictive control algorithm tuning parameters includes a penalty variable or a control horizon or a prediction horizon.

11. The method of claim 1, wherein obtaining via a computer processor the process model mismatch indication includes obtaining a specific value of a process model mismatch in one of the process model parameters.

12. The method of claim 1, wherein obtaining via a computer processor the process model mismatch indication includes obtaining specific values of process model mismatch in two or more of the process model parameters.

13. The method of claim 12, wherein the set of process model parameters includes a process gain or a process time constant.

14. The method of claim 1, wherein obtaining via a computer processor the process model mismatch indication includes obtaining a range of process model mismatch in one or more of the process model parameters.

15. The method of claim 1, wherein performing on a computer processor the controller optimization includes determining a control-based performance measure for the model predictive controller when operated using each of a multiplicity of different sets of controller design/tuning parameter values and the process model at each of a plurality of different sets of process model mismatch values to produce a tuning map as a set of points, each point in the tuning map being associated with a determined optimal control-based performance measure obtainable at a particular set of process model mismatch values using the set of controller design/tuning parameter values associated with the determined optimal control-based performance measure.

16. The method of claim 15, including displaying the tuning map on a display device to be visible to a user.

17. The method of claim 16, including allowing a user to choose a particular set of controller design/tuning parameter values to use in tuning the model predictive controller by selecting a particular point in the tuning map.

18. The method of claim 16, wherein obtaining via a computer the process model mismatch indication includes obtaining a model mismatch range for one or more of the set of process model parameters, the model mismatch range defining a subspace in the tuning map, and wherein displaying the tuning map includes displaying the model mismatch range subspace on the tuning map.

19. The method of claim 18, further including allowing a user to move the model mismatch range subspace within the tuning map to determine an optimal adaptation/tuning point in view of the model mismatch range subspace.

20. The method of claim 15, wherein obtaining via a computer processor the process model mismatch indication includes obtaining a model mismatch range, the model mismatch range defining a subspace size in the tuning map and including performing a second optimization to find a particular subspace within the tuning map of the subspace size that produces an optimal value for a second performance measure.

21. The method of claim 20, wherein the second performance measure determines the worst value of the control-based performance measure of the points in the tuning map within the particular subspace.

22. The method of claim 20, including determining a new set of process model parameter values for use in creating a new controller model for the model predictive controller and determining a set of controller design/tuning parameter values to use in the model predictive controller based on the second optimization.

23. The method of claim 15, including determining a new set of controller design/tuning parameter values as the controller design/tuning parameter values associated with one of the points in the tuning map.

24. The method of claim 15, including selecting a new controller operating point as one of the points within the tuning map and providing the controller design/tuning parameter values associated with the selected controller operating point to the model predictive controller for use in controlling the process and providing a new controller model to the model predictive controller based on the process model mismatch values associated with the selected controller operating point.

25. The method of claim 1, wherein obtaining via a computer processor a process model mismatch indication includes performing an autocorrelation procedure on an error signal.

26. The method of claim 25, wherein the error signal is a control error determined in the model predictive controller.

27. The method of claim 26, wherein performing the autocorrelation procedure includes performing the autocorrelation procedure on data collected during a time period when the process is in a steady state condition.

28. The method of claim 25, wherein the error signal is a prediction error determined in the model predictive controller.

29. The method of claim 28, wherein performing the autocorrelation procedure includes performing the autocorrelation procedure on data collected during a time period when the process is being controlled in response to a significant disturbance or upset.

30. An adaptive model predictive controller for use in controlling a process plant, comprising:
  a model predictive controller unit having a controller model and one or more alterable design/tuning parameters; and
  a tuning unit including;
    a model storage that stores a process model for the process plant, the process model specifying a value for each of a set of process model parameters; and
    an optimization unit communicatively coupled to the model predictive controller, wherein the optimization unit simulates the operation of the model predictive controller in the presence of a non-zero process model mismatch when the controller model is based on the process model, for each of a plurality of simulation instances, wherein during each simulation instance, the model predictive controller is configured with a different set of controller design/tuning parameter values, the optimization unit determining a controller performance measure for each of the simulation instances, the optimization unit further determining an optimal one of the sets of controller design/tuning parameter values for use in the model predictive controller based on the controller performance measures.

31. The adaptive model predictive controller of claim 30, wherein the controller design/tuning parameters include one or more of a controller form parameter specifying a controller form, or one or more observer unit tuning parameters or one or more model predictive controller algorithm penalty variables.

32. The adaptive model predictive controller of claim 30, wherein the controller design/tuning parameters include a controller form parameter specifying either (1) one of an observer based model predictive controller form or a non-observer based model predictive controller form or (2) one of a first or a second type of observer based model predictive controller form.

33. The adaptive model predictive controller of claim 30, wherein the optimization unit simulates the operation of the model predictive controller in the presence of a plurality of different non-zero process model mismatches to develop a tuning map, the tuning map including a set of points, each point being associated with (1) a determined optimal controller performance measure that is possible at a particular one of the plurality of process model mismatches and (2) the specific set of controller design/tuning parameter values that resulted in the optimal controller performance measure at the particular one of the plurality of process model mismatches.

34. The adaptive model predictive controller of claim 33, further including a display unit communicatively coupled to the optimization unit to display the tuning map to a user.

35. The adaptive model predictive controller of claim 34, wherein the display unit enables a user to select a particular point in the tuning map and wherein the optimization unit provides the design/tuning parameter values associated with the selected point to the model predictive controller.

36. The adaptive model predictive controller of claim 34, wherein the optimization unit stores a model mismatch range for one or more of the process model parameters, the model mismatch range defining a model mismatch range subspace in the tuning map, and wherein the display unit displays the model mismatch range subspace on the tuning map.

37. The adaptive model predictive controller of claim 36, wherein the display unit displays the model mismatch range subspace on the tuning map centered at a point associated with no model mismatch.

38. The adaptive model predictive controller of claim 37, wherein the display unit allows a user to move the model mismatch range subspace within the tuning map to determine an optimal adaptation/tuning point in the tuning map in view of the model mismatch range subspace.

39. The adaptive model predictive controller of claim 33, wherein the optimization unit stores a model mismatch range, the model mismatch range defining a subspace size in the tuning map, and wherein the optimization unit performs a second optimization to determine a particular subspace within the tuning map of the subspace size that produces an optimal value for a second performance measure.

40. The adaptive model predictive controller of claim 39, wherein the optimization unit determines a new set of process model parameter values for use in defining a new controller model for the model predictive controller and determines a set of controller design/tuning parameter values for use in the model predictive controller based on the second optimization.

41. The adaptive model predictive controller of claim 33, wherein the optimization unit determines a new set of controller design/tuning parameter values as the controller design/tuning parameter values associated with one of the points in the tuning map.

42. The adaptive model predictive controller of claim 33, further including an estimator unit that performs an autocorrelation procedure on an error function to implement a tuning cycle for the optimization unit.

43. The adaptive model predictive controller of claim 42, wherein the estimator unit performs an autocorrelation procedure on the error function to estimate an amount of process model mismatch in one of the process model parameters.

44. The adaptive model predictive controller of claim 42, wherein the estimator unit performs an autocorrelation procedure on a control error determined in the model predictive controller.

45. The adaptive model predictive controller of claim 42, wherein the estimator unit performs an autocorrelation procedure a control error determined in the model predictive controller during a steady state operation of the process.

46. An adaptive model predictive controller tuning unit for implementation on a computer processor to tune a model predictive controller that operates to control a process plant using a controller model, comprising:
    a non-transitory computer readable medium;
    a storage routine stored on the computer readable medium for execution on a processor to store a process model for the process plant, the process model specifying a value for each of a set of process model parameters; and
    an optimization routine stored on the computer readable medium for execution on a processor to simulate the operation of the model predictive controller in presence of a process model mismatch when the controller model of the model predictive controller is based on the process model, the optimization routine simulating the model predictive controller when the model predictive controller is configured with each of a plurality of different sets of controller design/tuning parameter values, the optimization routine determining a controller performance measure for each of the plurality of different sets of controller design/tuning parameter values in the presence of the process model mismatch, and the optimization routine still further determining an optimal one of the different sets of controller design/tuning parameter values for use in the model predictive controller based on the controller performance measures.

47. The adaptive model predictive controller tuning unit of claim 46, wherein the controller design/tuning parameters include a controller form parameter specifying a controller form, or one or more model predictive controller observer unit tuning parameters, or one or more model predictive controller algorithm penalty variables.

48. The adaptive model predictive controller tuning unit of claim 46, wherein the optimization routine executes to simulate the operation of the model predictive controller in the presence of a plurality of different process model mismatches to develop a tuning map, the tuning map including a set of points, each point being associated with (1) a determined optimal controller performance measure that is possible at a particular one of the plurality of process model mismatches and (2) the specific set of controller design/tuning parameter values that resulted in the optimal controller performance measure at the particular one of the plurality of process model mismatches.

49. The adaptive model predictive controller tuning unit of claim 48, further including a display routine communicatively coupled to the optimization routine to display the tuning map to a user, and wherein the display routine enables a user to select a particular point in the tuning map to provide the design tuning parameter values associated with the selected point to the model predictive controller for tuning the model predictive controller.

50. The adaptive model predictive controller tuning unit of claim 49, wherein the optimization routine includes a model mismatch range for one or more of the process model parameters, the model mismatch range defining a subspace in the tuning map, and wherein the display unit displays the model mismatch range subspace on the tuning map.

51. The adaptive model predictive controller tuning unit of claim 48, wherein the optimization routine executes to perform a second optimization to determine a particular model mismatch subspace within the tuning map that produces an optimal value for a second performance measure wherein the model mismatch subspace defines a model mismatch range in one or more of the process model parameters.

52. The adaptive model predictive controller tuning unit of claim 51, wherein the optimization routine executes to determine a new set of process model parameter values for use in defining a new controller model for the model predictive controller and determines a set of controller design/tuning parameter values for use in the model predictive controller based on the second optimization.

* * * * *

UNITED STATES PATENT AND TRADEMARK OFFICE
CERTIFICATE OF CORRECTION

| | | |
|---|---|---|
| PATENT NO. | : 8,185,217 B2 | Page 1 of 1 |
| APPLICATION NO. | : 12/363305 | |
| DATED | : May 22, 2012 | |
| INVENTOR(S) | : Dirk Thiele | |

It is certified that error appears in the above-identified patent and that said Letters Patent is hereby corrected as shown below:

In the Specification:

At Column 5, line 31, "can not" should be -- cannot --.

At Column 11, line 27, "use" should be -- uses --.

In the Claims:

At Column 46, line 3, "procedure a" should be -- procedure on a --.

Signed and Sealed this
Twenty-second Day of April, 2014

Michelle K. Lee
*Deputy Director of the United States Patent and Trademark Office*